US009081711B2

(12) United States Patent
Yasufuku et al.

(10) Patent No.: US 9,081,711 B2
(45) Date of Patent: Jul. 14, 2015

(54) VIRTUAL ADDRESS CACHE MEMORY, PROCESSOR AND MULTIPROCESSOR

(71) Applicant: KABUSHIKI KAISHA TOSHIBA, Tokyo (JP)

(72) Inventors: Kenta Yasufuku, Kanagawa (JP); Shigeaki Iwasa, Kanagawa (JP); Yasuhiko Kurosawa, Kanagawa (JP); Hiroo Hayashi, Kanagawa (JP); Seiji Maeda, Kanagawa (JP); Mitsuo Saito, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/090,428

(22) Filed: Nov. 26, 2013

(65) Prior Publication Data
US 2014/0164702 A1 Jun. 12, 2014

Related U.S. Application Data

(62) Division of application No. 12/958,298, filed on Dec. 1, 2010, now Pat. No. 8,607,024.

(30) Foreign Application Priority Data

Mar. 19, 2010 (JP) .................................. 2010-064639

(51) Int. Cl.
*G06F 13/16* (2006.01)
*G06F 12/10* (2006.01)
(Continued)

(52) U.S. Cl.
CPC ........ *G06F 12/1063* (2013.01); *G06F 12/0831* (2013.01); *G06F 12/1027* (2013.01); *G06F 12/1054* (2013.01); *G06F 12/12* (2013.01);
(Continued)

(58) Field of Classification Search
CPC ............ G06F 12/1027; G06F 12/1009; G06F 12/1063; G06F 12/12
USPC .......................................................... 711/205
See application file for complete search history.

(56) References Cited

U.S. PATENT DOCUMENTS 5,241,641 A 8/1993 Iwasa et al.
5,377,339 A 12/1994 Saito et al.
(Continued)

FOREIGN PATENT DOCUMENTS

JP H03-083150 A 4/1991

OTHER PUBLICATIONS

U.S. Appl. No. 12/882,588, filed Nov. 22, 2010, Yasufuku.
(Continued)

*Primary Examiner* — Jae Yu
(74) *Attorney, Agent, or Firm* — Knobbe, Martens, Olson & Bear LLP

(57) ABSTRACT

An embodiment provides a virtual address cache memory including: a TLB virtual page memory configured to, when a rewrite to a TLB occurs, rewrite entry data; a data memory configured to hold cache data using a virtual page tag or a page offset as a cache index; a cache state memory configured to hold a cache state for the cache data stored in the data memory, in association with the cache index; a first physical address memory configured to, when the rewrite to the TLB occurs, rewrite a held physical address; and a second physical address memory configured to, when the cache data is written to the data memory after the occurrence of the rewrite to the TLB, rewrite a held physical address.

7 Claims, 35 Drawing Sheets

(51) Int. Cl.
  *G06F 12/08* (2006.01)
  *G06F 12/12* (2006.01)
(52) U.S. Cl.
  CPC ......... *G06F 12/1081* (2013.01); *Y02B 60/1225* (2013.01)

(56) References Cited

U.S. PATENT DOCUMENTS

| | | | |
|---|---|---|---|
| 5,522,058 A | 5/1996 | Iwasa et al. | |
| 5,617,553 A | 4/1997 | Minagawa et al. | |
| 5,634,027 A | 5/1997 | Saito | |
| 5,802,576 A | 9/1998 | Tzeng et al. | |
| 5,826,057 A | 10/1998 | Okamoto et al. | |
| 5,829,032 A | 10/1998 | Komuro et al. | |
| 5,881,264 A | 3/1999 | Kurosawa | |
| 5,890,189 A | 3/1999 | Nozue et al. | |
| 6,088,773 A | 7/2000 | Kano et al. | |
| 6,324,634 B1 | 11/2001 | Yoshioka et al. | |
| 6,418,515 B1 | 7/2002 | Kurosawa | |
| 7,096,320 B2 | 8/2006 | Gaither et al. | |
| 8,417,915 B2 | 4/2013 | Gilday et al. | |
| 8,607,024 B2 | 12/2013 | Yasufuku et al. | |
| 2002/0062418 A1* | 5/2002 | Luick | 711/3 |
| 2003/0005237 A1* | 1/2003 | Dhong et al. | 711/146 |
| 2003/0023814 A1 | 1/2003 | Barroso et al. | |
| 2008/0077706 A1 | 3/2008 | Maeda et al. | |
| 2008/0229036 A1 | 9/2008 | Maeda et al. | |
| 2008/0256296 A1 | 10/2008 | Maeda | |
| 2008/0307162 A1 | 12/2008 | Maeda et al. | |
| 2009/0019266 A1 | 1/2009 | Maeda | |
| 2009/0259813 A1 | 10/2009 | Yasufuku | |
| 2010/0100684 A1 | 4/2010 | Kurosawa et al. | |
| 2010/0100685 A1 | 4/2010 | Kurosawa et al. | |

OTHER PUBLICATIONS

U.S. Appl. No. 12/958,298, filed Dec. 1, 2010, Yasufuku.
U.S. Appl. No. 12/580,720, filed Oct. 16, 2009, Kurosawa.
U.S. Appl. No. 12/580,732, filed Oct. 16, 2009, Kurosawa.
U.S. Appl. No. 12/404,631, filed Mar. 16, 2009, Yasufuku.
U.S. Appl. No. 08/112,811, filed Aug. 11, 1993, Iwasa.
U.S. Appl. No. 07/501,256, filed Mar. 28, 1990, Iwasa.
U.S. Appl. No. 08/917,923, filed Aug. 27, 1997, Kano.
U.S. Appl. No. 08/550,403, filed Oct. 30, 1995, Komuro.
U.S. Appl. No. 09/231,828, filed Jan. 15, 1999, Kurosawa.
U.S. Appl. No. 08/790,919, filed Jan. 29, 1997, Kurosawa.
U.S. Appl. No. 12/037,357, filed Feb. 26, 2008, Maeda.
U.S. Appl. No. 12/035,977, filed Feb. 22, 2008, Maeda.
U.S. Appl. No. 12/071,966, filed Feb. 28, 2008, Maeda.
U.S. Appl. No. 12/190,370, filed Aug. 12, 2008, Maeda.
U.S. Appl. No. 11/943,005, filed Nov. 20, 2007, Maeda.
U.S. Appl. No. 08/005,371, filed Jan. 15, 1993, Okamoto.
U.S. Appl. No. 07/979,806, filed Nov. 20, 1992, Saito.
U.S. Appl. No. 08/753,944, filed Dec. 3, 1996, Nozue.
U.S. Appl. No. 08/429,103, filed Apr. 26, 1995, Minagawa.
U.S. Appl. No. 08/191,069, filed Feb. 3, 1994, Saito.
"Chapter 5, Memory Hierarchy Design" and "Appendix C, Review of Memory Hierarchy", John L. Hennessy, et al., Computer Architecture-A Quantitative Approach, Fourth Edition, Morgan Kaufmann Publishers, 2007, pp. 286 to 354 and pp. C-I to C-57.
"Chapter 7, Large and Fast: Exploiting Memory Hierarchy", David A. Patterson, et. al., Computer Organization and Design—The Hardware/Software Interface, Third Revised Printing, Morgan Kaufmann Publishers, 2007, pp. 466-555.
"5.1.2. Cache Coherence through Bus Snooping" and "6.2. Base Design: Single-Level Caches with an Atomic Bus", David E. Culler, et al., Parallel Computer Architecture—A Hardware/Software Approach, Morgan Kaufmann Publishers, 1998, pp. 276-393.
"IBM PowerPC 970FX RISC Microprocessor User's Manual Version 1.7", International Business Machines Corporation, pp. 17 to 25 and pp. 129-160, Mar. 14, 2008.
Japanese Office Action, mailed Mar. 27, 2012, issued in JP App No. 2010-064639, in 4 pages.
Background Information Sheet, Jun. 25, 2010.

* cited by examiner

VIRTUAL ADDRESS CACHE MEMORY, PROCESSOR AND MULTIPROCESSOR

CROSS-REFERENCE TO RELATED APPLICATION(S)

This application is a divisional of U.S. application Ser. No. 12/958,298, filed Dec. 1, 2010, which is based upon and claims the benefit of priority from Japanese Patent Application No. 2010-64639, filed on Mar. 19, 2010; the entire contents of these applications are incorporated herein by reference.

FIELD

An embodiment herein relates generally to a virtual address cache memory, a processor and a multiprocessor.

BACKGROUND

Conventionally, a processor employing virtual storage includes a TLB (translation lookaside buffer), which is a cache memory dedicated to holding a copy of a page table managed in an operating system (hereinafter referred to as "OS") in order to perform high-speed address translation from a virtual address space, which is an address space unique to a process, to a real address space, which is an address space of the entire computer system including the processor.

Meanwhile, in order to hide memory access latency, a processor copies data in a memory to a cache memory (hereinafter also referred to as "cache") to use the data. In order to identify the address of data in the memory, a copy of which has been hold in the cache, in addition to a data memory configured to hold data in the memory, the processor includes a tag memory configured to store the addresses of the data and the states of the data (e.g., whether or not the data is valid, and whether or not the memory content has been updated). In general, a tag memory is configured to use low-order bits of a memory address as an index for a cache, and hold high-order bits (tag) of the memory address and the state of data as data.

The aforementioned address translation is often a critical path for timing in processor designing. Where a processor employs hierarchical memories, a configuration in which a level 1 cache positioned close to the processor (hereinafter referred to as "L1 cache") is accessed using a virtual address, and caches of level 2 ("L2 cache") onward are accessed using a physical address for, e.g., a countermeasure for aliases, which will be described later, is often employed.

Since address translation is performed in all of memory accesses for instruction fetching, load instructions and store instructions, the effect of TLB misses imposed on the performance is larger than that of ordinary cache misses. Accordingly, a TLB is provided as a dedicated memory separately from a cache.

However, the configurations of the aforementioned conventional TLB and cache memory have the following problem.

The problem is one relating to the capacities of tag memories in a TLB and a cache.

A TLB holds data such as virtual page numbers and physical page numbers, and page attributes and page states as its data. A processor having a physical address size of 32 bits or more has a large percentage of virtual page numbers and physical page numbers in the data held by the TLB. The size of a TLB is determined mainly by the size of the physical address space, the minimum page size, and the number of entries in the TLB.

A tag memory of a cache holds data such as tags and the cache states as its data. A processor having a physical address size of 32 bits or more has a large percentage of tags in the data held by the tag memory of the cache. The size of a tag memory of a cache is determined mainly by the size of the physical address space, the cache line size, and the cache capacity.

According to Figure 5.28 (p. 341) in "Computer Architecture—A Quantitative Approach—Fourth Edition", in a recent processor, an L1 cache is a 2-way set associative cache with a size of 8 to 64 KB.

a TLB is a full associative cache with an entry count of 40 to 1024; and the minimum page size is 4 to 64 KB.

See also "Integrating Virtual Memory, TLBs, and Caches" (pp. 524-527), Figure 7.24 (p. 525), and Figure 7.25 (p. 526) by David A. Patterson and John L. Hennessy, Computer Organization and Design—The Hardware/Software Interface—Third Edition, Morgan Kaufmann Publishers, 2007, and "Avoiding address translation during indexing of the cache to reduce hit time" (p. 291) and Figure 5.3 (p. 292) by John L. Hennessy and David A. Patterson, Computer Architecture—A Quantitative Approach—Fourth Edition, Morgan Kaufmann Publishers, 2007.

(First Problem)

Conventionally, when task switching in which an executed task is switched to another occurs, the content of the TLB is rewritten, and processing for invalidating the cache memory is performed. Here, when data in the cache memory has been updated and a dirty bit is set, a write-back of cache data to the main memory is performed.

However, the time required for a write-back of data to the main memory is extremely long compared to time required for other processing in task switching, causing a problem in that the responsiveness of task switching in the processor deteriorates.

(Second Problem)

Furthermore, conventionally, a multiprocessor system includes a system in which data reads and writes are performed between the main memory and a cache memory in a processor, and between respective cache memories.

For example, in a multiprocessor system, when a processor writes an operation result to its own cache memory, the value of the data in the main memory corresponding to the operation result data differs from the data in the cache memory. Accordingly, when another processor refers to the operation result data, a write-back, that is, castout of the value written to the cache memory by the processor from the cache memory to the main memory is performed. As a result of the write-back being performed, correct data is stored in the main memory, enabling the operation result data to be used by another processor as well. In other words, in a multiprocessor system, in order to make data rewritten by a processor (CPU1) available to another processor (CPU2), the processor that has rewritten the data (CPU1) needs to write the data back to the main memory.

The aforementioned write-back involves access to the main memory, which results in the problems of causing a decrease in performance of the multiprocessor system due to large latency, and furthermore, causing an increase in power consumption due to an operation of the input/output circuit.

(Third Problem)

Furthermore, conventionally, DMA technique is used for data transfer between different address areas of a main memory or between the main memory and an input/output device without increasing the load of the CPU. For multiprocessor systems, a technique in which each processor performs data transfer between a main memory and its own local memory using DMA has been in practical use.

For example, a CPU of each processor, that is, a CPU core in a multiprocessor system accesses a relevant local memory according to a load instruction and a store instruction, reads data from the local memory according to the load instruction and writes the data to a register file in the CPU, and retrieves data from the register file in the CPU according to the store instruction and writes the data to the local memory. Each CPU performs a read (GET) of data to the local memory from the main memory and a write (PUT) of data from the local memory to the main memory using DMA.

DMA transfer is controlled by a DMA controller by means of designating a source address and a destination address, which are physical addresses. Furthermore, for the aforementioned multiprocessor system, DMA transfer of a cacheable area is not supported.

Accordingly, since a source address and a destination address are also designated using physical addresses in DMA, a programmer can write programs to be executed in the respective CPUs after estimating the data processing time and the data access time.

In order to increase the processing power of a processor in each CPU, a cache memory can be provided in the processor; however, accessing a main memory via a cache memory causes problems in that data access time differs between the case of a cache hit and the case of a cache miss, and the time required for transfer of cache data from the main memory in the case of a cache miss cannot be estimated.

Furthermore, in order to enhance the flexibility of program development, programs that can be executed in the aforementioned multiprocessor system can be made to be executable by using virtual addresses, which, however, causes a problem in that DMA cannot be used for a system using virtual addresses in a local memory.

(Fourth Problem)

In general, cache memories include multilevel cache memories, and some processors include multilevel caches. In that case, the storage capacity of an L1 cache is smaller than the storage capacity of an L2 cache. In general, the storage capacity of a higher-order cache is smaller than the storage capacity of a lower-order cache.

However, the hit rate of an L1 cache is generally high. When an L1 cache is accessed, a TLB is always referred to for translation from a virtual address to a physical address. Accordingly, a processor suffers large power consumption in the TLB hardware.

A present embodiment has been provided in view of the aforementioned first problem, and a first object of the present embodiment is to provide a cache memory and a processor, which provide a TLB function in the cache memory, enabling reduction of the circuit amount, and have enhanced task switching responsiveness.

Another present embodiment has been provided in view of the aforementioned second problem, and a second object of the present embodiment is to provide a multiprocessor system enabling reduction of the amount of access to a main memory based on data write-back processing performed by each processor.

A still another present embodiment has been provided in view of the third problem, and a third object of the present embodiment is to provide a processor enabling DMA to be executed using a virtual address, enhancing the cache hit rate for DMA transfer, or enhancing the cache hit rate for the case where the relevant processor accesses the cache after DMA transfer.

A still further present embodiment has been provided in view of the aforementioned fourth problem, and a forth object of the present embodiment is to provide a processor including multilevel cache memories, the processor enabling the reference frequency of a TLB to be reduced, decreasing the power consumption of the processor.

DETAILED DESCRIPTION

Figure 1:
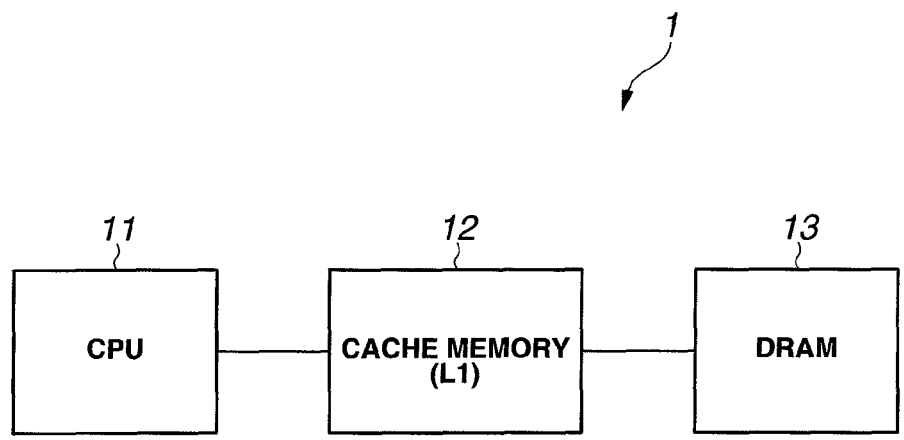
FIG. 1 is a configuration diagram illustrating a configuration of a processor system according to a present embodiment.

An embodiment enables provision of a virtual address cache memory including: a TLB virtual page memory configured to hold entry data including a virtual page tag, the virtual page tag being a predetermined high-order bit (MSB side) of a virtual address for a process, output a hit signal when the virtual page tag corresponds to a virtual page tag from a processor, and when a rewrite to a TLB occurs, rewrite the entry data; a data memory configured to hold cache data using the virtual page tag or a page offset as a cache index; a cache state memory configured to hold a cache state for the cache data stored in the data memory, in association with the cache index; a first physical address memory configured to hold a physical address corresponding to the virtual address held in the TLB virtual page memory, and when the rewrite to the TLB occurs, rewrite the held physical address; and a second physical address memory configured to hold a physical address for the cache data held in the data memory, and when the cache data is written to the data memory after the occurrence of the rewrite of the TLB, rewrite the held physical address.

An embodiment enables provision of a processor including: processors connected via a bus, each processor including a CPU, a cache memory and a DMA controller; and a memory controller connected to the bus, the memory controller being a control section for a main memory, wherein the cache memory includes: a TLB virtual page memory configured to hold entry data including a virtual page tag, the virtual page tag being a predetermined high-order bit (MSB side) of a virtual address for a process, output a hit signal when the virtual page tag corresponds to a virtual page tag from a processor, and when a TLB miss occurs, rewrite the entry data; a data memory configured to hold cache data using the virtual page tag or a page offset as a cache index; a cache state memory configured to hold a cache state for the cache data stored in the data memory, in association with the cache index; a first physical address memory configured to hold a physical address corresponding to the virtual address held in the TLB virtual page memory, and when the TLB miss occurs, rewrite the held physical address; and a second physical address memory configured to hold a physical address for the cache data held in the data memory, and when the TLB miss occurs, rewrite the held physical address, and wherein when data is transferred by DMA transfer using the DMA controller from the main memory to the cache memory, the CPU sets a transfer source address and a transfer destination address in the DMA transfer, using virtual addresses.

An embodiment enables provision of a processor including: a CPU; a primary cache memory; and a secondary, or tertiary or more-order cache memory, wherein the secondary or tertiary or more-order cache memory includes: a TLB virtual page memory configured to hold entry data including a virtual page tag, the virtual page tag being a predetermined high-order bit (MSB side) of a virtual address for a process, and output a hit signal when the virtual page tag corresponds to a virtual page tag from a processor; a data memory configured to hold cache data using the virtual page tag or a page offset as a cache index; and a cache state memory configured to hold a cache state for the cache data stored in the data memory, in association with the cache index.

Hereinafter, embodiments will be described with reference to the drawings.

(Configuration)

First, a processor system according to a present embodiment will be described with reference to FIG. 1. FIG. 1 is a configuration diagram illustrating a configuration of a processor system according to a present embodiment.

A processor system 1 includes a central processing unit (hereinafter referred to as "CPU") 11, a level 1 (L1) cache memory 12, which is a virtual address cache memory, and one or more DRAMs 13 (hereinafter, only referred to as DRAM 13), which is a main memory. The processor system 1 is a processor including a virtual storage mechanism and a cache memory. The CPU 11 is what is called a CPU core. The cache memory 12 includes a cache memory control circuit. The cache memory 12 and the DRAM 13 are interconnected via a bus. The DRAM 13 is connected to the bus via a memory controller (not illustrated). Here, although the main memory is described taking a DRAM as an example, the main memory may be another type of memory.

Although the present embodiment is described in terms of an example in which one CPU 11 accesses the DRAM 13, a multicore configuration may be used in which a plurality of CPU 11-cache memory 12 pairs, and the plurality of pairs are connected to one DRAM 13 via, e.g., a system bus. Also, the DRAM may be separated into a plurality of memories according to addresses, and may include a memory other than a DRAM, for example, an SRAM.

Furthermore, e.g., an L2 cache may be provided between the cache memory 12, which is an L1 cache, and the DRAM 13.

The CPU 11 reads an instruction or data stored in the main memory 13 via the cache memory 12 to execute a program. If an instruction or data (hereinafter also simply referred to as "data") necessary to execute a program exists in the cache memory 12, the CPU 11 reads the instruction or data to execute the program.

In order to designate the data, the CPU 11 outputs a virtual address EA to the cache memory 12. If data corresponding to the input virtual address exists in the cache memory 12, the cache memory 12 outputs the data to the CPU 11. If no such data stored in the cache memory 12, the data is read from the DRAM 13 by means of refilling, written to the cache memory 12, and then output to the CPU core 11.

In the cache memory 12 according to the present embodiment, cache entry replacement is performed on a virtual page basis managed by an OS managing the execution of a plurality of processes, and cache state management is performed on a cache line basis, that is, on a cache block basis. In the processor system according to the present embodiment, the cache memory 12 is accessed using a virtual address, and the cache coherency is maintained by means of snooping. For snooping, see "5.1.2. Cache Coherence through Bus Snooping" (p. 277), Figure 5.4 (p. 278), "6.2. Base Design: Single-level Caches with an Atomic Bus" (pp. 380-393), Figure 6.4 (p. 386) and Figure 6.5 (p. 388) by David E. Culler, Jaswinder P. Singh and Anoop Gupta, Parallel Computer Architecture—A Hardware/Software Approach—, Morgan Kaufmann, 1999, ISBN 1-55860-343-3.

Figure 2:
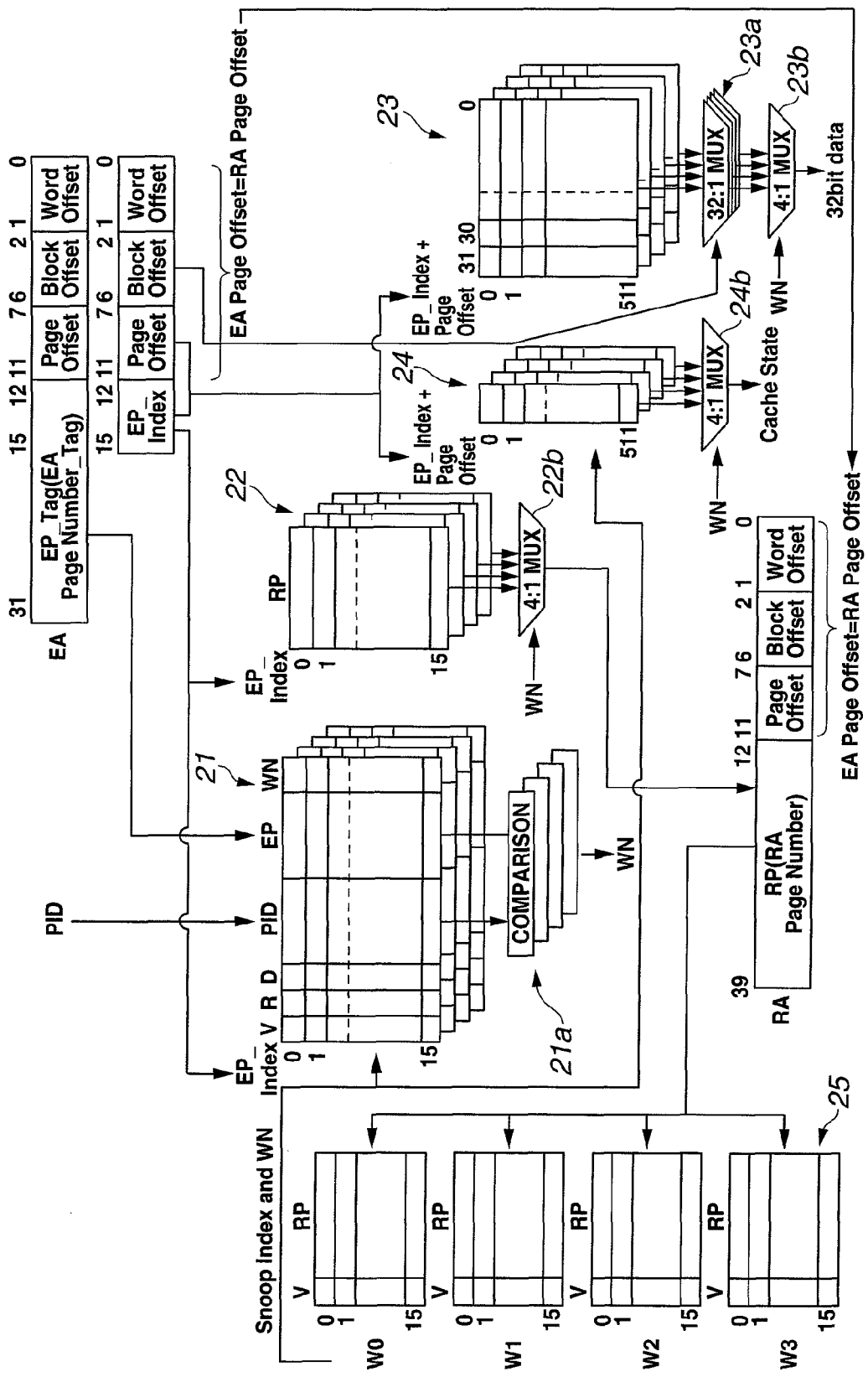
FIG. 2 is a configuration diagram of a cache memory according to a present embodiment, which is a virtual address cache memory.

FIG. 2 is a configuration diagram of the cache memory 12, which is a virtual address cache memory.

The cache memory 12 includes a TLB virtual page memory (TLB EP memory) 21, a TLB physical page memory (TLB RP memory: first physical address memory) 22, a data memory 23, a cache state memory 24, and a TLB physical page CAM memory (TLB RP CAM memory: second physical address memory) 25.

The cache memory 12 receives an input of a virtual address (EA) from the CPU 11 and outputs a physical address 32 to the DRAM 13.

The cache memory 12 provides functions as a TLB and an L1 cache by means of a cache memory with 4-way set associative configuration. The capacity of the cache memory 12 as an L1 cache is 256 KB (kilo bytes; the same applies to the description below).

Although the size of each way exceeds the page size, no "page coloring which will be described later", has been performed for the virtual addresses.

The cache memory 12 is a 4-way set associative cache in which virtual addresses EA are divided in units of page of 4 KB, and constitutes a TLB and an L1 cache. In the present embodiment, for example, the cache memory 12 as an L1 cache is accessed by a 32-bit virtual address 31.

High-order bits (31:12) in the virtual address EA form a virtual page tag (EP_Tag), and middle-order bits (15:12) indicating a space obtained as a result of 64 KB, which is a cache capacity per way, being divided by 4 KB, forms a virtual page index (EP_index; hereinafter also referred to as "TLB index"). Furthermore, bits (11:7) form a page offset, bits (6:2) form a block offset, and a lowest-order bit (1:0) forms a word offset.

Since the size of each way (64 KB) is larger than the page size (4 KB), as illustrated in FIG. 2, the bits (31:12) and (15:12) of the virtual address EA are allocated to the virtual page tag and the virtual page index, respectively, which overlap each other.

From the CPU 11, a process number PID as an identifier for identifying a process is also input to the cache memory 12.

Then, the CPU 11 reads data of a size equal to or smaller than the cache line size from the cache memory 12. Here, the CPU 11 reads 32-bit data from the cache memory 12.

The TLB virtual page memory 21 includes TLB virtual page memories, each of which is attached to each way. Each TLB virtual page memory can store data such as state information indicating the state of each page, e.g., valid (V), reference (R) and dirty (D), a process number PID as an identifier for identifying a process, a virtual page number EP and a way number WN. The virtual page number EP is data corresponding to high-order bits (31:12) in a virtual address EA. In this example, same values as those of the way numbers of the TLB are used for way numbers WN, and thus, fields for the way numbers WN may be provided, or a configuration in which the fields for the way numbers WN are omitted using the way numbers of the TLB may be employed. It is supposed that a processor with an architecture not having process numbers performs an operation in the present embodiment using virtual page numbers only, not using process numbers.

Each data in the TLB virtual page memory 21 is designated by 4 bits (15:12) of a virtual address EA, which forms a TLB index.

Four comparators 21a are provided. Each comparators 21a compares a process number PID and a virtual page number EP of each TLB virtual page memory 21, and a process number PID and a virtual page tag EP_Tag in a virtual address EA from the CPU 11. The four comparators 21a output a way number WN as a hit signal when there is a hit, and a non-hit signal when there is no hit, as an output of the TLB virtual page memory 21.

The TLB physical page memory 22 includes TLB physical page memories, each of which is attached to each way. Each data in each TLB physical page memory 22 is designated by a virtual page index EP_Index.

Data in the TLB physical page memory 22, that is, physical page numbers RP, are associated with both the respective ways of the TLB virtual page memory 21 and the virtual page indexes EP_Index, and a virtual address space is managed in units of 4 KB per page.

Data in the TLB physical page memory 22 are used in the case of a cache miss and a TLB miss. The TLB physical page memory 22 outputs four physical address page bits (39:12) for the respective ways.

The data memory 23 includes data memories, each of which is attached to each way. Each data memory 23 manages cache data in units of, for example, 128 bytes. Data in each data memory 23 is designated by 9 bits (a virtual page index and a page offset) (15:7) and a block offset (6:2) in a virtual address 31 as a cache index.

Replacement of cache data from the CPU 11, that is, loading or storage to the data memory 23 is performed in word size (units of 32 bits). Data replacement via a system bus is performed by cache line size.

An output of each data memory 23 is input to a relevant 32-input, 1-output multiplexer (32:1 MUX) 23a. A plurality of the multiplexers 23a (here, four multiplexers 23a), each of which is selector, are provided in association with the respective data memories. A multiplexer 23a selects and outputs cache data in a block selected by a block offset (6:2) from among the data selected by a virtual page index and a page offset.

A cache state memory (hereinafter also referred to as "state memory") 24 includes cache state memories, each of which is attached to each way. Data in each cache state memory 24 is designated by 9 bits (15:7) in a virtual address EA. The cache state memory 24 is a memory for managing the state of the cache on a cache line basis (cache block basis).

In order to allow multitasking, the cache state memory 24 stores data for the states of the cache blocks based on, for example, the MESI protocol. In the case of the MESI protocol, data in the M (Modified), E (Exclusive), S (Shared) and I (Invalid) states are stored. For the MESI protocol, see "5.3.2. A Four-State (MESI) Write-Back Invalidation Protocol" (p. 299), and Figure 5.15 (p. 301) by David E. Culler, Jaswinder P. Singh and Anoop Gupta, Parallel Computer Architecture—A Hardware/Software Approach—, Morgan Kaufmann, 1999, ISBN 1-55860-343-3, which is mentioned above.

Output data from the cache state memory 24 is data indicating the state of each data in the data memory 23, that is, data indicating, e.g., the validity/invalidity of the data, and the possibility/impossibility of a read. The output data is input to a control circuit (not illustrated) and used.

The TLB physical page CAM 25 includes TLB physical page CAMs (Content Addressable Memories), each of which is attached to each way. Data in each TLB physical page CAM includes a physical page number and valid state information.

The TLB physical page CAM 25 stores data for physical page numbers in association with the respective ways of the TLB virtual page memory 21 and virtual page indexes. Data is registered in the TLB physical page CAM 25 when data is registered in the TLB virtual page memory 21.

The TLB physical page CAM 25 is used for a reverse search for a virtual page from a physical page and an alias check upon occurrence of a TLB miss in order to maintain the data coherency with another processor. Also, a physical page RP registered in the TLB physical page CAM 25 is the same as a physical page RP in the TLB physical page memory 22, which has an entry number corresponding to the physical page RP registered in the TLB physical page CAM 25. The access frequencies of the TLB physical page CAM 25 and the TLB physical page memory 22 are much lower than that of the TLB virtual page memory 21, and thus, the function of the TLB physical page memory 22 may be included in the TLB physical page CAM 25.

The alias problem is a problem that when a virtual address is used for an L1 cache, which is larger than the page size, if a same physical address is allocated to another virtual address, data existing in the cache may be dealt with as data for a different address, causing data incoherency.

There have been two conventional methods for preventing this problem. In one method, upon occurrence of a TLB miss, all the entries that may cause an alias are checked, and if the physical addresses of entries correspond to each other, all the cache lines belonging to a relevant virtual page are flashed.

In the other method, a plurality of pages are arranged to create an address space using, for example, software that manages virtual addresses such as an OS (in the above example, 16 4-KB pages are arranged to create an area of 256 KB/4 ways=64 KB) to prevent occurrence of aliases by means of software, which is called page coloring.

However, in either case, when the same page is shared by a plurality of processes, it is necessary that simultaneously with replacement of a TLB entry as a result of occurrence of a TLB miss, data belonging to a page used in an old process be once totally invalidated in the cache, and then reloaded using a new TLB entry.

In particular, in the alias problem, although programming is performed with the intension to share data between a plurality of processes, shared data is once invalidated in the cache, and data that is entirely the same as the shared data is loaded to the cache using a new virtual address. Consequently, the relevant process and the entire system suffer deterioration in performance, resulting in a power consumption increase.

Also, physical addresses output to the bus connected to the DRAM 13 are monitored by means of what is called snooping, and input to the TLB physical page CAM 25. When a physical address having a same physical page number as that registered in the TLB physical page CAM 25 is detected from among the monitored, that is, input physical addresses, state data in the cache state memory 24 for a same entry number as that of the TLB physical page CAM 25 is changed. In other words, as a result of employing a cache coherency mechanism using snooping, the consistency of the state data in the cache state memory 24, which indicate the states for all the cache lines having a same physical address, can be maintained. Also, when it is necessary to output data from the cache according to a coherence protocol, e.g., when the cache have data newer than data recorded in the DRAM 13 as a result of snooping like in a "Modified" state according to the MESI protocol, data in the data memory 23 indicated by a same entry number as that in the TLB physical page CAM 25 is accessed to output the data to the bus. As described above, the TLB physical page CAM 25 is used for processing for coherency maintenance.

Also, when a TLB miss occurs during execution of a plurality of processes, the aforementioned alias problem may occur, and thus, the TLB physical page CAM 25 is used when a TLB physical page memory miss occurs.

Outputs of the TLB physical page memory 22, the multiplexers 23a and the cache state memory 24 are input to respective 4-input, 1-output multiplexers (4:1 MUX) 22b, 23b and 24b. The respective multiplexers 22b, 23b and 24b, which are selectors, select and output data selected according to a way number from the TLB virtual page memory 21.

In the present embodiment, the CPU 11 is configured to retrieve data in a data width of 32 bits, but any data width that is equal to or smaller than the cache line size may be employed depending on the specifications of the processor core.

Next, operations of the cache memory 12 will be described. The description below is given in terms of a memory access request from the processor and a snoop response to the memory access request, which are equivalent to those according to a coherency control protocol used in a processor for a commercially-available multiprocessor, for example, the IBM PowerPC 970 FX RISC Microprocessor. For the IBM PowerPC 970 FX RISC Microprocessor, see IBM PowerPC 970 FX RISC Microprocessor User's Manual Version1.7 (which can be obtained as of Sep. 30, 2009 from the following URL: https://www-01.ibm.com/chips/techlib/techlib.nsf/products/PowerPC_970MP_Microprocessor) as a reference.
(Memory Read Operation)

Figure 3:
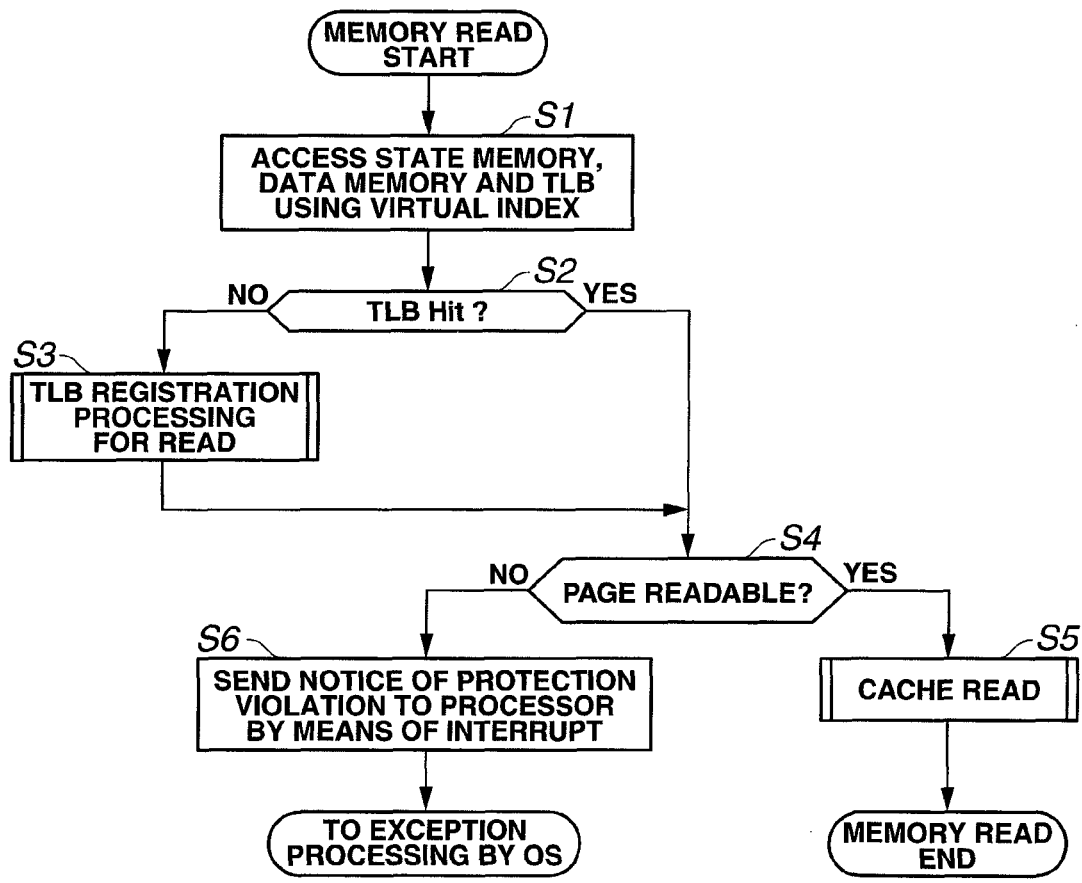
FIG. 3 is a flowchart illustrating processing for a memory read according to a present embodiment.
Figure 4:
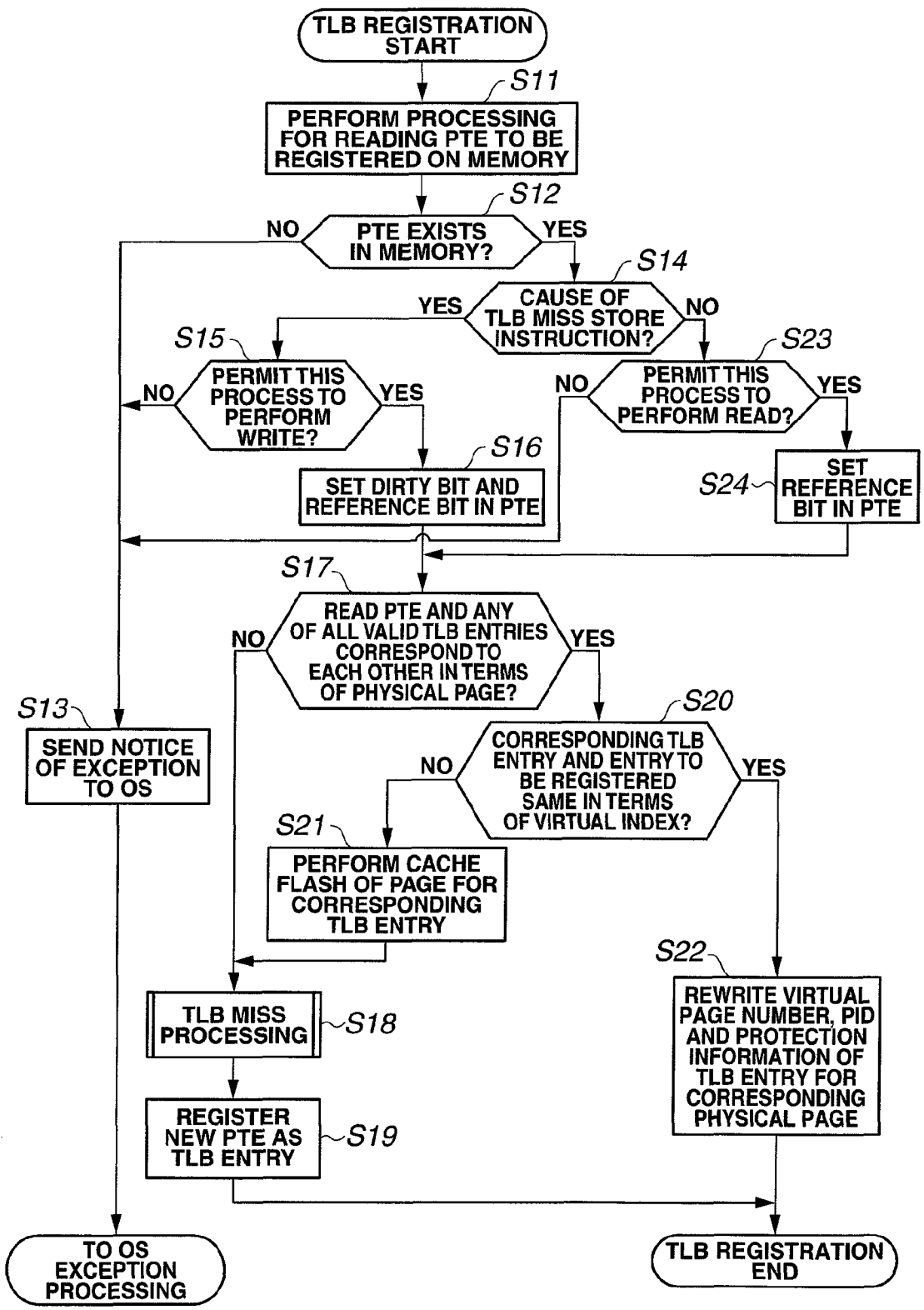
FIG. 4 is a flowchart illustrating TLB registration processing according to a present embodiment.
Figure 5:
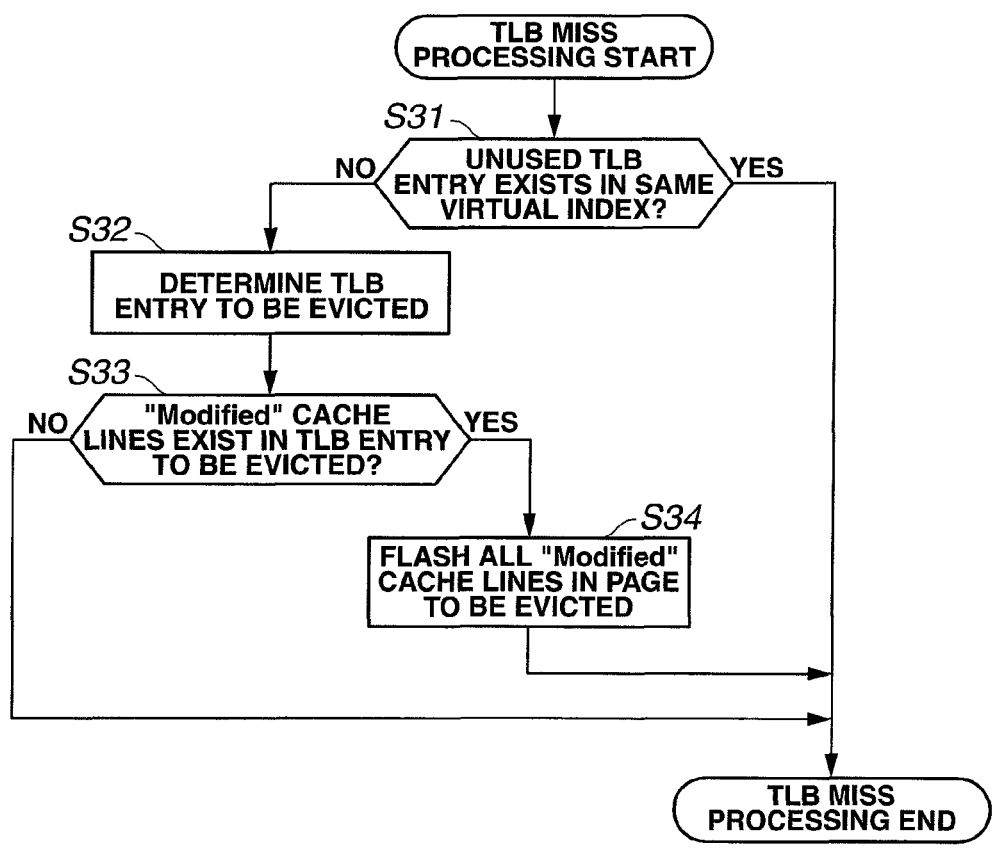
FIG. 5 is a flowchart illustrating TLB miss processing according to a present embodiment.
Figure 6:
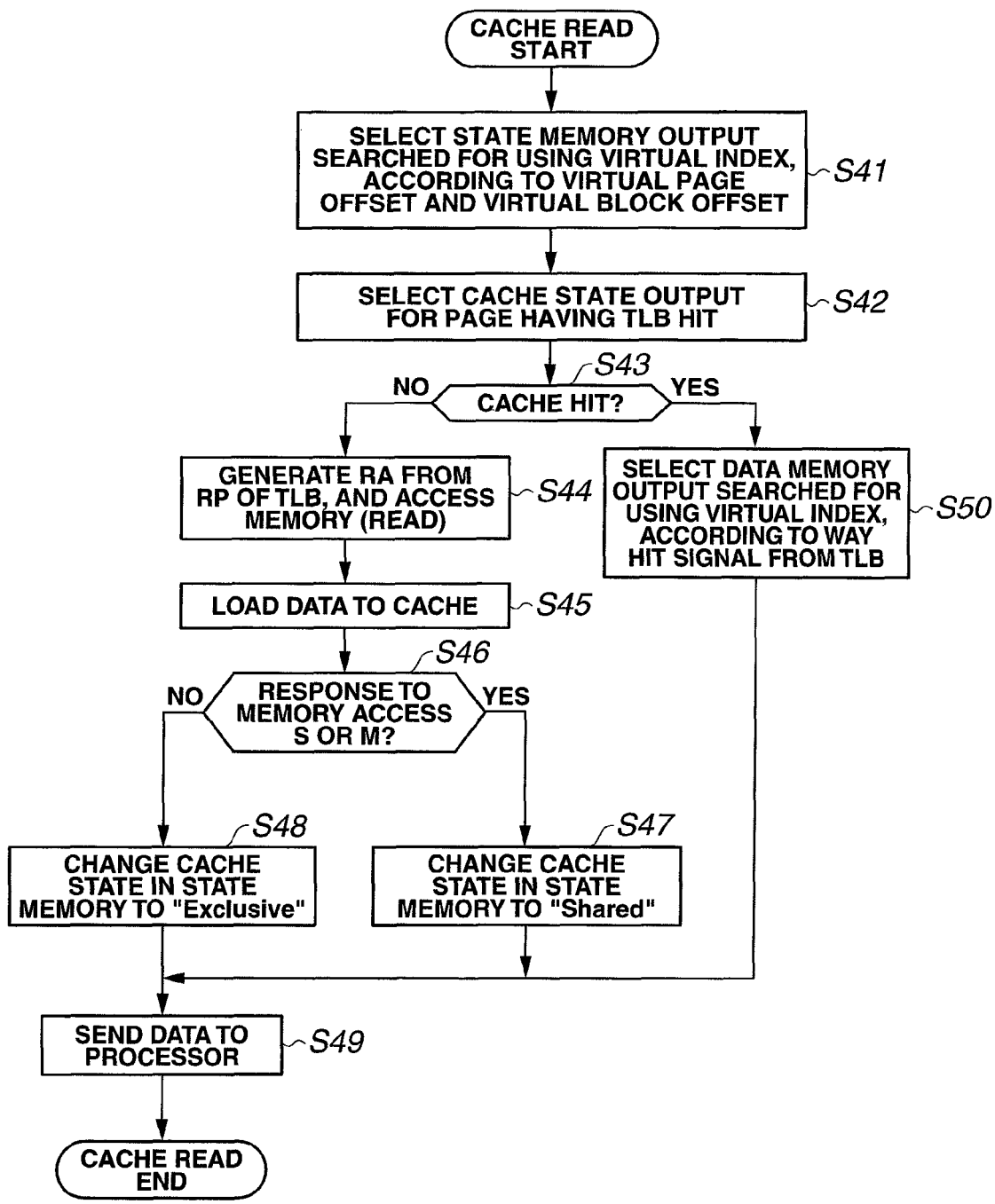
FIG. 6 is a flowchart illustrating processing for a cache read according to a present embodiment.

FIG. 3 is a flowchart illustrating processing for a memory read. FIG. 4 is a flowchart illustrating TLB registration processing. FIG. 5 is a flowchart illustrating TLB miss processing. FIG. 6 is a flowchart illustrating processing for a cache read.

First, the overall processing in the processor system 1 will be described using FIGS. 3 to 6.

As illustrated in FIG. 3, when a memory read operation is started, the TLB virtual page memory 21, the data memory 23 and the state memory 24 are accessed using a virtual index (S1). If there is no hit in the TLB virtual page memory 21 (S2: NO), TLB registration processing for a read is executed (S3). If there is a TLB hit (S2: YES), whether or not the virtual page is readable is determined (S4). If the virtual page is readable (S4: YES), a cache read is performed (S5). If the virtual page is not readable (S4: NO), a notice of a protection violation is sent to a CPU 11 by means of interrupt processing (S6), and exception processing is performed by the OS.

As illustrated in FIG. 4, when TLB registration processing is started, processing for reading a PTE (page table entry) to be registered is performed on the DRAM 13 (S11). Whether or not the PTE (page table entry) to be read exists in the DRAM 13 is determined (S12). If the PTE does not exist (S12: NO), a notice of occurrence of an exception is sent to the OS (S13).

If the PTE exists (S12: YES), whether or not the cause of the TLB miss is a store instruction is determined (S14).

If the cause is not a store instruction (S14: NO), whether or not to permit this process to perform a read is determined (S23). If the process is not permitted to perform a read (S23: NO), the processing advances to S13. If the process is permitted to perform a read (S23: YES), a reference bit in the PTE is set (S24), and the processing advances to S17.

Then, whether or not the read PTE and any of all the valid TLB entries correspond to each other in terms of physical page number is determined (S17). If the physical page numbers do not correspond to each other (S17: NO), TLB miss processing is executed (S18), and a new PTE is registered as a TLB entry (S19).

On the other hand, if the physical page numbers correspond to each other (S17: YES), whether or not the corresponding TLB entry and the entry to be registered are the same in terms of virtual index is determined (S20). If the virtual indexes are not the same (S20: NO), cache flash is performed for the page for the corresponding TLB entry (S21), and the processing advances to S18.

If the virtual indexes are the same (S20: YES), the virtual page number, the process number and the protection information of the TLB entry having the corresponding physical page number are rewritten (S22).

As illustrated in FIG. 5, when TLB miss processing is started, whether or not an unused TLB entry exists in the same virtual index is determined (S31). If an unused TLB entry exists (S31: YES), the processing is ended.

If no unused TLB entry exists (S31: NO), a TLB entry to be evicted is determined (S32), and whether or not "Modified" cache lines exist in the TLB entry to be evicted is determined (S33). If no "Modified" cache lines exist (S33: NO), the processing is ended.

If "Modified" cache lines exist (S33: YES), all the "Modified" cache lines that exist in the page to be evicted are flashed (S34), and the processing is ended.

As illustrated in FIG. 6, when cache read processing is started, an output of the state memory 24 searched for using the virtual index is selected according to a virtual page offset and a block offset (S41), and a cache state output for the page having a TLB hit is selected (S42) and whether or not there is a cache hit is determined (S43). If there is no cache hit (S43: NO), a physical address is generated from the physical page number in the TLB to issue a memory access request (S44). This memory access request is similar to a request processed in a Read transaction or BusRd transaction in a PowerPC 970 FX processor. See the PowerPC 970 FX Read transaction section in IBM PowerPC 970 FX RISC Microprocessor User's Manual Version 1.7, which is mentioned above, and BusRd transaction in Figure 6.5 in Parallel Computer Architecture—A Hardware/Software Approach—, which is also mentioned above.

Then, the obtained data is loaded to the cache memory (S45).

The memory access request is snooped by the memory and other processors. Each of the processors that have snooped the memory access request checks the cache state managed by the processor itself, and if the cache state is "Modified", the processing returns a "Modified" response as a snoop response, and if the cache state is "Exclusive" or "Shared", returns a "Shared" response, and thus, the processor that has output the request updates the state data in the cache state memory 24 according to the snoop response. In other words, if the snoop response is a "Shared" response or a "Modified" response (S46: YES), the state of the request target cache line in the cache state memory 24 is changed to "Shared" (S47), and if the snoop response is neither a "Shared" response nor a "Modified" response (S46: NO), the state of the request target cache line is changed to "Exclusive" (S48). Then, the data is sent to the CPU 11 (S49).

If there is a cache hit (S43: YES), an output of the data memory searched for using the virtual index is selected according to a way number from the TLB (S50), and the processing advances to S49. When there is a cache hit, no memory access request is issued, and the cache state is not updated.

(Memory Write Operation)

Figure 7:
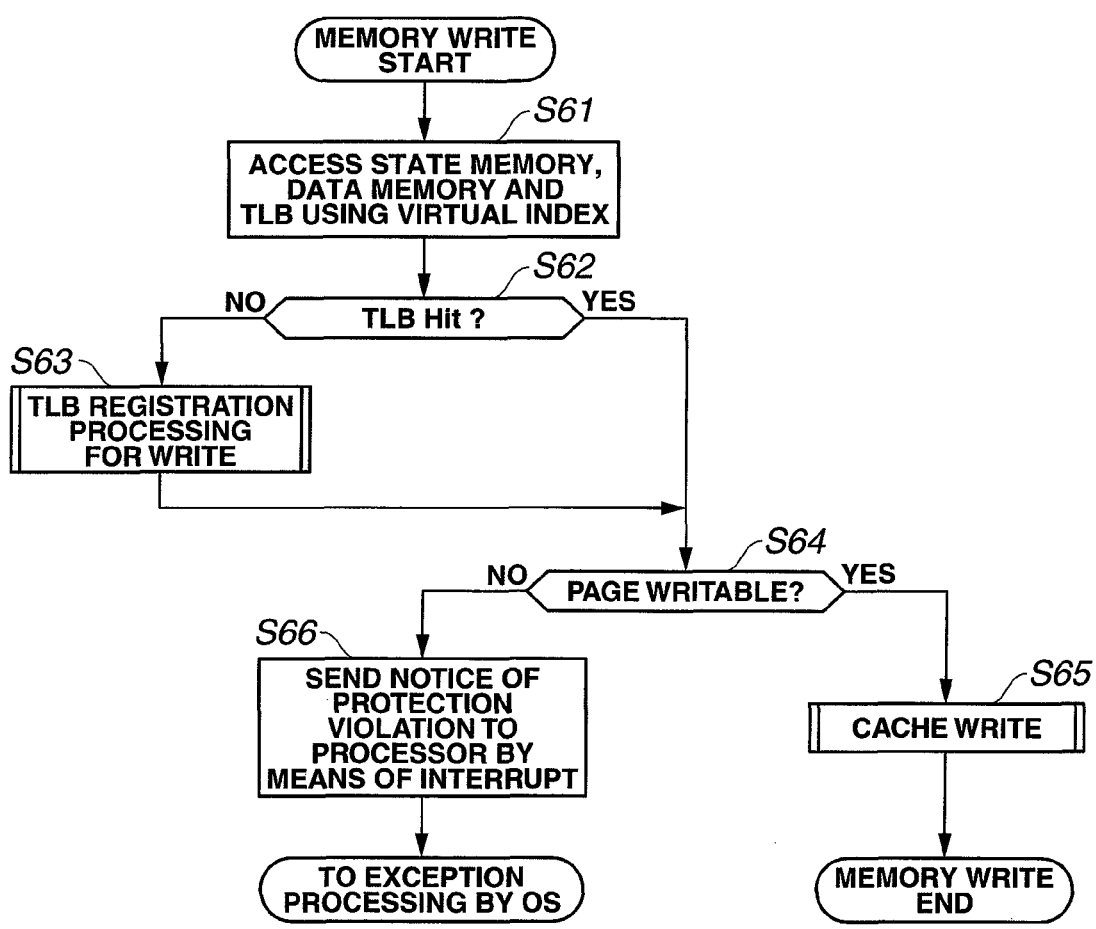
FIG. 7 is a flowchart illustrating processing for a memory write according to a present embodiment.
Figure 8:
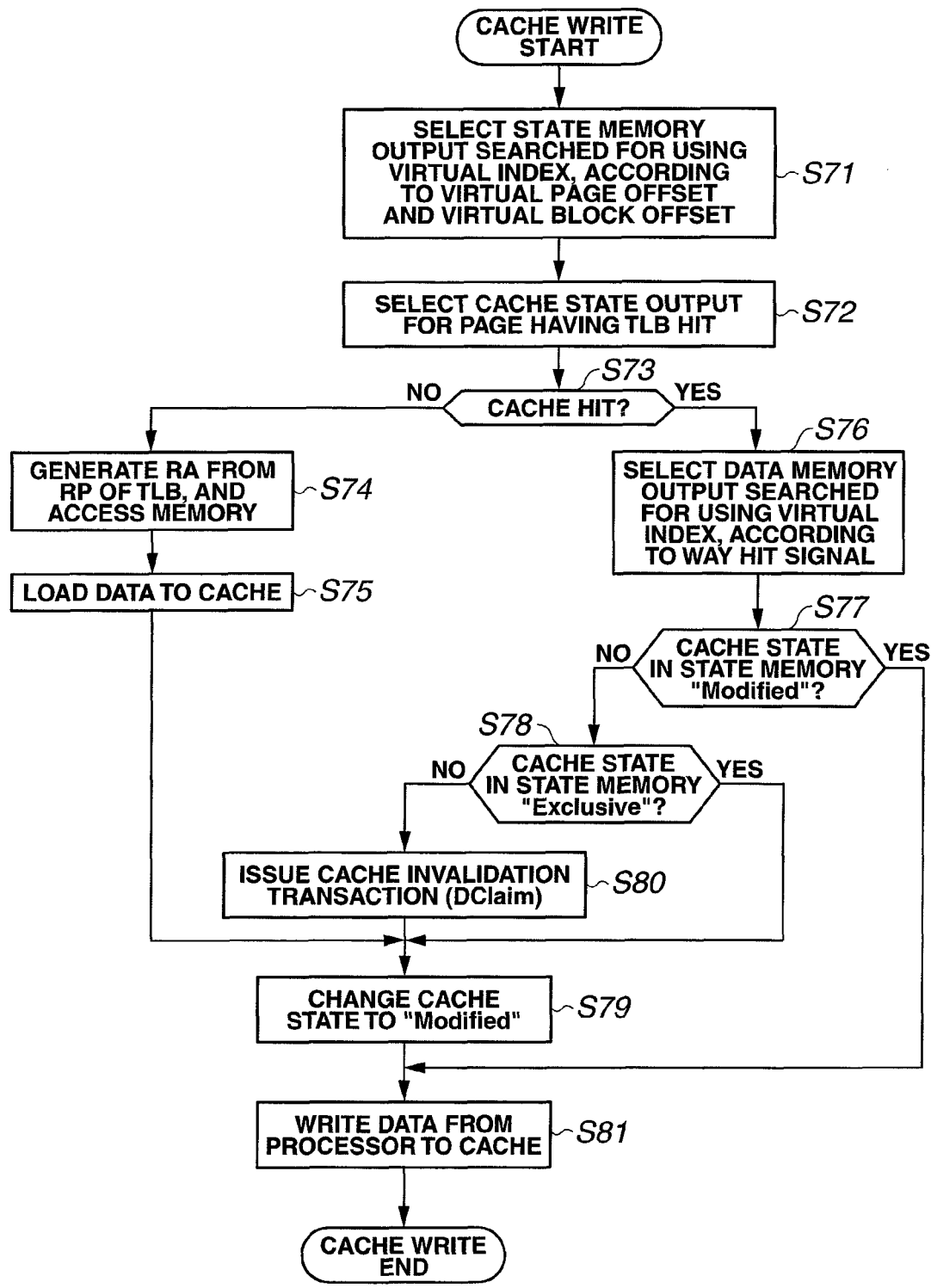
FIG. 8 is a flowchart illustrating processing for a cache write according to a present embodiment.

FIG. 7 is a flowchart illustrating processing for a memory write. FIG. 8 is a flowchart illustrating processing for a cache write.

As illustrated in FIG. 7, when a memory write is started, the TLB virtual page memory 21, the data memory 23 and the state memory 24 are accessed using a virtual index (S61). If there is no hit in the TLB virtual page memory 21 (S62: NO), TLB registration processing for a write is performed (S63). If there is a hit in the TLB (S62: YES), the case is determined as a case of a TLB hit, and whether or not the relevant virtual page is writable is determined (S64). If it is writable (S64: YES), a cache write is performed (S65). If it is not writable (S64: NO), a notice of a protection violation is sent to the CPU 11 by means of interrupt processing (S66), and exception processing is performed by the OS.

As illustrated in FIG. 4, when TLB registration processing is started, processing for reading a PTE to be registered is performed on the DRAM 13 (S11). Whether or not the PTE to be read exists in the DRAM 13 is determined (S12). If the PTE does not exist (S12: NO), a notice of occurrence of an exception is sent to the OS (S13).

If the PTE exists (S12: YES), whether or not the cause of the TLB miss is a store instruction is determined (S14). If the cause is a store instruction (S14: YES), whether or not to permit this process to perform a write is determined (S15). If the process is not permitted to perform a write (S15: NO), the processing advances to S13.

If the process is permitted to perform a write (S15: YES), a reference bit and a dirty bit in the PTE are set (S16).

Then, whether or not the read PTE and any of all the valid TLB entries correspond to each other in terms of physical page number is determined (S17). If the physical page numbers do not correspond to each other (S17: NO), TLB miss processing is executed (S18), a new PTE is registered as a TLB entry (S19).

On the other hand, if the physical page numbers correspond to each other (S17: YES), whether or not the corresponding TLB entry and the entry to be registered are the same in terms of virtual index is determined (S20). If the virtual indexes are not the same (S20: NO), cache flash is performed for the page for the corresponding TLB entry (S21), and the processing advances to S18.

If the virtual indexes are the same (S20: YES), the virtual page number, the process number and the protection information of the TLB entry having the corresponding physical page number are rewritten (S22).

The TLB miss processing is similar to the above-described operation for a memory read.

As illustrated in FIG. 8, when cache write processing is started, an output of the state memory 24 searched for using the virtual index is selected according to a virtual page offset and a block offset (S71), and a cache state output for the page having a TLB hit is selected (S72).

Then, whether or not there is a cache hit is determined (S73). If there is no cache hit (S73: NO), a physical address is generated from the physical page number in the TLB to issue a memory access request (S74). In this case, the output memory access request is a "Memory read request for invalidating other cache lines", for example, RWITM or BUSRdx. The memory access request is snooped by the memory and other processors. A processor that has snooped the memory access request checks the cache state managed by the processor itself, and if the cache state is "Modified", the processor outputs a "Modified" response as a snoop response, and changes the cache state to "Invalid", and outputs data in the request target cache line to the requestor processor. Here, the memory cancels read access to the request target cache line and data output to the requestor processor. If the cache state is "Exclusive" or "Shared", the processor returns a "Shared" response, and changes the cache state to "Invalid". The data in the request target cache line is output by the memory to the requestor processor. Then, the obtained data is loaded to the cache memory (S75), and the data received from the CPU 11 is written over the cache data. The processor that has output the request updates the state data in the cache state memory 24 in response to the snoop response. Furthermore, the processor that has output the memory read request (RWTIM or BusRdX) updates the state of the request target cache line in the cache state memory 24 to "Modified" (S79).

If there is a cache hit (S73: YES), an output of a data memory searched for using a virtual index is selected according to a way number from the TLB (S76), and the processing advances to S77. If the cache state is "Modified" (S77: YES), the cache state is not changed. If the cache state is "Exclusive" (S78), the cache state is changed to "Modified" (S79). If the cache state is "Shared" (S78: NO), the processor issues a cache line invalidation transaction (DClaim) (S80). Then, when the processor invalidates a cache in the other processors and receives a snoop response, the processor changes the cache state to "Modified" (S79). When the cache state is changed to "Modified", the data from the processor is written to the cache (S81). This cache line invalidation transaction is similar to a request dealt with in a DClaim transaction in a PowerPC 970FX or a BusRdX transaction.

See PowerPC 970FX's DClaim transaction in IBM PowerPC 970FX RISC Microprocessor User's Manual Version 1.7, and BusRdX transaction in Parallel Computer Architecture—A Hardware/Software Approach—, which have been mentioned above as references.

Next, operations of the cases of a TLB hit and a TLB miss will be described with reference to FIG. 2.

(Case of TLB Hit)

First, a virtual address EA and a process number PID are input from the CPU 11 to the cache memory 12. In the TLB virtual page memory 21, data in the respective ways are selected using a virtual page index (15:12) in the input virtual address. Then, the input process number and a virtual page tag (31:12) in the input virtual address are compared respectively with a process number and a virtual page of each of the selected data in the TLB virtual page memory 21, and if the input process number and the virtual page tag correspond to a process number and a virtual page in the TLB virtual page memory, the TLB virtual page memory 21 outputs a corresponding way number WN from a comparator 21a as a hit signal. If the input process number and the virtual page tag do not correspond to any process number and virtual page in the TLB virtual page memory, a non-hit signal indicating non-correspondence is output.

Here, each virtual page EP in the TLB virtual page memory 21 includes a virtual page index EP_Index because the virtual page index EP_Index is used as a virtual tag.

The TLB physical page memory 22 selects a page number for a physical address using the virtual page index EP_Index (15:12) in the input virtual address. Except when a cache miss occurs or other caches are invalidated, physical page information held in the TLB physical page memory 22 is not used, and thus, an arrangement in which access to the TLB physical page memory 22 is started when information in the TLB physical page memory 22 become necessary may be provided.

In the data memory 23, data in a cache block is selected using 9 bits (15:7) and a block offset (6:2) in the 31-bit virtual address. In other words, the multiplexers 23a select one data (32 bits) in one block, that is, one line (128 bytes) using the block offset (6:2) in the input virtual address. Accordingly, four cache block data are output from the four ways of the data memory 23, and four data (each having 32 bits) corresponding to the four ways are output from the multiplexers 23a.

Also, the cache state memory 24 selects state data of cache blocks (cache state data) in the respective ways using the 9 bits (15:7) in the virtual address and output the state data.

Accordingly, when there is memory read access to the DRAM 13 from the CPU 11 as a processor core, the following operation is performed.

First, the TLB virtual page memory 21 is accessed using a virtual page index EP_Index (15:12) in a virtual address as a TLB index. In the TLB virtual page memory 21, an entry whose virtual address (31:16) and process number correspond to a process number and the virtual page index EP_Index (15:12) from the CPU 11 are searched for according to the TLB index.

The TLB virtual page memory 21 outputs information of whether or not there is a way including the corresponding entry, and if there is, outputs a way number WN for the entry. If there is no corresponding entry, the access is dealt with as a TLB miss.

Hereinafter, the case where there is a corresponding entry will be described. Using bits (15:7) in the 31-bit virtual address as a cache index, the data memory 23, which is the L1 cache, is accessed. Then, a block offset (6:2) is input to the multiplexers 23a and data from the respective ways are output. In the configuration of the present embodiment, 32 bit-width data is delivered to the CPU 11, and thus, using the block offset (6:2), one 32 bit-width data is selected by the multiplexers 23a from the outputs of the respective ways.

Using a way number WN output from the TLB virtual page memory 21, only data in a way having a hit is selected by the multiplexer 23b, which is a selector, and output.

Then, also using the way number WN output from the TLB virtual page memory 21, the state memory 24 selects and outputs data in the way having a hit only, by means of the multiplexer 24b, which is a selector, (S42 in FIG. 6) simultaneously with the output of the data from the data memory 23.

If the state output from the state memory 24 (cache state) is a state other than "Invalid", the data output from the data memory 23, which is the L1 cache, can be used (S47) and thus, is output to the CPU 11 (S49). If the state (cache state) is "Invalid", a cache miss processing operation will be performed (S44).

As described above, if there is a hit in both of the TLB and the cache, the processing can be proceeded using a virtual address EA only. In other words, if there is a hit in both of the TLB and the cache, there is no need to use the TLB physical page memory 22.

Next, the case of a cache miss will be described.

If a cache miss occurs when there is a TLB hit, the following operation is added. The case where a cache miss occurs when there is a TLB hit means the case where although there is a TLB hit, the cache state is "Invalid", requiring data for the cache to be read from the DRAM 13.

The TLB physical page memory 22 is accessed using a virtual page index EP_Index (15:12) in a virtual address as an index. Since the TLB physical page memory 22 is of a 4-way set associative type, the TLB physical page memory 22 outputs four physical page numbers.

The multiplexer 22b selects one from the output physical page numbers using a way number WN from the TLB virtual page memory 21.

Lower-order bits (11:0) in the virtual address, which is a target of a read request from the CPU 11 is combined with the selected physical page number (39:12) to generate a physical address RA (39:0), and the read request is sent to the DRAM 13 (S44). The obtained data is written to a relevant area in the data memory 23 (S45).

(Case of TLB Miss)

The following operation is added when there is a TLB miss.

A PTE for the relevant virtual page is loaded from the DRAM 13 (S11 in FIG. 4). Then, the physical page number is input to the TLB physical page CAM 25, and whether or not a same physical page number as the physical page number exists is checked.

If there is no same physical page number, the following registration processing is performed (S17 onward). In other words, a virtual page number is obtained from the read PTE and data registration is performed for the TLB virtual page memory 21, the TLB physical page memory 22 and the TLB physical page CAM 25 (S18 in FIG. 4 and S31 in FIG. 5).

If there is the same physical page number (that is, if there is an alias), the following processing is performed.

Since the same physical page number exists in the TLB physical page CAM 25, the TLB physical page CAM 25 outputs virtual page index EP_Index and a way number WN for the same physical page number.

If the output virtual page index EP_Index corresponds to a virtual page index EP_Index of the virtual page number obtained from the PTE, the following rewrite is performed for the corresponding entry (S22).

First, the TLB virtual page memory 21 rewrites a process number PID and a virtual page EP, and sets a relevant reference bit (R). Then, other necessary information change is also performed.

No rewrite is performed for the TLB physical page memory 22 and the TLB physical page CAM 25 since their physical page numbers correspond to each other.

No rewrite is also performed for the cache state memory 24 and the data memory 23 since the cache state memory 24 and the data memory 23 take over the content of the cache.

On the other hand, if the output virtual page index EP_Index does not correspond to the virtual page index EP_Index of the virtual page number obtained from the PTE, following processing is performed (S21).

An entry corresponding to the virtual page index EP_Index and the way number WN output from the TLB physical page CAM 25, that is, one TLB entry causing an alias is invalidated. Invalidation processing includes cache flash of a relevant virtual page.

Furthermore, the other TLB entry causing the alias is also invalidated. This invalidation processing also includes cache flash of a relevant virtual page.

When the invalidation of the above two TLB entries has been finished, predetermined registration processing is performed for the TLB entry obtained from the PTE.

More specifically, a process number PID and a virtual page EP are registered in the TLB virtual page memory 21. Furthermore, a dirty (D) bit in the PTE is written, and a relevant valid (V) bit and reference (R) bit are set.

Then, in the TLB physical page CAM 25, a physical page RP is written to the TLB entry and a valid (V) bit is set. Furthermore, in the TLB physical page memory 22, the physical page RP is written to the TLB entry.

Also, if there is no same physical page number (that is, if there is no alias), the following processing is performed (S18 in FIG. 4 and S32 in FIG. 5).

Invalidation of the TLB entry obtained from the PTE is performed. The invalidation processing includes cache flash of a relevant virtual page.

When the invalidation has been finished, predetermined registration processing is performed for the TLB entry obtained from the PTE (S19).

More specifically, a process number PID and a virtual page EP are registered in the TLB virtual page memory 21. Furthermore, a dirty bit in the PTE is written, and a relevant valid (V) bit and reference (R) bit are set.

Then, in the TLB physical page CAM 25, a physical page RP is written to the TLB entry and a valid (V) bit is set. Furthermore, in the TLB physical page memory 22, the physical page RP is written to the TLB entry.

Next, cache snooping will be described. Cache snooping is performed by a snooper, which is a hardware circuit, as described below. The snooper monitors addresses and data in the bus between the cache memory 12 and the DRAM 13.

The TLB physical page CAM 25 and the state memory 24, which are used for snooping, are used for both TLB registration and access from the CPU 11.

When a coherent transaction flows in the bus, a detected physical address (39:12) is input to the TLB physical page CAM 25, and whether or not a corresponding virtual page (EP) is registered in the TLB virtual page memory 21 is checked.

If there is a corresponding virtual page EP, a virtual page index EP_Index and a way number WN in the TLB virtual page memory 21 can be obtained.

If there is no corresponding virtual page in the TLB virtual page memory 21, the data does not exist in the L1 cache, and no subsequent processing is performed for snooping.

If there is a corresponding virtual page, the obtained virtual page index and way number are input to the cache state memory 24 to check the cache state. Predetermined processing is performed according to the obtained cache state and the transaction type.

Although in the present embodiment, the TLB physical page CAM 25 and the TLB physical page memory 22 are configured as separate memories, the TLB physical page CAM 25 and the TLB physical page memory 22 may be configured to be included in a same physical memory since they are not accessed except the following three cases: (1) a cache miss (only the TLB physical page memory 22 is accessed); (2) a TLB miss (the TLB physical page CAM 25 is accessed for alias check, and in registration of a new TLB entry, the new TLB entry is registered in the TLB physical page CAM 25 and the TLB physical page memory 22); and (3) snooping (only the TLB physical page CAM 25 is accessed).

In a virtual address cache memory according to the present embodiment, a memory space shared by a plurality of processes executed by different processors has no restrictions on virtual address pages.

Furthermore, although the present embodiment has been described in terms of a set associative cache, it should be understood that the present embodiment can be applied to a direct-mapped cache.

As described above, in a cache memory according to in the above-described embodiment, a cache state memory and a data memory each using a part of higher-order bits of a virtual address as an index are provided, enabling provision of a function of a TLB in a cache memory and solving the problem of aliases without requiring a conventional complex circuit configuration.

Next, task switching, a write-back of data, DMA processing and application to an L2 cache using the above-described cache memory configuration will be described.

1) Processing for Task Switching

Processing for task switching in a cache memory according to the present embodiment will be described.

In task switching, the TLB content may be rewritten depending on the software. In this case, a TLB entry and a physical address (hereinafter referred to as "former physical address") for a virtual address before task switching are invalidated, and thus, when data in the former physical address has been rewritten (that is, a dirty bit is set), writeback processing of the data is necessary for storing the latest data in the main memory.

However, if write-back processing of the data is performed during task switching, access to the DRAM 13 occurs, causing a problem in that responsiveness of the task switching deteriorates.

Therefore, in the present embodiment, when TLB rewrite processing is performed during task switching, rewrite processing for the TLB virtual page memory 21 and the TLB physical page memory 22 is performed, while a write-back of data in the data memory 23 and a rewrite of data in the TLB physical page CAM 25 are not performed.

Instead, specific flag data is set in the TLB rewrite processing, and subsequently, when first memory access occurs, if it is determined with reference to the specific flag data that a write-back is necessary, a write-back of data in the data memory 23 using the address (that is, the former physical address) written in the TLB physical page CAM 25 is performed.

Then, after the write-back, a rewrite to a physical address registered in the TLB physical page memory 22 (hereinafter, also referred to as "latter physical address") is performed for the TLB physical page CAM 25.

A detailed description will be given below.

Figure 9:
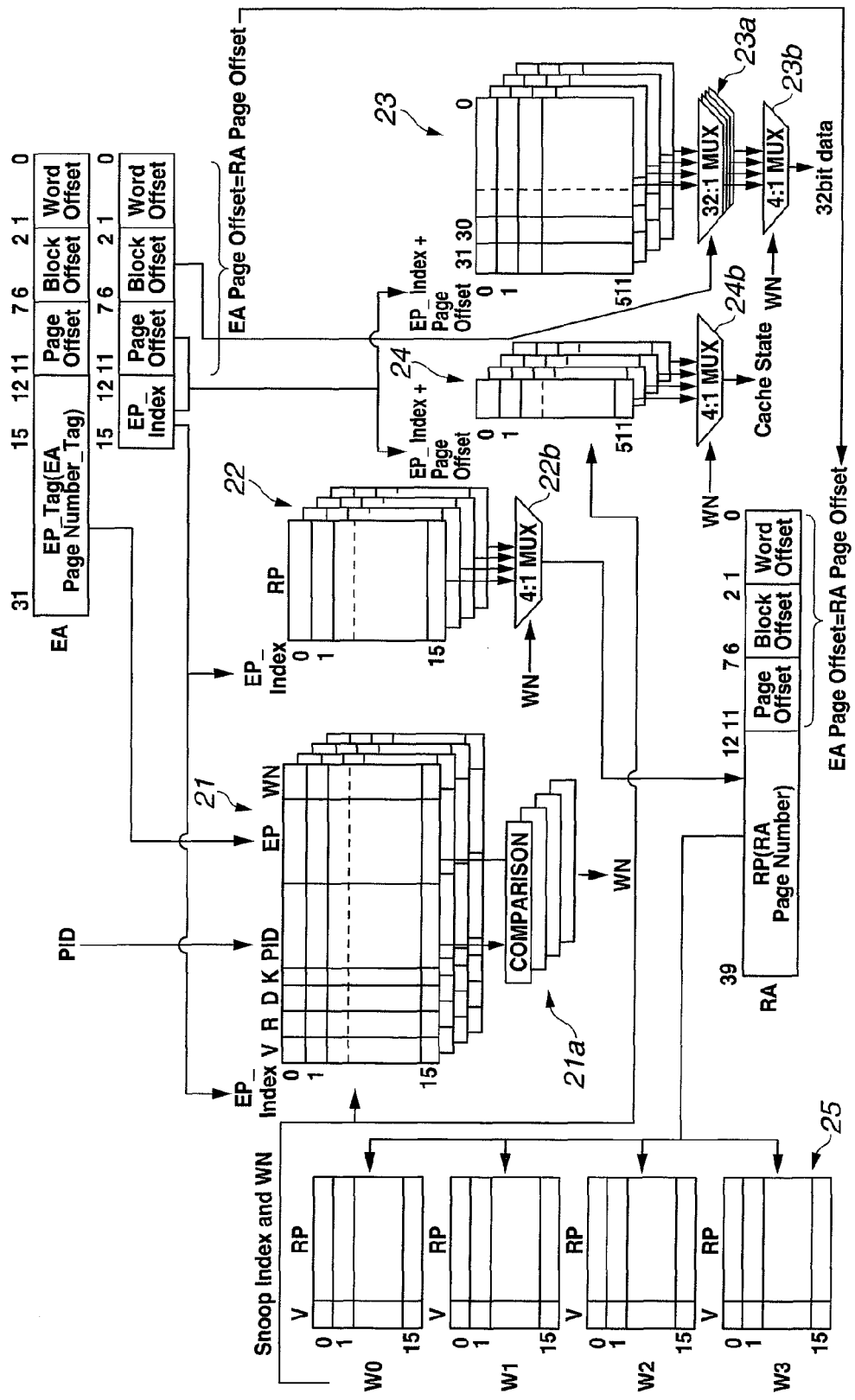
FIG. 9 is a configuration diagram of a cache memory including a configuration that reduces overhead for task switching according to a present embodiment.

FIG. 9 is a configuration diagram of a cache memory including a configuration that reduces overhead for task switching. In FIG. 9, components that are the same as those in FIG. 2 are provided with the same reference numerals and a description thereof will be omitted.

A TLB virtual page memory 21, which illustrated in FIG. 9, is configured to be capable of storing data indicating "old data cache state", for example, flag data, for respective pages. Here, an old data cache state flag K is set to "1" during TLB rewrite processing, and when first memory access occurs and write-back processing is completed, the old data cache state flag K is reset to "0".

Figure 10:
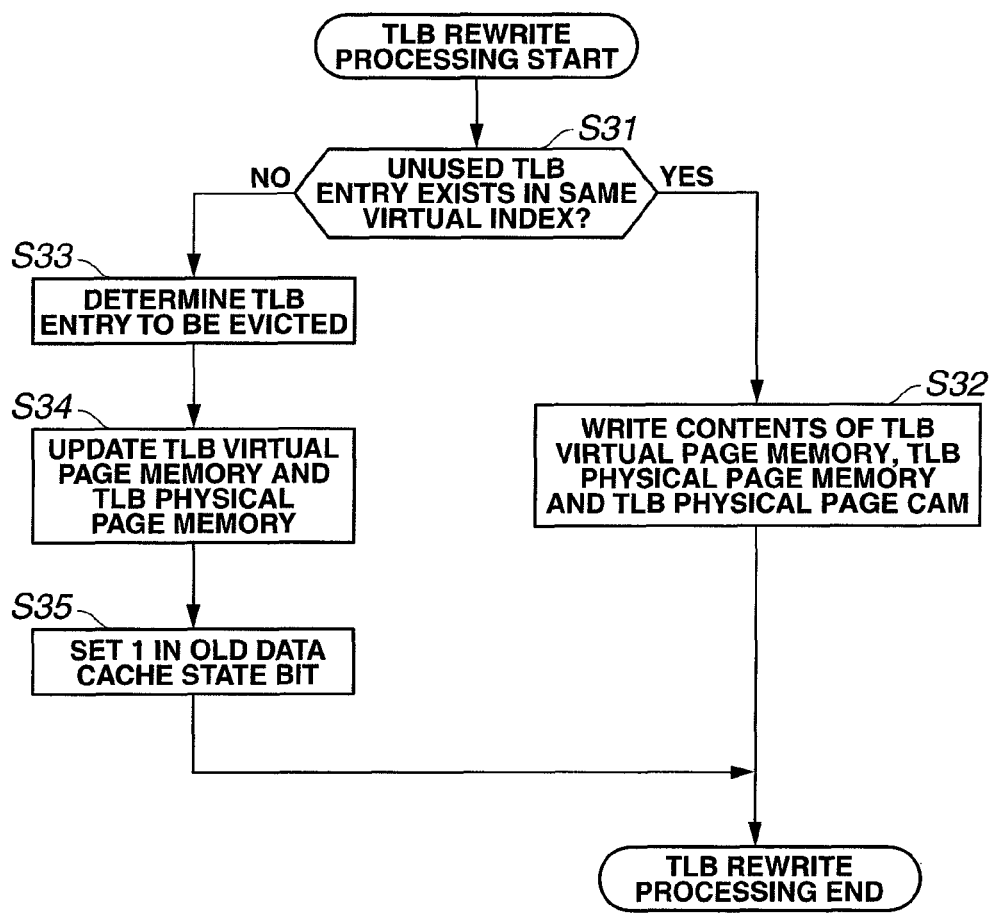
FIG. 10 is a flowchart illustrating TLB rewrite processing according to a present embodiment.

FIG. 10 is a flowchart illustrating TLB rewrite processing.

When TLB rewrite processing is started, whether or not an unused TLB entry exists in a same virtual index is determined (S31). If an unused TLB entry exists (S31: YES), the contents of a TLB virtual page memory 21, a TLB physical page memory 22 and a TLB physical page CAM 25 are written to the unused entry (S32), and the processing is ended.

If no unused TLB entry exists (S31: NO), a TLB entry to be evicted is determined (S33), and the contents of only the TLB virtual page memory 21 and the TLB physical page memory 22 are rewritten (S34).

Then, an old data cache state bit K in the TBL entry to be evicted is set to "1" (S35), and the processing is ended.

As described above, when a TLB rewrite is performed, an old data cache state bit K for a page for a TLB entry to be evicted is set to "1".

Figure 11:
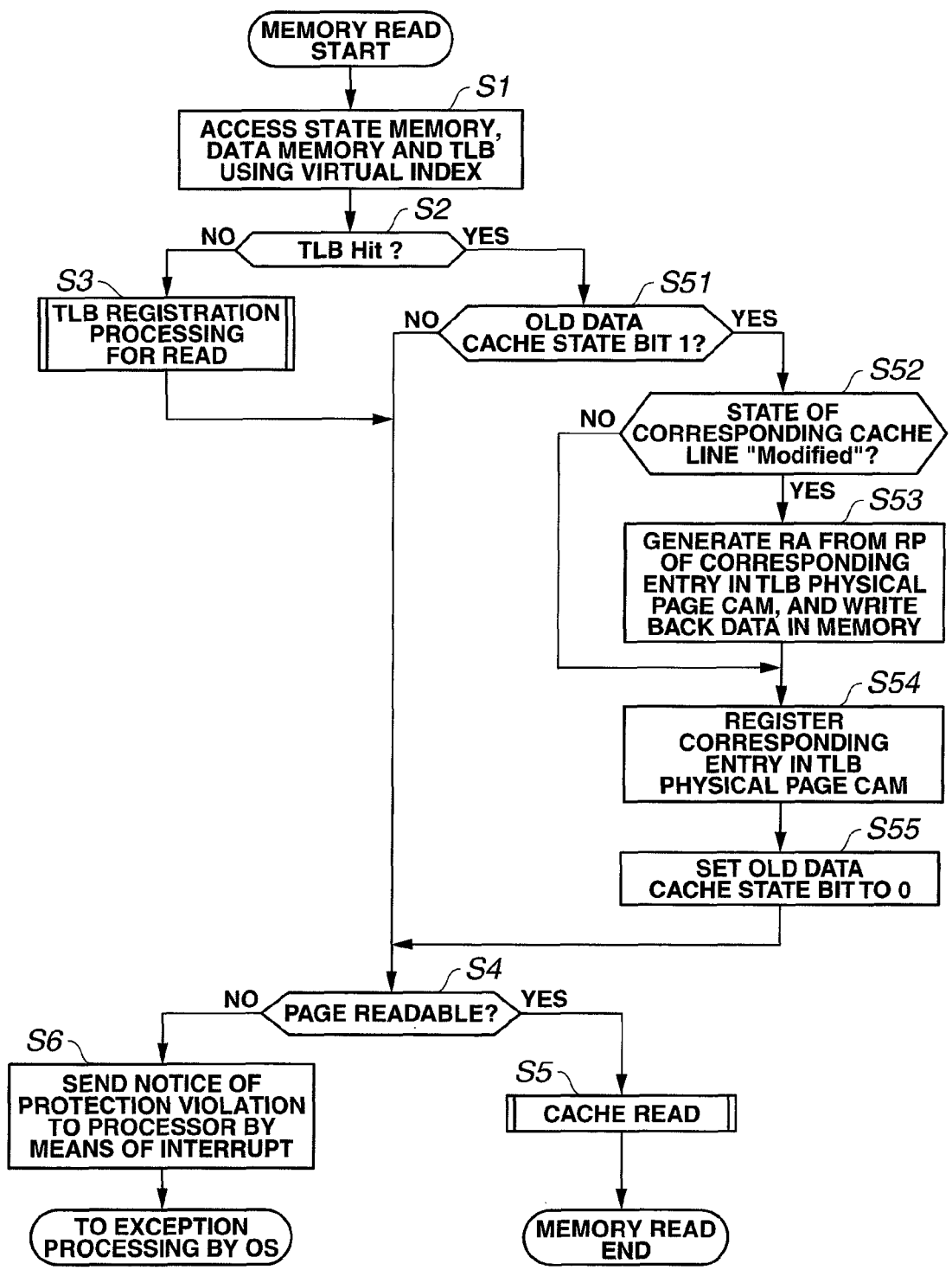
FIG. 11 is a flowchart illustrating processing for a memory read where a configuration that reduces overhead for task switching is employed, according to a present embodiment.

FIG. 11 is a flowchart illustrating processing for a memory read where a configuration that reduces overhead for task switching is employed. In FIG. 11, processing steps that are the same as those in FIG. 3 are provided with the same step numbers, and for FIG. 11, a description will be given mainly on differences from FIG. 3.

As illustrated in FIG. 11, when a memory read is started, a state memory 24, a data memory 23 and the TLB virtual page memory 21 are accessed using a virtual index (S1). If there is no hit in the TLB virtual page memory 21 (S2: NO), TLB registration processing for a read is performed (S3). If there is a TLB hit (S2: YES), whether or not an old data cache state bit K is "1" is determined (S51). If the old data cache state bit K is not "1", the processing moves to S4. If the old data cache state bit K is "1", whether or not the state of a cache line included in the page is "Modified" is determined (S52). If the state is not "Modified" (S52: NO), the process moves to S54. If there is a cache line whose state is "Modified" (S52: YES), a physical address RA is generated from a physical page RP of a corresponding entry in the TLB physical page CAM 25, write-back processing for data in the data memory 23 is performed (S53), and the process moves to S54. Furthermore, the physical page RP registered in the entry in the TLB physical page memory 22 relevant to the TLB hit is registered in an corresponding entry in the TLB physical page CAM 25 (S54), and the old data cache state bit K is set to "0" (S55). After the above-described operation, whether or not the virtual page is readable is determined (S4). If the virtual page is readable (S4: YES), a cache read is performed (S5). If the virtual page is not readable (S4: NO), a notice of a protection violation is sent to the CPU 11 by means of interrupt processing (S6), and exception processing is performed by the OS.

As described above, in task switching processing according to the present embodiment, when task switching occurs and TLB rewrite processing is performed, rewrite processing is performed for the TLB virtual page memory 21 and the TLB physical page memory 22, neither a write back of data in the data memory 23 nor a rewrite of data in the TLB physical page CAM 25 is performed. Subsequently, when there is first access from the CPU 11 to a virtual address subjected to a TLB rewrite, if there is rewritten data, a write-back of the data to the DRAM 13 is performed using a physical address (that is, a former physical address) remaining in the TLB physical page CAM 25. After the write-back, the physical address in the TLB physical page CAM 25 is rewritten to a physical address (that is, the latter physical address) registered in the TLB physical page memory 22.

The above-described TLB miss processing and cache read processing enable task switching responsiveness to be enhanced, and also enables reduction of overhead occurring when a TLB entry is updated in task switching, but there is no memory access to the area.

(Application to a Multiprocessor System)

An example in which a multiprocessor system or multicore system including a plurality of processors, each processor employing an above-described cache memory, will be described.

Figure 12:
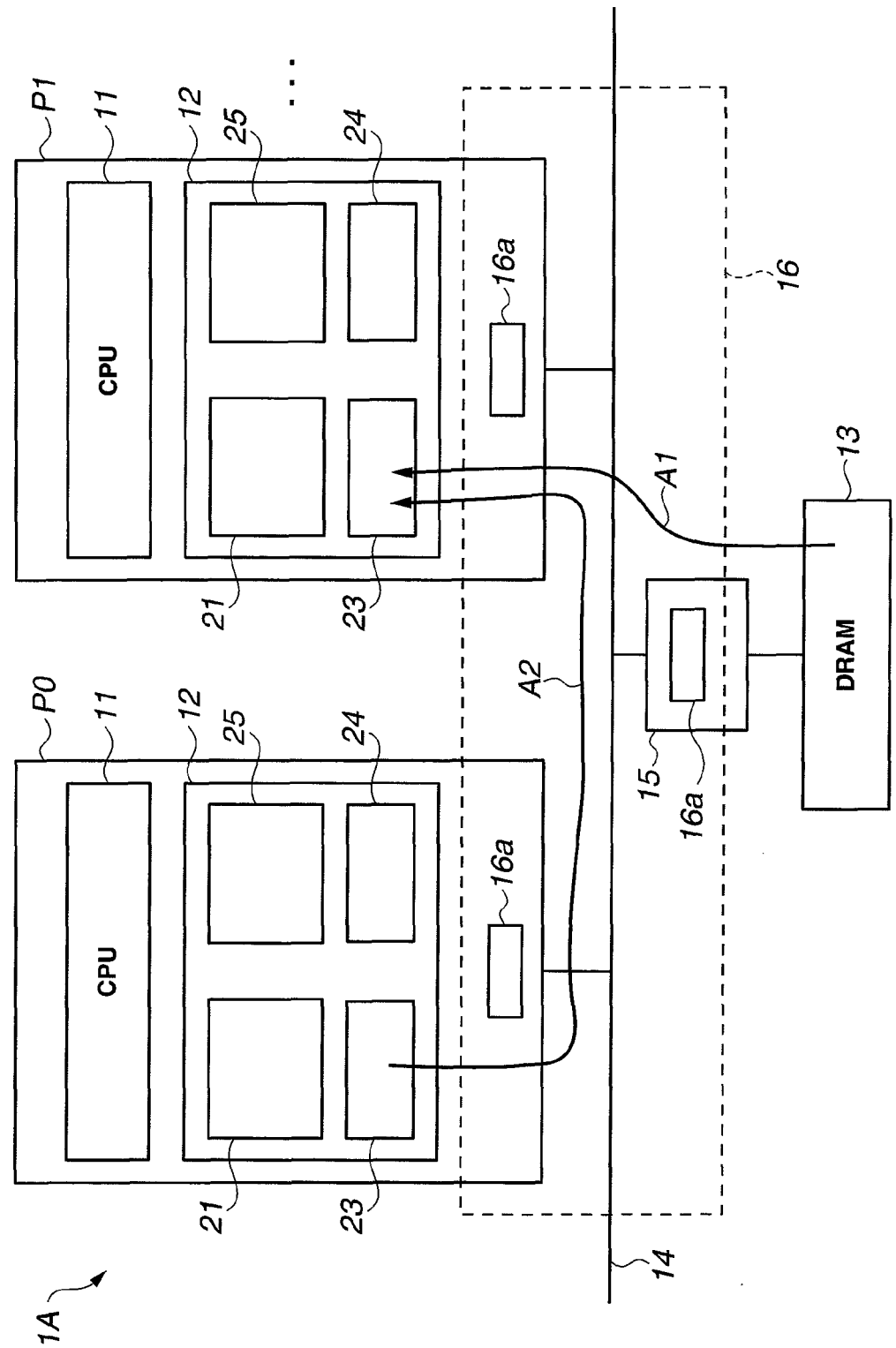
FIG. 12 is a block diagram illustrating a configuration of a multiprocessor system 1A including a plurality of processors according to a present embodiment.

FIG. 12 is a block diagram illustrating a configuration of a multiprocessor system 1A including a plurality of processors. As illustrated in FIG. 12, plural processors P0, P1, . . . are interconnected via a bus 14. Furthermore, a DRAM 13, which is a main memory, is also connected to the bus 14 via a memory controller 15. The processor system 1A is configured so that each processor includes a CPU 11 and a cache memory 12 and the CPU 11 can access the DRAM 13 via the cache memory 12.

The bus 14 is a bus including a snoop mechanism 16 for coherency maintenance. Each processor and the bus controller 15 are provided with a hardware circuit 16a for the snoop mechanism or a directory-based coherency management mechanism. Hereinafter, an example of snoop mechanism will be described; however, a structure that is almost the same as the snoop mechanism can also be provided by means of directory-based coherency management. Also, although not clearly indicated in FIG. 12, the hardware circuit 16a includes an arbiter that determines "which processor ultimately receives write-back data" in relation to a "write-back data reception response" output by each processor. In the configuration illustrated in FIG. 12, each processor can access to the cache memory 12 using a virtual address in a virtual address space. Furthermore, the cache memory 12 performs a read of data from the DRAM 13 and a write of data to the DRAM 13 while performing TLB miss processing and cache miss processing for access from the CPU 11.

Although a case of two processors being provided will be described below, similar operation can be provided in a case of three or more processors being provided.

Figure 13:
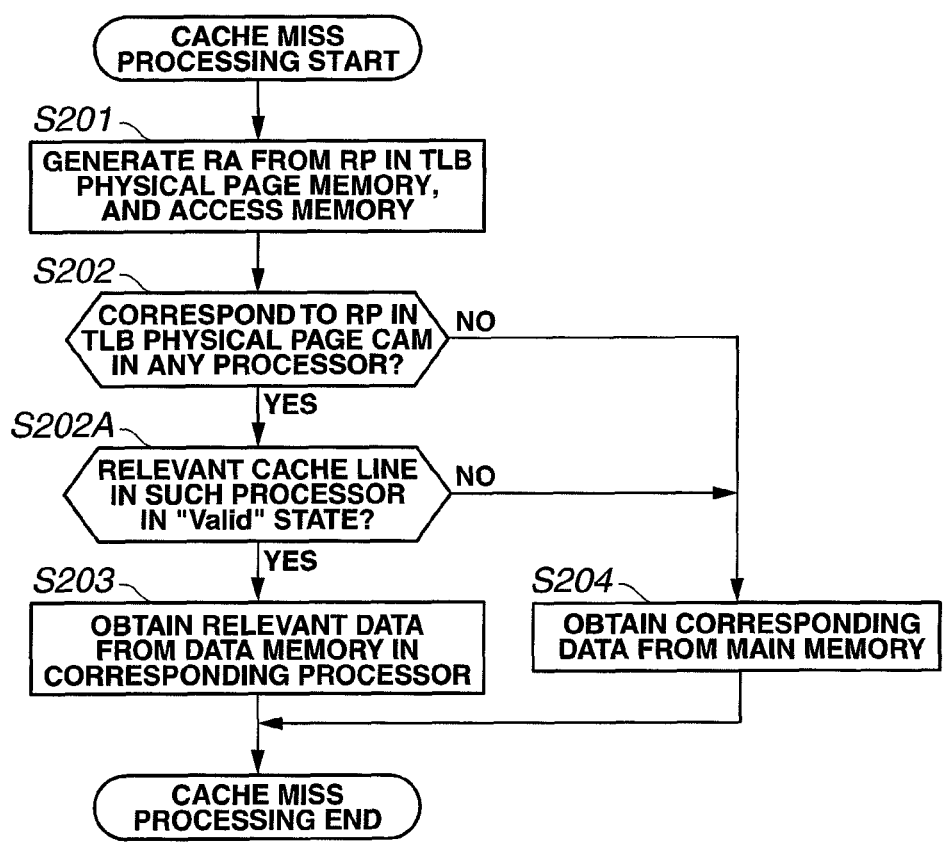
FIG. 13 is a flowchart illustrating processing upon occurrence of a cache miss in a processor, according to a present embodiment.

FIG. 13 is a flowchart illustrating processing for a cache miss in a processor.

When performing TLB rewrite processing, each processor performs rewrite processing for a TLB virtual page memory 21 and a TLB physical page memory 22 in the cache memory 12, while not performing a write-back of data in a data memory 23 and a rewrite of data in a TLB physical page CAM 25.

Now, it is assumed that a cache miss has occurred in a processor P1. When a cache miss has occurred, for refilling, the cache memory 12 generates a physical address RA from a physical page number RP in the physical page memory 22 to perform memory access to the DRAM 13 (S201).

Memory access to the DRAM 13 is monitored by the snoop mechanism 16. When memory access occurs, the snoop mechanism returns a snoop response. As a result, the processor P1 determines whether or not a valid physical page RP for the physical address RA relevant to the memory access corresponds to a physical page RP in the TLB physical page CAM 25 in any of the other processors in the bus 14, not DRAM 13 (S202).

For example, it is assumed that a processor P0 includes the valid physical page RP. Such case may occur because although a write-back of data changed in the processor P0 should be performed when a TLB rewrite is performed, data remains in the data memory 23 until the write-back of the data is performed.

Accordingly, if the valid physical page RP for the physical address RA corresponds to a physical page RP in the TLB physical page CAM 25 in any of the other processors (S202: YES), the corresponding processor (here, the processor P0) consults a state memory 24 for the relevant cache line, and if the cache state is not "Invalid", relevant data is transferred from the data memory 23, and thus, the cache memory 12 in the processor P1 obtains the data from the processor P0 (S203). The processor P1 can obtain data through a route indicated by an arrow A2 in FIG. 12.

In this case, no access from the processor P1 to the DRAM 13 occurs, and thus, the processor P1 can obtain data at high speed by means of data transfer from the processor P0. Consequently, a processor with enhanced task switching responsiveness can be provided.

As described above, task switching processing according to the present embodiment enables provision of a virtual address cache memory and processor with enhanced task switching responsiveness using a cache memory enabling reduction of the circuit amount by providing a TLB function in the cache memory.

II) Write-Back Processing of Data in a Multiprocessor System

Next, write-back processing of data in a multiprocessor system according to the present embodiment will be described.

An above-described cache memory can be applied to each processor included in a multiprocessor system or a multicore system.

In a multiprocessor system 1A including the configuration illustrated in FIG. 12, a processor may perform a write-back (i.e., castout) of data to the DRAM 13. For example, when a cache miss occurs in the virtual address cache memory 12 in a processor, the processor writes data in the data memory 23 back to the DRAM 13, which is a main memory.

Conventionally, a write-back of data to a main memory should be performed without fail, and thus, when the amount of data transferred to the main memory increases, a decrease in the performance of the overall system and an increase in power consumption due to transfer processing inevitably occur.

Therefore, in the present embodiment, a write-back of data is performed by transferring the data to a cache memory in another processor, not a main memory, enabling preventing a decrease in performance of the overall system, and also enables reduction of power consumption for transfer processing.

Here, for example, it is assumed that a cache miss occurs in the processor P1 and the processor P1 performs a write-back of data in a physical address RA. The processor P1 outputs data relevant to processing for a write-back of data to the DRAM 13, to the bus 14.

The data in the bus 14 is monitored by the snoop mechanism 16, and other processors are notified of the data by the snoop mechanism 16.

Figure 14:
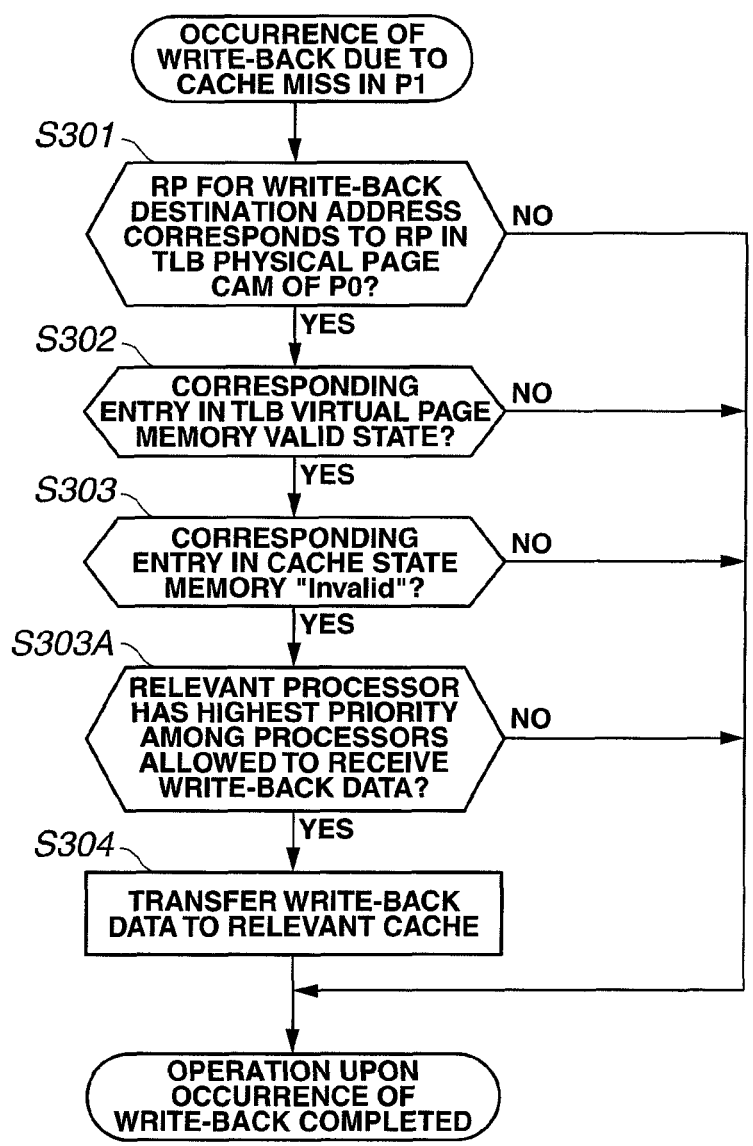
FIG. 14 is a flowchart illustrating an example of write-back processing upon occurrence of a cache miss, according to a present embodiment.

For example, the processor P0 performs processing in FIG. 14 based on the notice. FIG. 14 is a flowchart illustrating an example of write-back processing upon occurrence of a cache miss. The processing in FIG. 14 is performed by the hardware circuit in the cache memory 12. Furthermore, a below-described function of the snoop mechanism 16 is provided by extending a function of the snoop mechanism 16. In other words, the snoop mechanism 16, which is a coherency-maintenance protocol mechanism, monitors whether or not there is write-back data targeting the DRAM 13, and when the snoop mechanism 16 detects the write-back data, notifies processors other than the processor that has generated the write-back data.

The processor P0, based on the write-back data included in the notice received via the bus 14, determines whether or not there is a physical page RP in its own TLB physical page CAM 25 corresponding to a physical page RP for a write-back destination physical address RA (S301).

If there is a corresponding page (S301: YES), whether or not a corresponding entry in a TLB virtual page memory 21 is in a valid state is determined (S302).

If it is in a valid state (S302: YES), whether or not a relevant entry in the cache state memory 24 is "Invalid" is determined (S303).

If it is "Invalid" (S303: YES), whether or not the processor P0 itself has the highest priority among the processors that can receive the write-back data is determined (S303A). If the processor P0 itself has the highest priority (S303A: YES), the write-back data is transferred to the relevant data memory 23 in the cache memory 12, and changes the cache state from "Invalid" to "Modified" (S304).

In the case of "NO" in S301, S302, S303 or S303A, the processing is ended without doing anything. Where a protocol allowing a "Dirty-Shared" state such as MOESI, is employed, it should be understood that it is possible to perform optimization according to the coherence protocol such as a "processor having the highest priority" determined in S303A "transfers the write-back data to a relevant cache and changes the cache state to 'Owned'" in S304, and a "processor other than the processor having the highest priority" "transfers the write-back data to a relevant cache, and changes the cache state to 'Shared'" in S304.

In other words, where a same physical address is included in the TLB physical page CAM 25, the relevant data in TLB virtual page memory 21 is valid and the relevant data in the data memory 23 is invalid, an area in which a corresponding entry exists but no data is stored exists in the cache memory 12 in the processor P0. In such case, the processor P0 transfers the write-back data to the cache memory 12 to store the write-back data in the cache memory 12.

Next, processing in a memory controller 15, which is a control section for a main memory, will be described.

Figure 15:
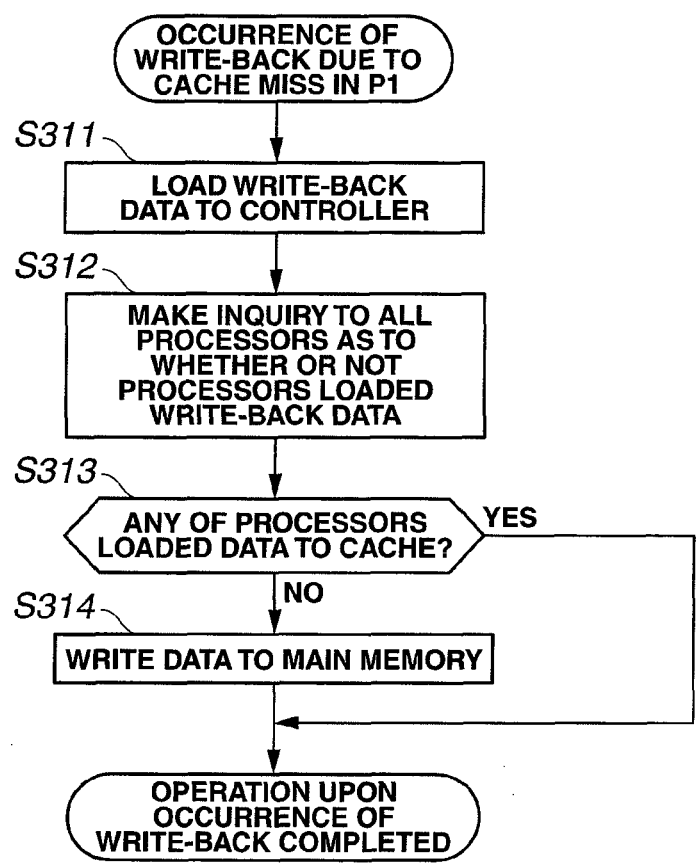
FIG. 15 is a flowchart illustrating processing performed by a memory controller 15 for a write-back, according to a present embodiment.

FIG. 15 is a flowchart illustrating processing performed by the memory controller 15 for a write-back.

The memory controller 15 loads the write-back data from the processor P1 (S311).

Next, the memory controller 15 makes an inquiry to all the processors via the snoop mechanism 16 as to whether or not the processors loaded the write-back data (S312). In response to the inquiry, the snoop mechanism 16 generates a response and returns the response to the memory controller 15. In other words, the snoop mechanism 16, which is a coherency-maintenance protocol mechanism, notifies the memory controller 15 of the write-back data being loaded to a cache memory in another processor, in response to the inquiry from the memory controller 15.

Then, the memory controller 15, based on the response to the inquiry, determines whether or not any of the processors has loaded the data in its cache memory 12 (S313).

If none of the processors has loaded the data in its cache memory 12 (S313: NO), processing for writing the data to the DRAM 13 is performed (S314).

If any of the processors has loaded the data in its cache memory 12 (S313: YES), the memory controller 15 terminates the processing.

Figure 16:
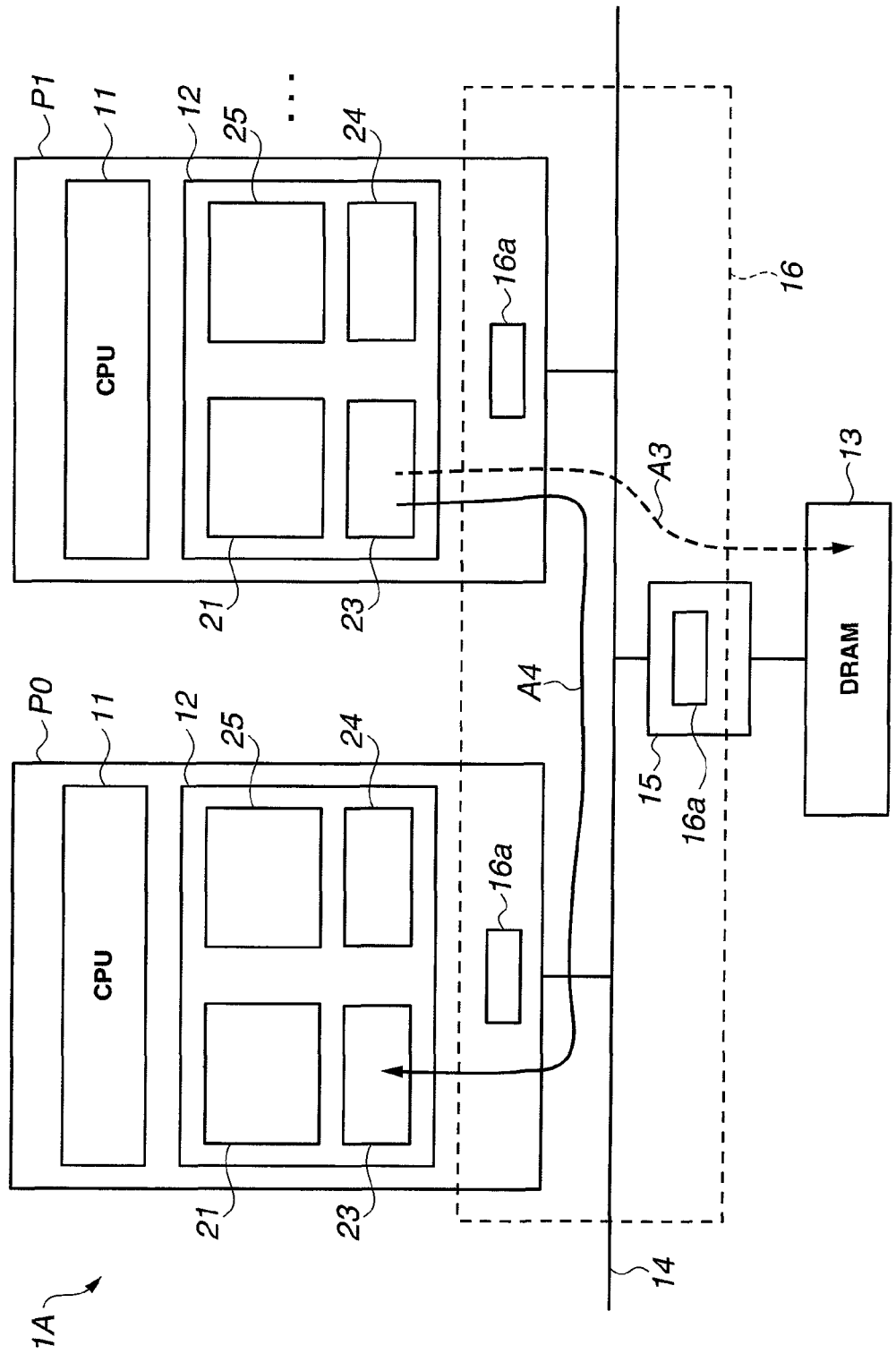
FIG. 16 is a diagram illustrating a manner of data write-backs according to a present embodiment.

FIG. 16 is a diagram illustrating a manner of data write-backs. As illustrated in FIG. 16, in the case of "NO" in S313, the write-back data from the processor P1 is transferred to the DRAM 13 as indicated by a dotted arrow A3, while in the case of "YES" in S313, the write-back data is transferred to the processor P0 as indicated by a solid arrow A4.

Occurrence of processing for writing data to the DRAM 13 leads to a decrease in the overall performance and an increase in power consumption for transfer processing. According to the present embodiment, where the write-back data has been loaded in the cache memory 12 in any of the processors, the memory controller 15 does not perform a write-back of the data to the main memory.

Consequently, a multiprocessor system according to the present embodiment, the above-described data write-back processing is performed, enabling reduction of the amount of access to the main memory by the respective processors for data write-back processing.

A multiprocessor system in which a TLB function is provided in a cache memory, enabling reduction of the circuit amount, and further enables reduction of the amount of access to a main memory by respective processors for data write-back processing can be provided.

Although in the above-described example, where the write-back data has been loaded in the cache memory 12 of any of the processors, the memory controller 15 does not perform a write-back of the data to the main memory, but the memory controller 15 may perform a write-back to the main memory.

III) DMA Processing

DMA processing according to a present embodiment will be described.

Figure 17:
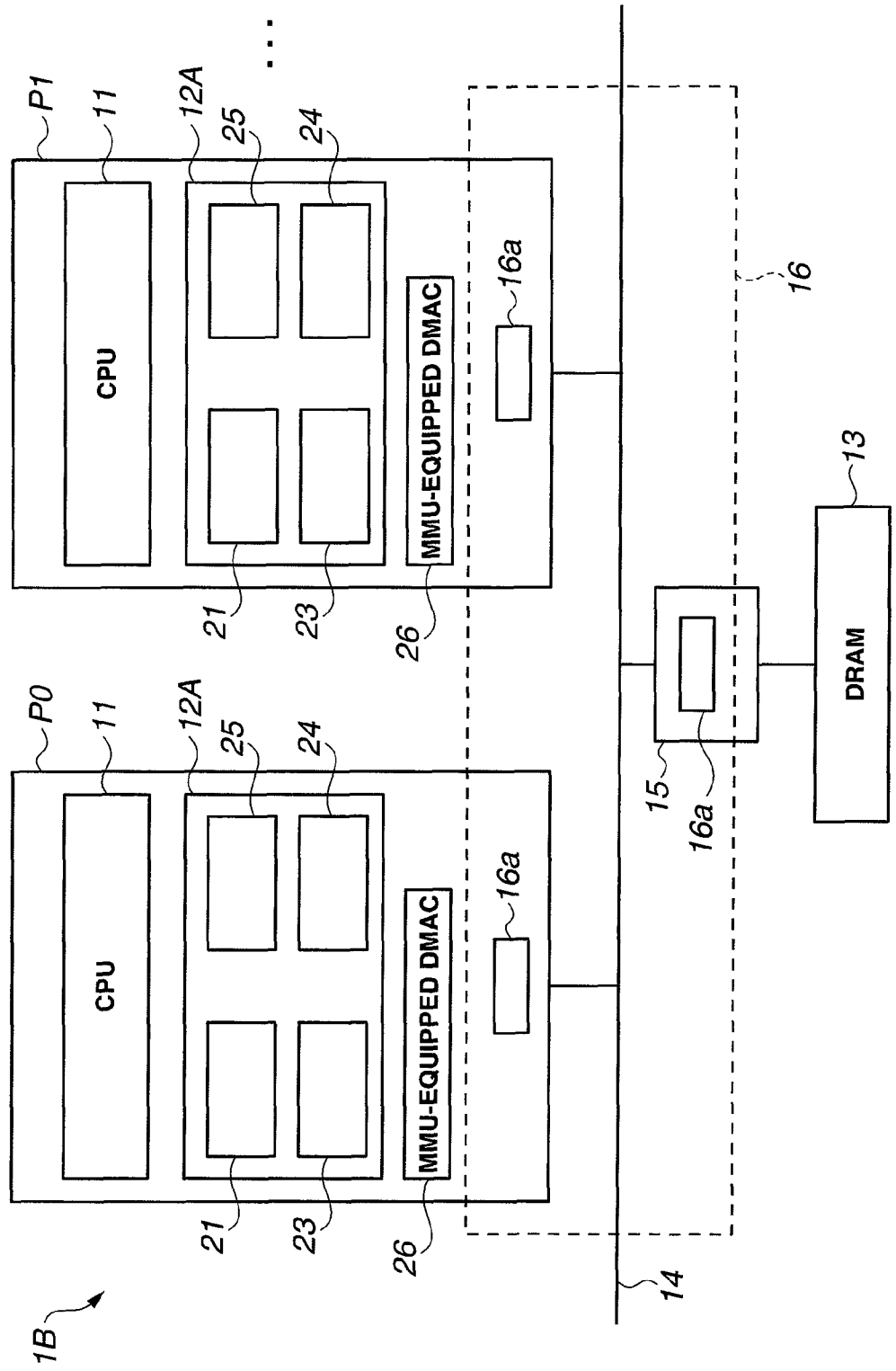
FIG. 17 is a block diagram illustrating a configuration of a multiprocessor system 1B including a plurality of processors, according to a present embodiment.

FIG. 17 is a block diagram illustrating a configuration of a multiprocessor system 1B including a plurality of processors. In FIG. 17, components that are similar to those in FIG. 12 are provided with the same reference numerals, and a description thereof will be omitted. In the multiprocessor system 1B illustrated in FIG. 17, each processor can perform data transfer to/from a DRAM 13 by means of DMA. For such purpose, each processor is provided with a DMA controller (hereinafter abbreviated as "DMAC") 26. The DMAC 26 is a DMAC including a memory management unit (hereinafter referred to as "MMU") including a TLB.

Conventionally, DMA transfer between a processor and the DRAM 13 is performed by designating a transfer source address and a transfer destination address using physical addresses; however, here, the DMAC 26 performs DMA transfer between the DRAM 13 and a cache memory 12A using virtual addresses for a virtual space.

Figure 18:
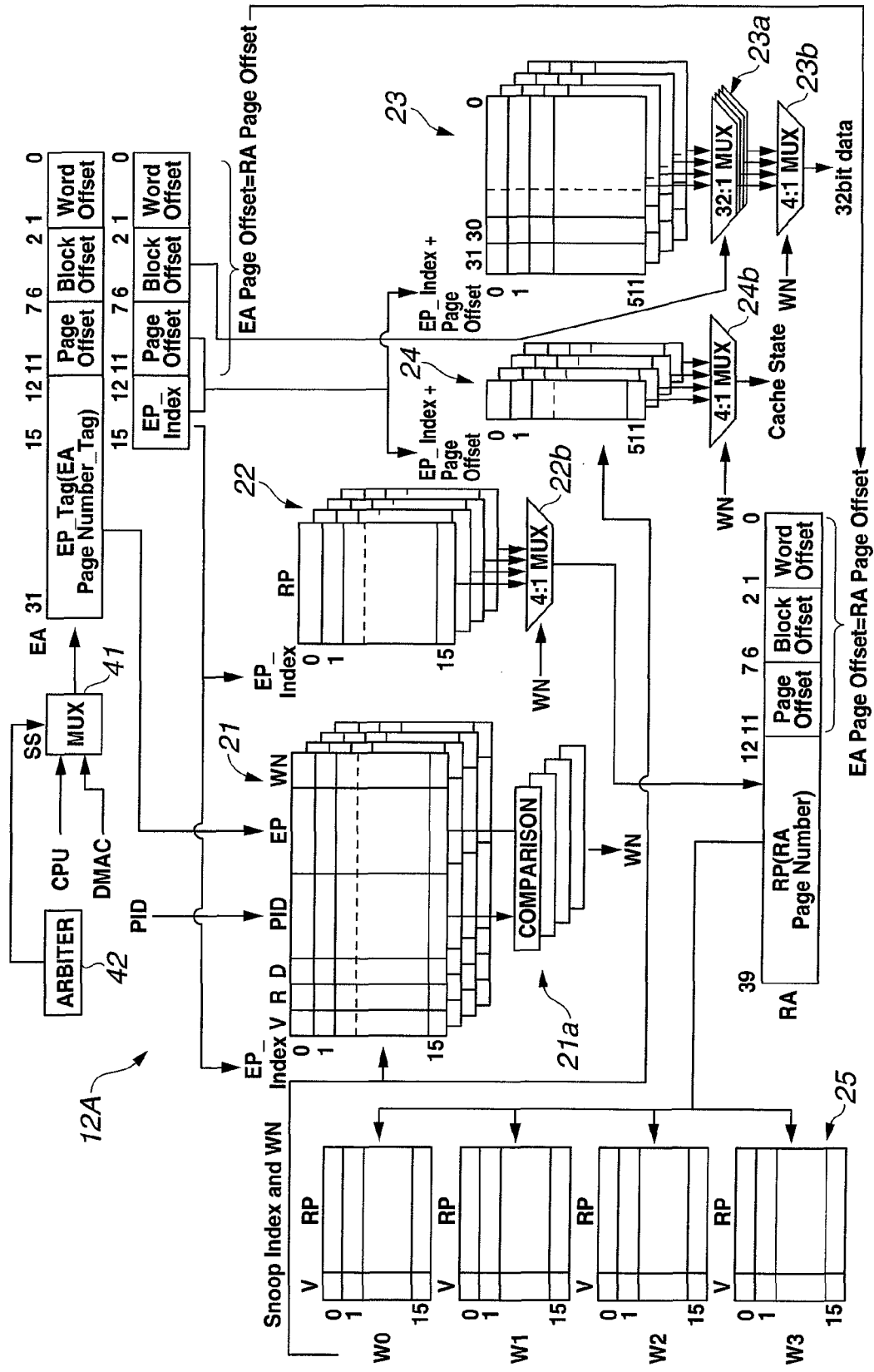
FIG. 18 is a configuration diagram of a cache memory including a function that performs DMA transfer according to a present embodiment.

FIG. 18 is a configuration diagram of a cache memory including a function that performs DMA transfer. In FIG. 18, components that are the same as those in FIG. 2 are provided with the same reference numerals, and a description thereof will be omitted.

A cache memory 12A, which is illustrated in FIG. 18, includes a multiplexer (MUX) 41 and an arbiter 42 as an input section that inputs a virtual address. The arbiter 42 is connected to the multiplexer 41. The arbiter 42 monitors signals from a CPU 11 and the DMAC 26, and determines whether a virtual address to be input to the cache memory 12A is a signal supplied from the CPU 11 or a signal supplied from the DMAC 26, and based on the determination result, outputs a selection signal SS to the multiplexer 41 so as to select a virtual address to be input. The multiplexer 41, based on the selection signal SS, switches input signals. In other words, virtual addresses EA from the CPU 11 and the DMAC 26 are input to the multiplexer 41, and either selected one of the virtual addresses EA is input to the cache memory 12A.

(GET Operation)

A GET operation in which a processor transfers data from the DRAM 13, which is a main memory, to its cache memory 12A by means of DMA transfer will be described. The DMAC 26 in FIG. 17 includes a memory management unit (hereinafter abbreviated as "MMU"). A transfer source address (source address) SA and a transfer destination address (destination address) DA are input to the DMAC 26 as virtual addresses.

For example, a CPU 11 in a processor P0 supplies the transfer source address SA and the transfer destination address DA, which are virtual addresses, to its DMAC 26. Then, the DMAC 26 searches out a physical address storage area holding latest data indicating the transfer source address SA using a snooping-based cache coherency mechanism and its MMU, and transfers the data to the transfer destination address DA in its own cache memory 12 by means of DMA transfer.

A storage area for the transfer destination address DA in a data memory 23 in the cache memory 12A in the processor P0 is allocated to the transferred data, and the transferred data is written to the storage area. Also, if there is an entry in the transfer destination address DA in the cache memory 12A, the transferred data is written in the storage area for the entry. Then, in the cache memory 12A, a dirty bit is written to the entry for the area with the transferred data written therein in the data memory 23.

As described above, a GET operation is performed to store transfer data in the cache memory 12A, enabling the CPU 11 to read and process the data. Also, where a relevant storage area already exists in the cache memory 12A, no other data existing in the cache memory 12A is evicted.

Accordingly, when the DMA transfer is finished, data for the transfer destination address DA in the GET operation exists in the cache memory 12A, and thus, it can be expected that the cache hit rate is raised in subsequent accesses by the processor.

Next, processing in a GET operation will be described in detail.

Figure 19:
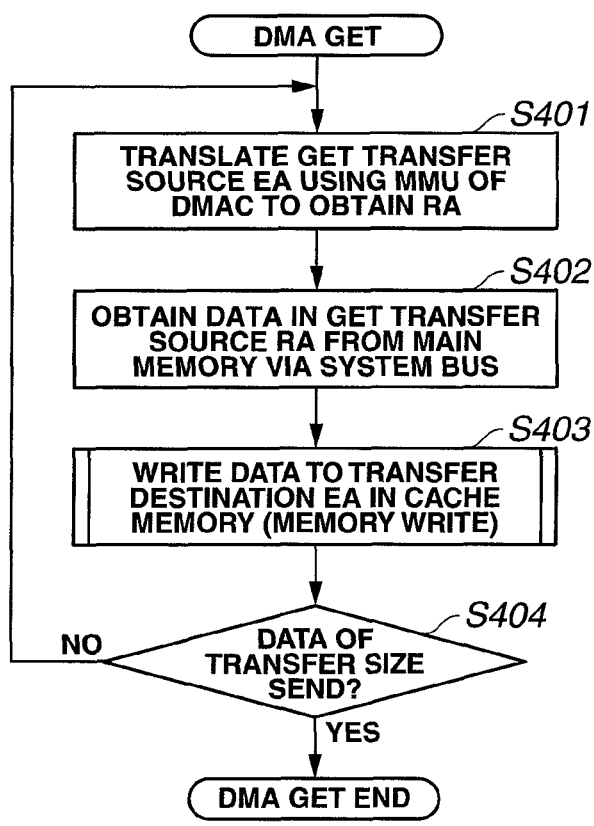
FIG. 19 is a flowchart illustrating processing in a GET operation using DMA, according to a present embodiment.

FIG. 19 is a flowchart illustrating processing in a GET operation using DMA.

As illustrated in FIG. 19, first, the DMAC 26 translates a transfer source address SA, which is a virtual address in a GET operation, using its own MMU to obtain a physical address RA (S401). Since DMA processing written in a program executed by the CPU 11 is written using virtual addresses, a virtual address is translated to a physical address in the DMAC 26.

The DMAC 26 obtains data in the transfer source address SA obtained in S401, which is a physical address in the GET operation, from the DRAM 13 via the bus 14, which is a system bus (S402).

Next, a transfer destination address DA, which is a virtual address from the DMAC 26, is input to the cache memory 12A, and transfer data is rewritten to a relevant storage area in the data memory 23 (S403). The processing in S403 is similar to memory write processing in FIG. 7. In the cache memory 12A, in memory write processing, a dirty bit is written in an entry for an area of the data memory 23 in which the transfer data is written.

Then, the DMAC 26 determines whether or not data of a designated transfer size has been sent (S404).

If data of a designated transfer size has not been sent (S404: NO), the processing returns to S401. If data of a designated transfer size has been sent (S404: YES), the processing is ended. Since in DMA transfer, data is transferred in units of cache line size, the determination in S404 is made per data of 128 bytes.

As a result of the above-described GET operation, data within a cache memory size can be transferred to the cache memory 12A.

Accordingly, even if a program is a program of a size smaller than the memory size of the cache memory 12A and the program itself is one that is not intended to be executed using virtual addresses, that is, one that is executed in a physical address space, the program can be executed using the virtual address cache memory 12A in the present embodiment. For example, where the memory size of the cache memory 12A is 256 KB and the size of the program is also 256 KB, addresses for the program are translated to virtual addresses of a size of within 256 KB in a virtual address space, enabling the program to be executed by a processor according to the present embodiment. The program is gotten by the cache memory 12A by means of DMA transfer and executed.

(PUT Operation)

Next, a PUT operation will be described.

When a processor performs a PUT operation in which data in its cache memory 12A is transferred to the DRAM 13 by means of DMA, first, whether or not the data in the cache memory 12A, which is a transfer source address SA, is the latest by confirming the state data in the cache state memory 24, and if it is not the latest, confirmation is made using the snoop mechanism 16, which is a coherency-maintenance protocol mechanism. The DMAC 26 reads the latest data in the transfer source address SA, and transfers the latest data to the transfer destination address DA by means of DMA.

If a data entry for the transfer source address SA exists in the cache memory 12A, the data in the cache memory 12A is used for the data for the transfer source address SA. However, there may be a case in which no latest data for the transfer source address SA exists in the cache memory 12A. In such case, the DMAC 26 retrieves a value from the DRAM 13 via the bus 14, but does not put an entry for the value in the cache memory 12A and obtains the data only.

Also, since the transfer destination address DA is also a virtual address, if the latest data in the transfer destination address DA exists in the cache memory 12A, which corresponds to the DRAM 13, the corresponding data in the cache memory 12A is invalidated, and the transfer data is written to the DRAM 13 or an entry in a cache memory 12A of another processor is updated and the transfer data is written to a data memory 23 of such other processor, using a cache coherency protocol mechanism in the bus 14.

As a result of the above-described operation, if no latest data for the transfer source address SA exists in the cache memory 12A, a PUT operation is performed without evicting the entries already existing in the cache memory 12A.

Figure 20:
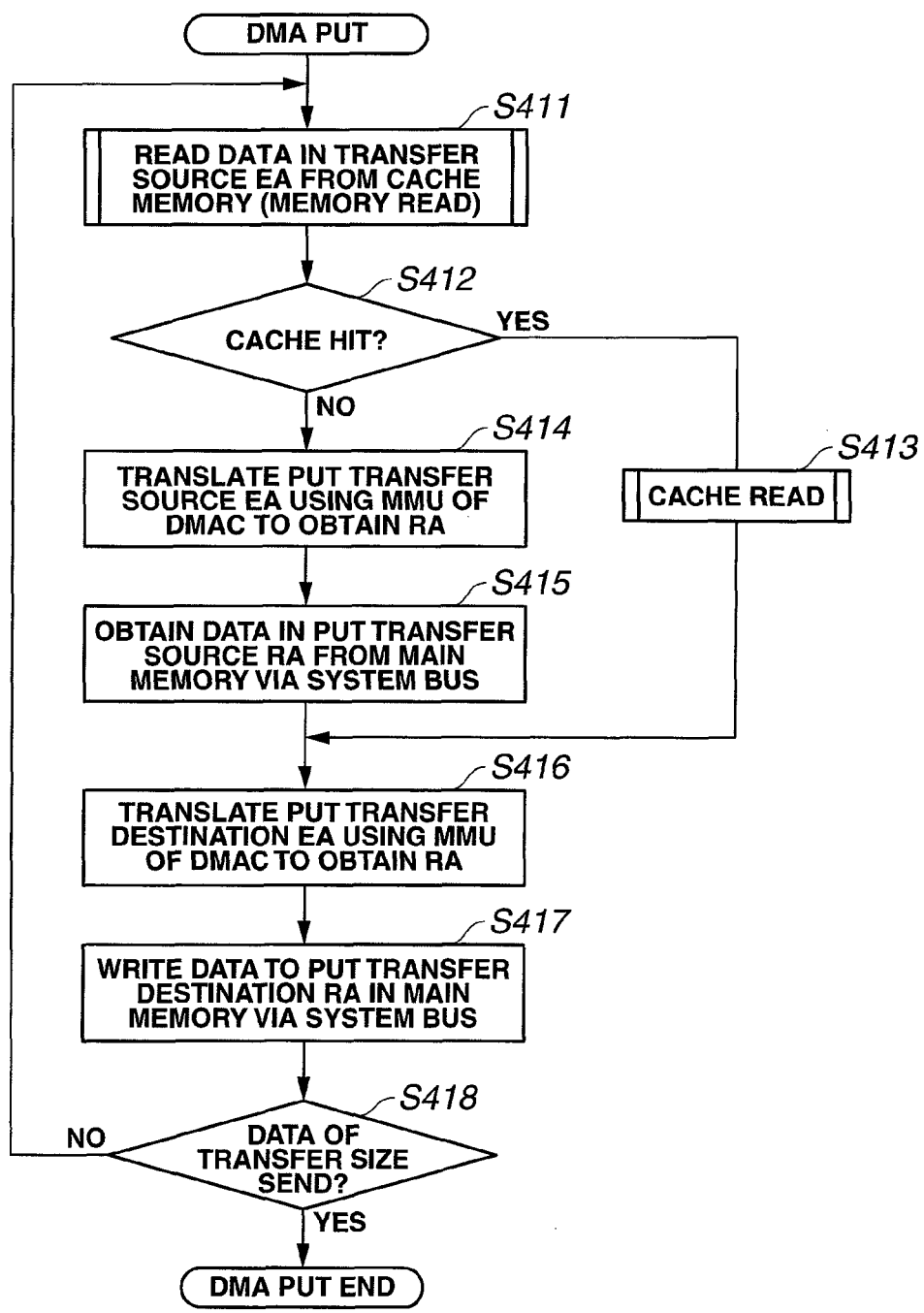
FIG. 20 is a flowchart illustrating processing in a PUT operation using DMA, according to a present embodiment.

FIG. 20 is a flowchart illustrating processing in a PUT operation by means of DMA.

As illustrated in FIG. 20, first, a transfer source address SA, which is a virtual address, is read from the data memory 23 in the cache memory 12A (S411). The processing in S411 is similar to the memory read processing in FIG. 3.

Whether or not there is a cache hit in the cache memory 12A is determined (S412).

If there is a cache hit (S412: YES), processing for a cache read is performed (S413). The processing in S413 is similar to processing for a cache read in FIG. 6. After S413, the processing moves to S416.

If there is no cache hit (S412: NO), the DMAC 26 translates a transfer source address SA, which is a virtual address, using its own MMU to obtain a physical address RA (S414).

The DMAC 26 obtains data in the transfer source address SA, which is the physical address obtained in S414, from the DRAM 13 via the bus 14 (S415).

Next, the DMAC 26 translates a transfer destination address DA, which is a virtual address, using its own MMU to obtain a physical address RA (S416).

The DMAC 26 writes the data to the transfer destination address DA, which is a physical address, obtained in S416 from the DRAM 13 via the bus 14 (S417).

Then, the DMAC 26 determines whether or not data of a designated transfer size has been sent (S418).

If data of a designated transfer size has not been sent (S418: NO), the processing returns to S411. If data of a designated transfer size has been sent (S418: YES), the processing is ended. Since DMA transfer is performed in units of cache line size, the determination in S418 is performed per data of 128 bytes.

(Case of Prefetch)

Here, a case where data is prefetched into the cache memory 12A, that is, a case where a transfer source address SA and a transfer destination address DA in DMA transfer are the same will be described.

For example, when data in a virtual address in the cache memory 12A is invalid, there may be a case where the latest data is transferred to the cache memory 12A in advance so that the CPU 11 can immediately use the data after the transfer.

In such case, the invalid data in the virtual address is updated, and thus, the transfer source address SA and the transfer destination address DA in DMA transfer are the same. As a result, the latest data is transferred by means of DMA transfer to the virtual address in the cache memory 12A.

Figure 21:
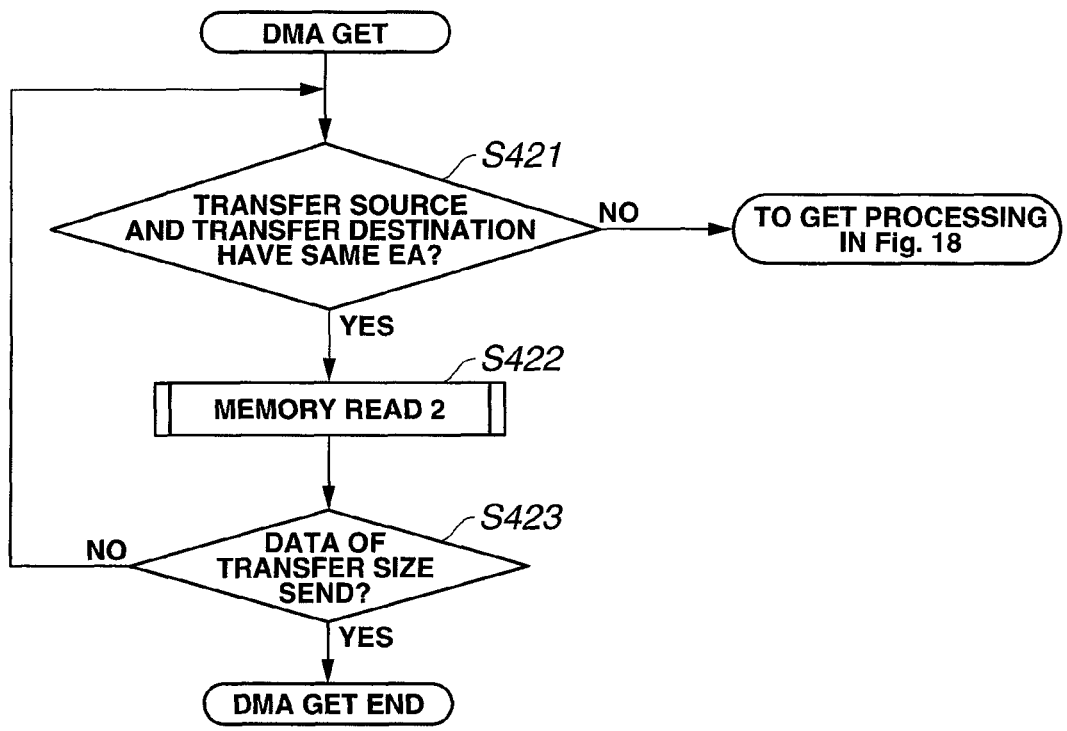
FIG. 21 is a flowchart illustrating processing in a GET operation for a prefetch, according to a present embodiment.

FIG. 21 is a flowchart illustrating processing in a GET operation for a prefetch.

As illustrated in FIG. 21, first, the DMAC 26 determines whether or not a transfer source address SA and a transfer destination address DA are a same virtual address (EA) (S421). If they are not a same virtual address (S421: NO), the processing moves to the processing in a GET operation in FIG. 19.

If they are a same virtual address (S421: YES), the processing for a memory read 2 is performed (S422).

Then, the DMAC 26 determines whether or not data of a designated transfer size has been sent (S423).

If data of a designated transfer size has not been sent (S423: NO), the processing moves to S421. If data of a designated transfer size has been sent (S423: YES), the processing is ended.

Figure 22:
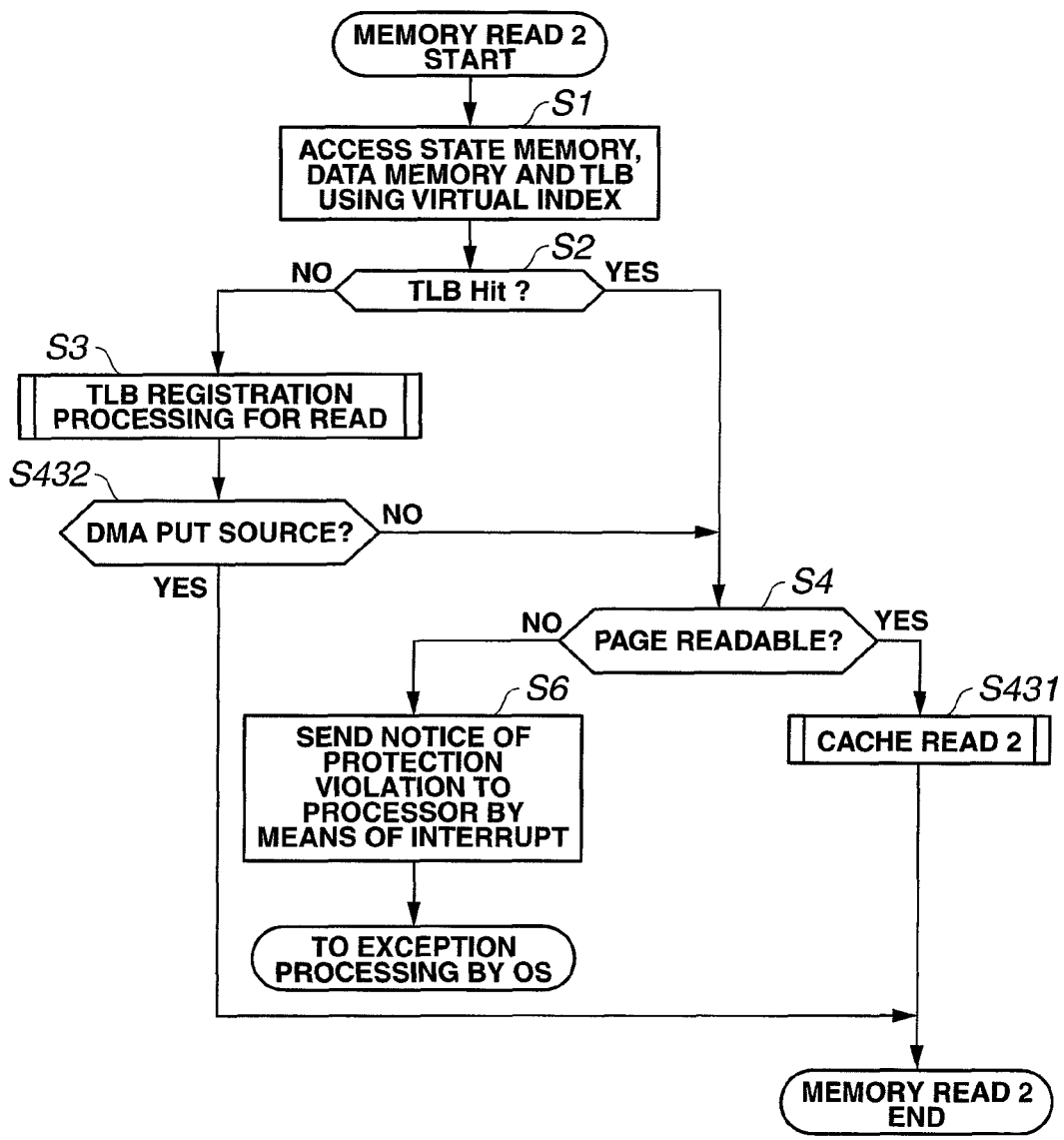
FIG. 22 is a flowchart illustrating processing in a memory read 2 in S422 of FIG. 21.

FIG. 22 is a flowchart illustrating processing in a memory read 2 in S422 in FIG. 21. FIG. 22 indicates a content that is substantially the same as the processing for a memory read in FIG. 3, and the same processing steps are provided with the same step numbers, and a description thereof will be omitted. FIG. 22 is different from FIG. 3 in that processing for a cache read (S5) is changed to processing for a cache read 2 (S431), which will be described below. Furthermore, whether or not the memory read is one targeting a source in a PUT operation using DMA transfer (transfer source address SA) is determined (S432). If the memory read is one targeting a source in a PUT operation using DMA transfer (S432: YES), the processing is ended, and if it is not, the processing moves to step S4.

Figure 23:
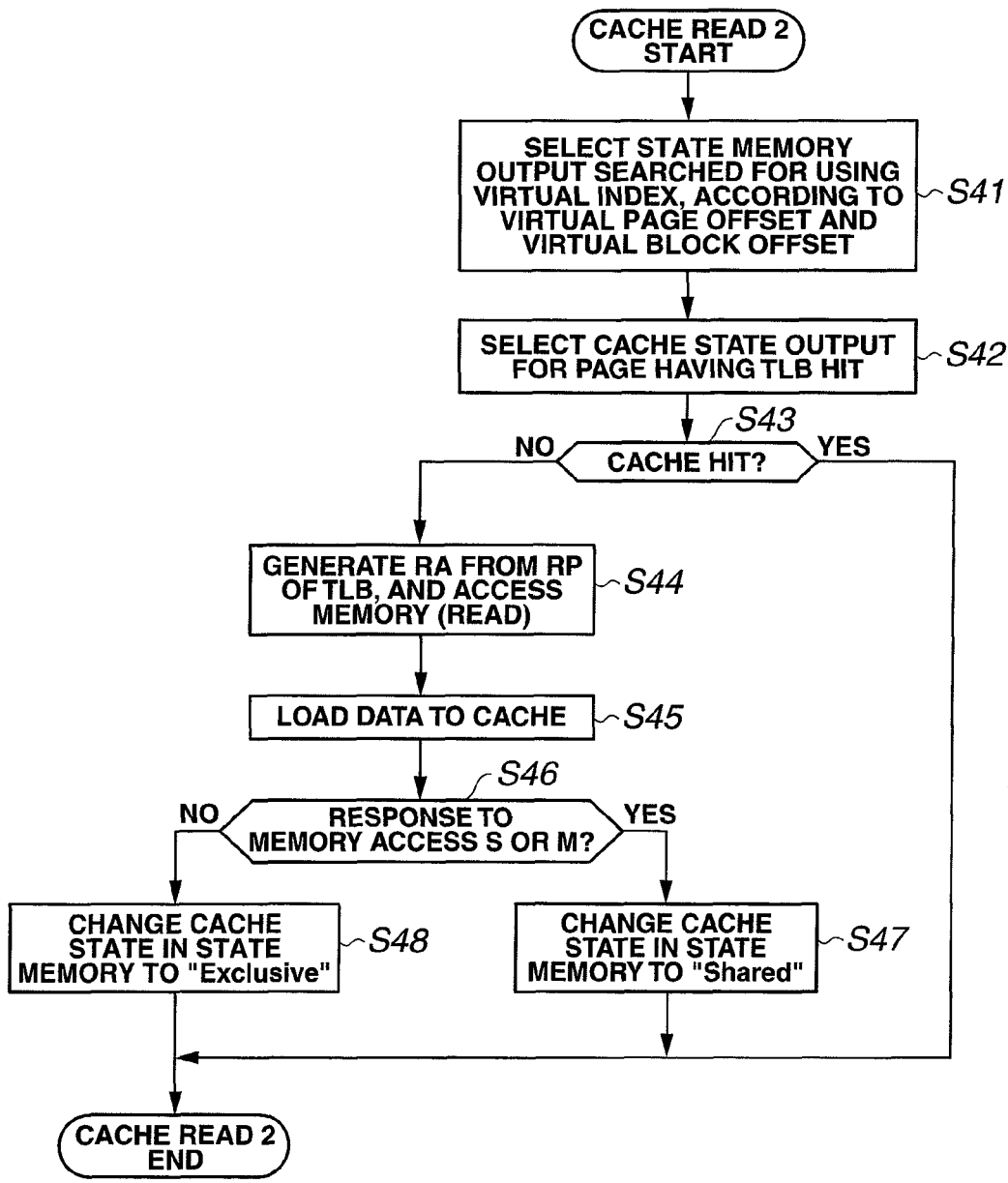
FIG. 23 is a flowchart illustrating processing in a cache read 2 in S431 of FIG. 22.

FIG. 23 is a flowchart illustrating processing in a cache read 2 in S431 in FIG. 22. FIG. 23 indicates a content that is substantially the same as the processing for a cache read in FIG. 6, and the same processing steps are provided with the same step numbers, and a description thereof will be omitted. FIG. 23 is different from FIG. 6 in that FIG. 23 does not have S49 and S50 in FIG. 6 because such steps are unnecessary where a transfer source address SA and a transfer destination address DA are the same in DMA transfer, that is, in prefetch processing.

Also, when GET and PUT operations using DMA are performed, the contents of TLB registration processing (FIG. 4), the cache read processing (FIG. 6) and the cache write processing (FIG. 8) are changed as follows.

Figure 24:
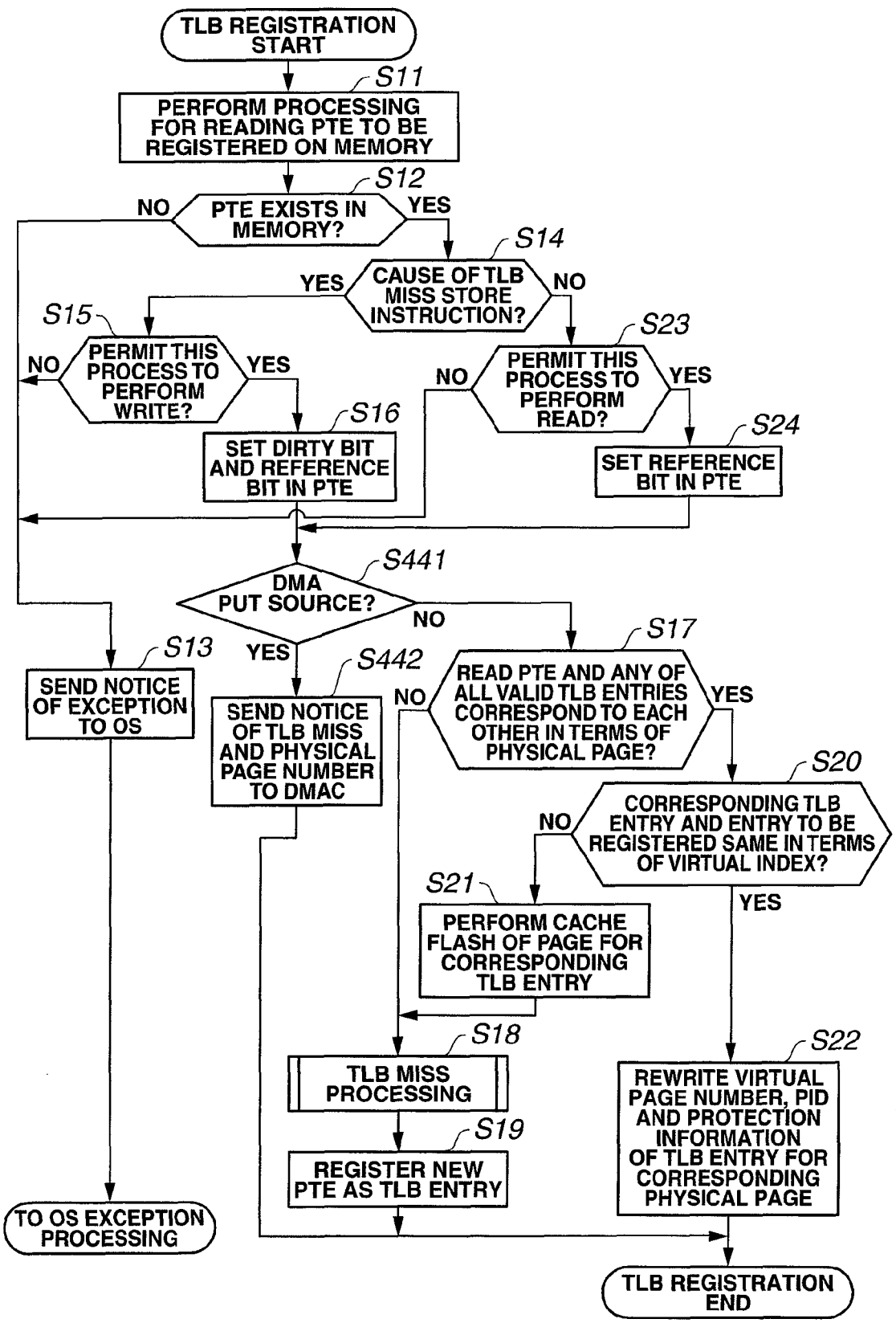
FIG. 24 is a flowchart illustrating TLB registration processing including DMA processing, according to a present embodiment.

FIG. 24 is a flowchart illustrating the flow of TLB registration processing including DMA processing. FIG. 24 indicates a content that is substantially the same as the TLB registration processing in FIG. 4, and the same processing steps are provided with the same step numbers, and a description thereof will be omitted. FIG. 24 is different from FIG. 4 in that after S16, whether or not an address for the entry is a source in a DMA PUT operation, that is, a transfer source address is determined (S441). If the address is a transfer source address (S441: YES), a notice of a TLB miss and the relevant physical page number RP is sent to the DMAC 26 (S442), and the TLB registration processing is ended. If the address is not a transfer source address (S441: NO), the processing moves to S17.

Figure 25:
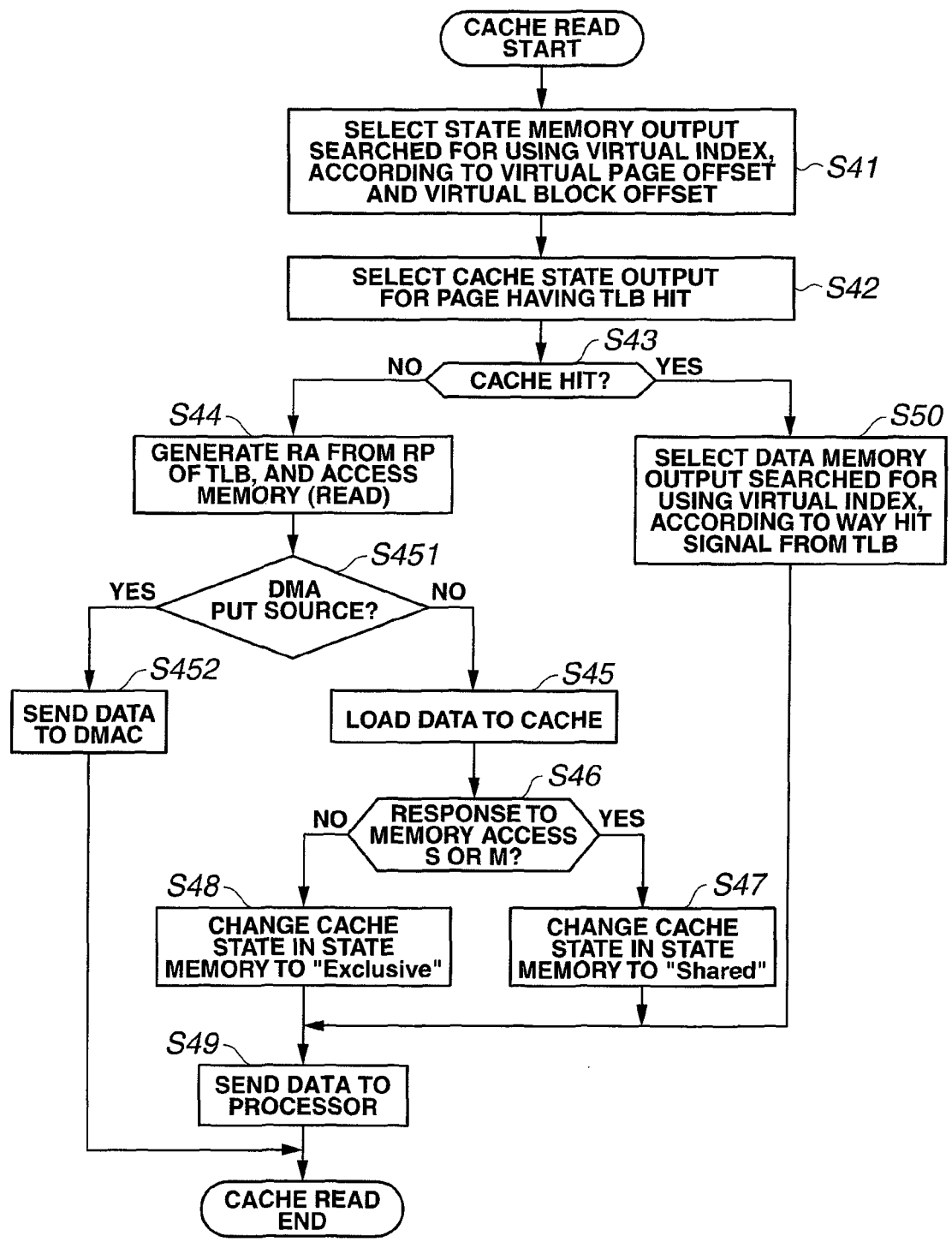
FIG. 25 is a flowchart illustrating cache read processing including DMA processing, according to a present embodiment.

FIG. 25 is a flowchart illustrating cache read processing including DMA processing. FIG. 25 indicates a content that is substantially the same as the processing for a cache read in FIG. 6, and the same processing steps are provided with the same step numbers, and a description thereof will be omitted. FIG. 25 is different from FIG. 6 in that: while the processing in FIG. 6 is performed by a cache controller, the processing FIG. 25 is performed by the DMAC 26; and after S44, whether or not an address for the entry is a source in a DMA PUT operation, that is, a transfer source address is determined (S451).

If the address is a transfer source address (S451: YES), data in the data memory 23 is sent to the DMAC 26 (S452), and the processing is ended. If the address is not a transfer source address (S451: NO), the processing moves to S45.

Figure 26:
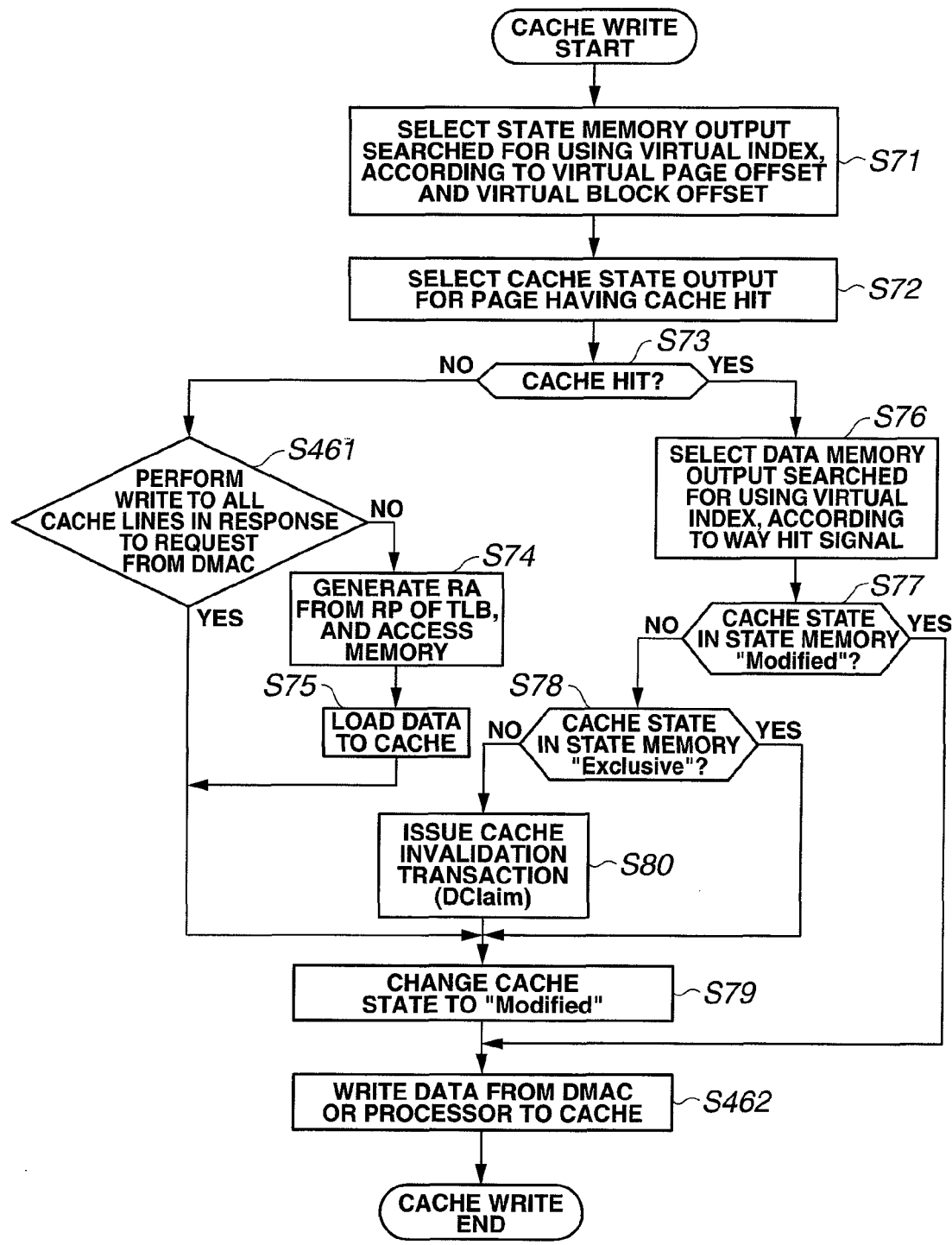
FIG. 26 is a flowchart illustrating cache write processing including DMA processing, according to a present embodiment.

FIG. 26 is a flowchart illustrating cache write processing including DMA processing. FIG. 26 indicates a content that is substantially the same as processing for a cache write in FIG. 8, and the same processing steps are provided with the same step numbers, and a description thereof will be omitted. FIG. 26 is different from FIG. 8 in that: while the processing in FIG. 8 is performed by a cache controller, the processing in FIG. 26 is performed by the DMAC 26; and after S73, whether or not the cache write is a request from the DMAC as well as a write to all the cache lines is determined (S461).

If the cache write is a request from the DMAC 26 as well as a write to all the cache lines (S461: YES), the processing moves to S79. If the cache write is neither a request from the DMAC 26 nor a write to all the cache lines (S461: NO), the processing moves to S74.

Also, in the data write processing in S81 after S79, if the data is one from the DMAC 26, the data from the DMAC 26 is written to the cache memory 12A (S462).

As described above, data transfer between a cache memory and a main memory can be performed using virtual addresses by means of DMA processing, enabling provision of a processor capable of enhancing a cache hit rate in DMA transfer and a cache hit rate when the corresponding processor accesses the cache memory after DMA transfer.

IV) Application to a Cache Memory of Level 2 or Lower

Next, a processor according to a present embodiment will be described. Here, a description will be given taking a multiprocessor system using multilevel caches as an example.

Figure 27:
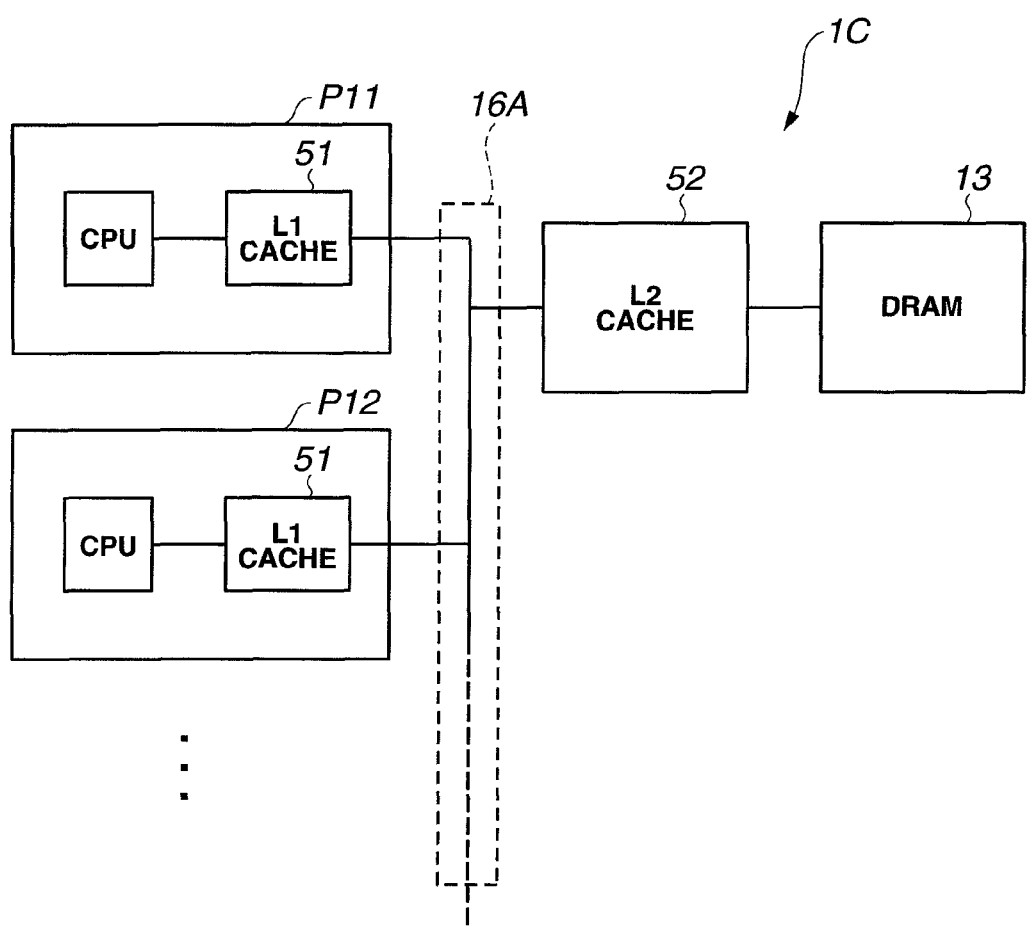
FIG. 27 is a block diagram illustrating a configuration of a multiprocessor system 1C including a processor including multilevel cache memories, according to a present embodiment.

FIG. 27 is a block diagram illustrating a configuration of a multiprocessor system 1C including a processor including multilevel cache memories. As illustrated in FIG. 27, the multiprocessor system 1C includes a plurality of processors P11, P12, . . . , each having an L1 cache 51, one L2 cache 52 connected to the L1 cache 51 of each of the plurality of processors, and DRAMs 13 as one or more main memories connected to the L2 cache 52. Note that the main memory may be organized by physically and/or logically plural portions. The multiprocessor system 1C may be formed in one semiconductor chip in its entirety, or may also be partially formed in another semiconductor device.

In the case of a processor including multilevel caches (for example, a processor including an L1 cache and an L2 cache), conventionally, in order to avoid occurrence of an alias in the L2 cache, access to the L2 cache is performed using a physical address. Also, in order to avoid occurrence of an alias in the L1 cache, physical addresses are used for coherency management of the L1 cache.

In such processor, when the L1 cache is accessed by the CPU, in most cases, a TLB in a MMU, which is provided separately from the L1 cache, is referred to. This is because: there is a high frequency of access to the L1 cache; and as can be seen in FIG. 5.28 in Computer Architecture—A Quantitative Approach—Forth Edition, the latency of the L2 cache is often no more than around 25 cycles, and thus, when an L1 cache miss occurs, it is necessary to immediately access the L2 cache. Accordingly, there is a problem that a large amount of power is consumed by the TLB hardware in the processor.

Therefore, the present embodiment is intended to provide a processor and a processor system enabling reduction of power consumption of TLB hardware.

Figure 28:
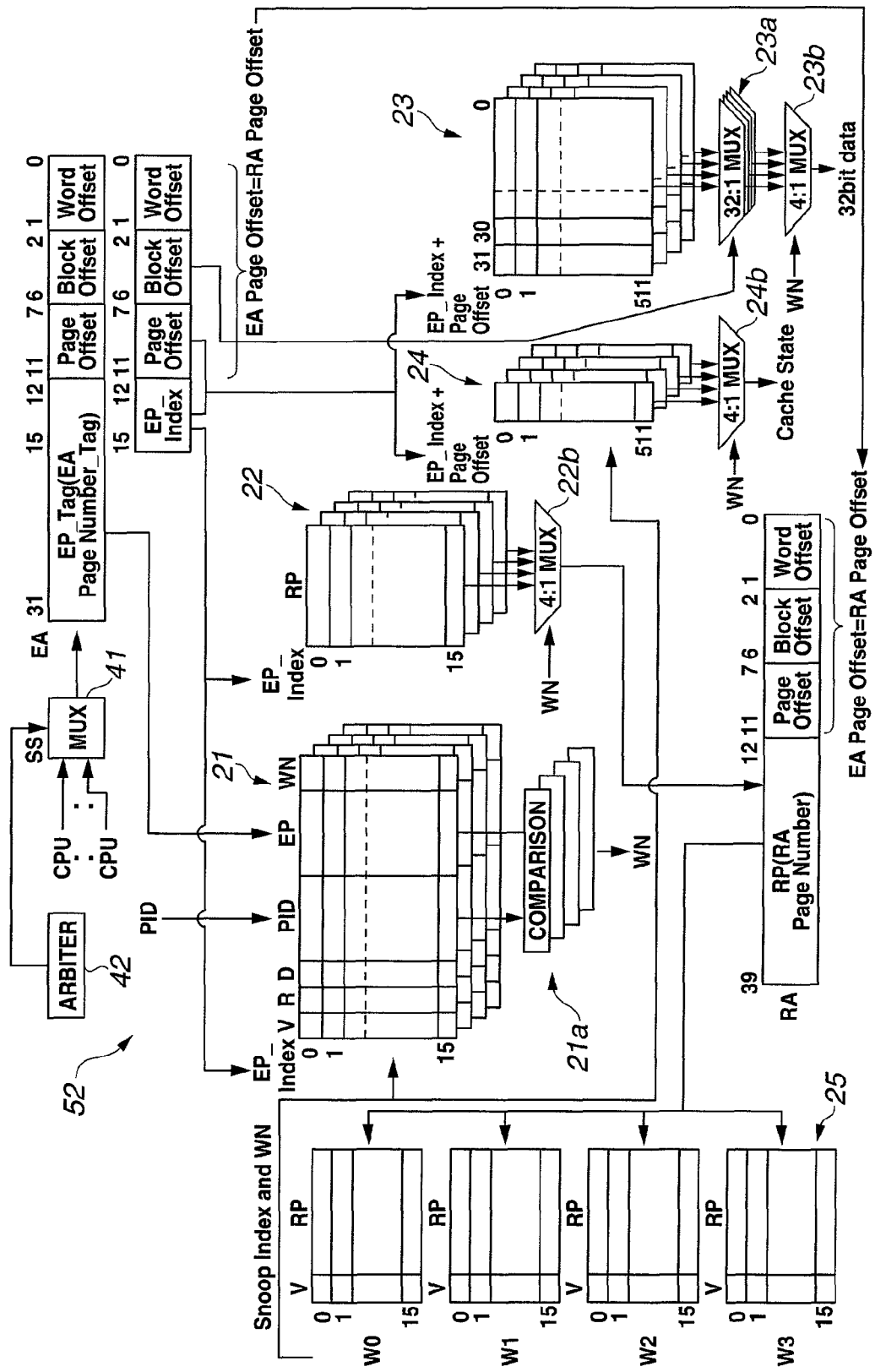
FIG. 28 is a configuration diagram of an L2 cache 52 according to a present embodiment.

FIG. 28 is a configuration diagram of a L2 cache 52. In FIG. 28, components that are the same as those in FIG. 18 are provided with the same reference numerals, and a description thereof will be omitted.

In FIG. 28, an arbiter 42 is connected to a multiplexer 41. The arbiter 42 monitors a signal from each processor, and determines which processor supplied each virtual address EA input to the L2 cache 52, and based on the determination result, outputs a selection signal SS to the multiplexer 41 so as to select a virtual address EA to be input. The multiplexer 41 switches input signals based on the selection signal SS.

The L1 cache 51 is a cache not including TLB hardware. The CPU of each processor accesses the L1 cache 51 using a virtual address, and since the L1 cache 51 does not include TLB hardware, in the case of a cache miss, access to the L2 cache 52 is performed using the virtual address. The L2 cache 52 includes a configuration that is substantially similar to, e.g., the above-described cache memory 12, and the L2 cache 52 is accessed using a virtual address, and accesses the DRAM 13 using a physical address.

Also, since the L2 cache 52 is a cache for the L1 cache 51 in each of the plurality of processors P11, P12, . . . , cache data is managed and identified in the L2 cache 52 in association with the respective processors, and a process number PID includes information on a processor identifier.

Furthermore, a cache state memory 24 in the L2 cache 52 manages not only a cache state of the L2 cache 52, but also a cache state of the L1 cache 51.

For that purpose, a snoop mechanism 16A, which is a coherency-maintenance protocol mechanism for maintaining the coherency of cache data between the plurality of L1 caches 51 and the L2 cache 52, is provided between each processor and the L2 cache 52.

Accordingly, the cache state memory 24 is extended so as to include a storage area for storing cache states for each L1 cache 51 and way information for each L1 cache 51.

An operation of the L2 cache 52 is similar to the operation illustrated in the flowcharts in FIGS. 3 to 11.

As shown in Figure 5.29 in "Computer Architecture—A Quantitative Approach—Fourth Edition" (Hennessy, et al.), if the cache hit rate of the L1 cache 51 is, for example, 95% or more, the rate of access to the L2 cache 52 is 5% or less. Accordingly, since the TLB is referred to only in the L2 cache 52, power consumption for referring to the TLB is reduced.

The above-described example is a multiprocessor system in which an L1 cache in each of a plurality of processors is connected to one L2 cache. However, a similar effect can be provided for a processor including one L1 cache and one L2 cache, the L2 cache having a configuration similar to the above-described configuration.

Also, although the above-described example has been described in terms of L1 and L2 caches, a similar effect can be provided between low-order caches of level 2 or lower like L2 and L3 caches in a processor or a multiprocessor with a configuration similar to that of the above-described L2 cache 52 provided to the lower-order cache.

Next, variations of the above-described configuration of the L2 cache 52 will be described. Hereinafter, each variation will be described mainly in terms of differences from the above-described configuration of the L2 cache 52, and a description of components provided with the same reference numerals will be omitted.

(Variation 1)

A basic configuration of a virtual address cache memory according to variation 1 is the same as that of the above-described L2 cache 52, but is different in an operation when an alias is detected.

In the embodiment, when an alias is detected, the L2 cache 52 performs processing for invalidating the TLB entry causing the alias as indicated in steps S17 onward in FIG. 4.

In contrast, in variation 1, processing in S21 is not performed. In other words, a new entry is registered without invalidating the TLB entry causing the alias. In variation 1, an alias occurs in the cache and the TLB in one and the same processor; however, cache coherence control using snooping is applied also to the one and the same processor to overcome the alias. In other words, although a plurality of addresses causing an alias exist in the L2 cache 52, a coherence protocol is applied to each cash line causing an alias, maintain the coherency of the states of a plurality of cache lines.

For example, when a physical address subjected to a write by a process A is subjected to a read by a process B, the following operation will be performed. A case where immediately after the physical address is subjected to a write by a process A, the physical address is subjected to a read by a process B in one and the same processor will be considered. From a viewpoint of a virtual address in the process A, the cache state is "Modified", and from a viewpoint of a virtual address in the process B, the cache state is "Invalid".

Accordingly, a cache miss occurs, and thus, the processing advances to S44 in FIG. 6 to perform access to the DRAM 13.

Snooping is performed for the access to the DRAM. In other words, the TLB physical page CAM 25 in FIG. 2 is accessed, and a TLB entry managed by the process A, that is, whose PID belongs to Process A, is hit. A cache line written by the process A is accessed, a "Modified" response is returned, and then data is output. The cache line managed by the process A enters a "Shared" state. The processor receives the "Modified" response and the data output by the process A. The cache line managed by the process B issuing the request is loaded, and the cache state is changed to "Shared".

In variation 1, although a process A and a process B, which are performed by one and the same processor by means of time sharing, the operation is performed as if such processes are performed by separate processors.

In the case of the configuration in variation 1, multiple hits are allowed in the TLB physical page CAM 25. More specifically, one bit for each TLB entry is allocated to a hit output of the TLB physical page CAM 25, and the hit output is not encoded. Also, responding to the TLB physical page CAM 25 allowing multiple hits, the cache state memory 24 allows simultaneous access to all the entries. More specifically, the cache state memory 24 is organized by ordinary logic circuits, not SRAMs. Then, an output from the cache state memory 24 is encoded by, e.g., a priority encoder as with a state of a coherent bus. For state encoding, a method such as one in which a cache state is encoded so that one bit is allocated to each state, and a logical OR of all the entries in the state memory 24 causing an alias is obtained, thereby obtaining a state for the state memory 24 may be employed.

A virtual address cache memory according to variation 1 enables provision of an effect similar to that of the configuration of the L2 cache 52, and omitting processing for invalidating TLB entries causing an alias.

(Variation 2)

Although a basic configuration of a virtual address cache memory according to variation 2 is the same as that of the above-described L2 cache 52, in variation 2, a TLB entry is not rewritten even if an index in the TLB virtual page memory 21 causing an alias and an index to be registered correspond to each other. In other words, each entry causing an alias in the TLB virtual page memory 21 is completely independently controlled, and alias processing in the TLB is eliminated, and the consistency between the entries causing an alias is left to a cache coherence mechanism.

In other words, variation 2 is different in that when an alias is detected, indexes in the TLB virtual page memory 21 are not checked.

In TLB entry registration processing in variation 2, processing in S17, S20, S21 and S22 in FIG. 4 is excluded, and after processing in S16 and S24, processing in S18 and S19 is performed.

In the configuration in variation 2, restrictions on the hardware configuration are the same as those in variation 1, multiple hits are allowed in the TLB physical page CAM 25, and the cache state memory 24 can access a plurality of entries simultaneously.

According to variation 2, TLB entries are completely independently controlled, and a plurality of processes performed by one and the same processor exhibit operations that are completely the same as those performed by different processors.

Accordingly, in variation 2, an effect similar to that of variation 1 is provided, and when a plurality of processes are performed, TLB entries in the respective processes are not invalidated, reducing overhead for a TLB miss.

(Variation 3)

Figure 29:
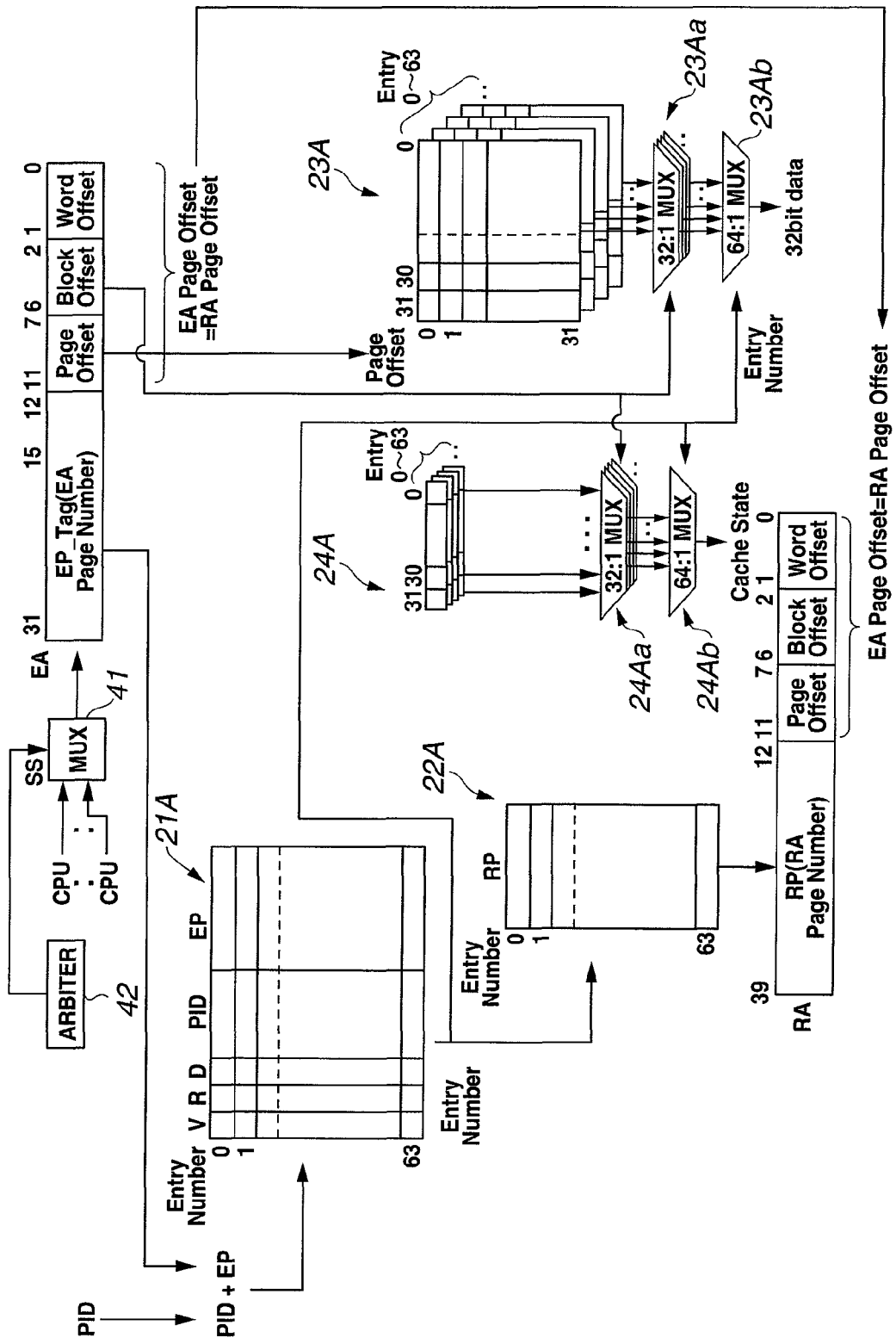
FIG. 29 is a configuration diagram illustrating a cache memory according to variation 3 of an L2 cache 52 according to a present embodiment.

FIG. 29 is a configuration diagram of a cache memory according to variation 3.

As illustrated in FIG. 29, the cache memory includes a TLB CAM 21A, a TLB physical page memory 22A, a data memory 23A and a cache state memory 24A. The cache memory according to variation 3 is a full associative cache.

For example, the cache memory is configured so that a full associative cache having a cache capacity of 256 KB and a cache line size of 128 bytes is managed in units of 4 KB page size. It is supposed that page information, which is managed by the TLB, has 10 bits and a cache line state has 10 bits.

In such case, where a physical address and a virtual address are 40 bits and 32 bits, respectively, the size of the TLB CAM 21A in variation 3 can be figured out as follows:
physical page number: 40 bits−12 bits=28 bits,
virtual page number: 32 bits−12 bits=20 bits,
entry count: 256 KB/4 KB=64 entries,
and therefore, $$TLB\ size = \begin{pmatrix} \text{physical page number} + \\ \text{virtual page number} + \text{state bits} \end{pmatrix} * \text{entry count}$$

$$= (28 + 20 + 10) * 64$$

$$= 3712\ \text{bits}$$

The size of a state memory (corresponding to a conventional tag memory) in a L1 cache is substantially reduced since cache entry replacement is performed on a page basis.

In other words, $$\text{entry count} = 256\ \text{KB}/4\ \text{KB} = 64\ \text{entries},$$

$$(64\ \text{entires} = 6\ \text{address bits}),$$

$$\text{index bit count} = \text{entry count per way} = 6\ \text{bits},$$

$$\text{tag bit count} = \text{physical address size} - (\text{entry count} + \text{line sizes})$$
$$= 40\ \text{bits} - (6\ \text{bits} + 12\ \text{bits})$$
$$= 40\ \text{bits} - 18\ \text{bits}$$
$$= 22\ \text{bits}$$

The present configuration requires physical page information, not requiring virtual page information, and thus, $$L1\ \text{Tag memory size} = (\text{Tag bit count} * \text{total entry count}) +$$
$$\begin{pmatrix} \text{state bit count} * \text{line count in page} * \\ \text{total entry count} \end{pmatrix}$$
$$= (22\ \text{bits} * 64) + (10\ \text{bits} * 64 * 32)$$
$$= 1408 + 20480\ \text{bits}$$
$$= 21888\ \text{bits}$$

Accordingly, in the following conditions:

L1 size: 256 KB, full associative (however, managed in units of 4 KB);

TLB entry count: 64 entry full associative;

minimum page size: 4 KB;

virtual address size/physical address size: 32 bits/40 bits; and

L1 line size: 128 bytes, the TLB CAM 21A requires approximately 4000 bits, and the cache state memory 24A, which is a L1 cache memory, requires approximately 22000 bits, and thus, a memory of only approximately 26000 bits is required in total.

The L1 cache can be managed with a memory that is smaller than a conventional one. The reduction of a tag per content and the TLB content is due to association of tags in the L1 cache with page numbers, thereby enabling the tags to be omitted.

Next, advantages will be described in terms of the performance. A condition in which two processes (having mutually-independent virtual address spaces) are performed by one and the same processor, and these two processes share a same physical address page for data reception/delivery will be considered. It is assumed that: the two process are a process A and a process B, respectively; a shared physical page is RP_1; virtual pages in the process A and in the process B corresponding to the shared physical page are EP_1A and EP_1B, respectively; and a page updated by the process A is read by the process B.

It is assumed that a write permission for this page is given to the process A, while a write permission for this page not being given to the process B. Furthermore, it is assumed that a page table is prepared in advance, and the physical page has not been used until the process A started to create data to be delivered to the process B. Also, it is assumed that the process A is closed when the process A finished the creation of data to be used by the process B and then the process B is used. It is assumed that the cache employs a write-allocate, write-back method.

Figure 30:
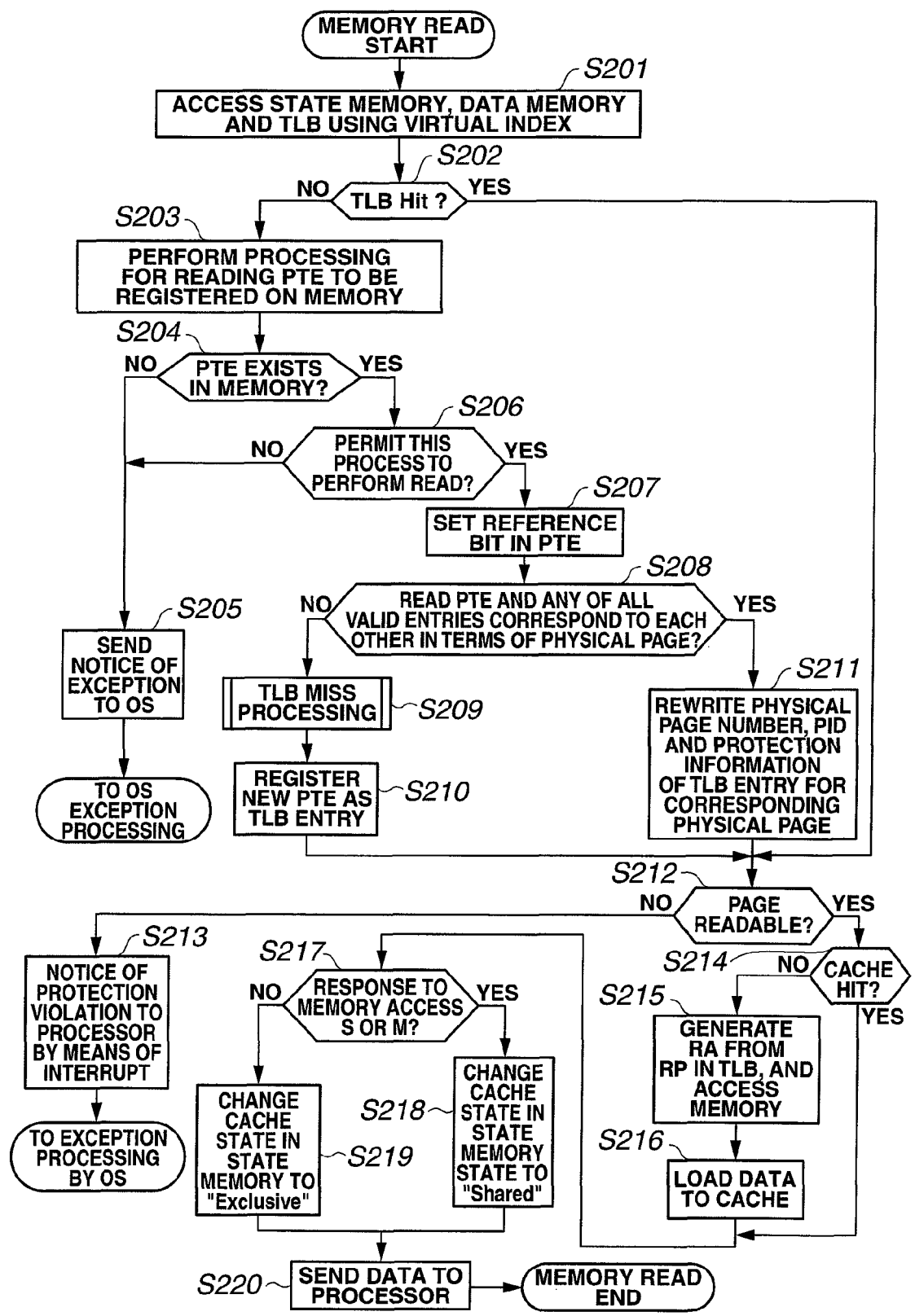
FIG. 30 is a flowchart of a shared memory read in variation 3 of an L2 cache 52 according to a present embodiment.
Figure 31:
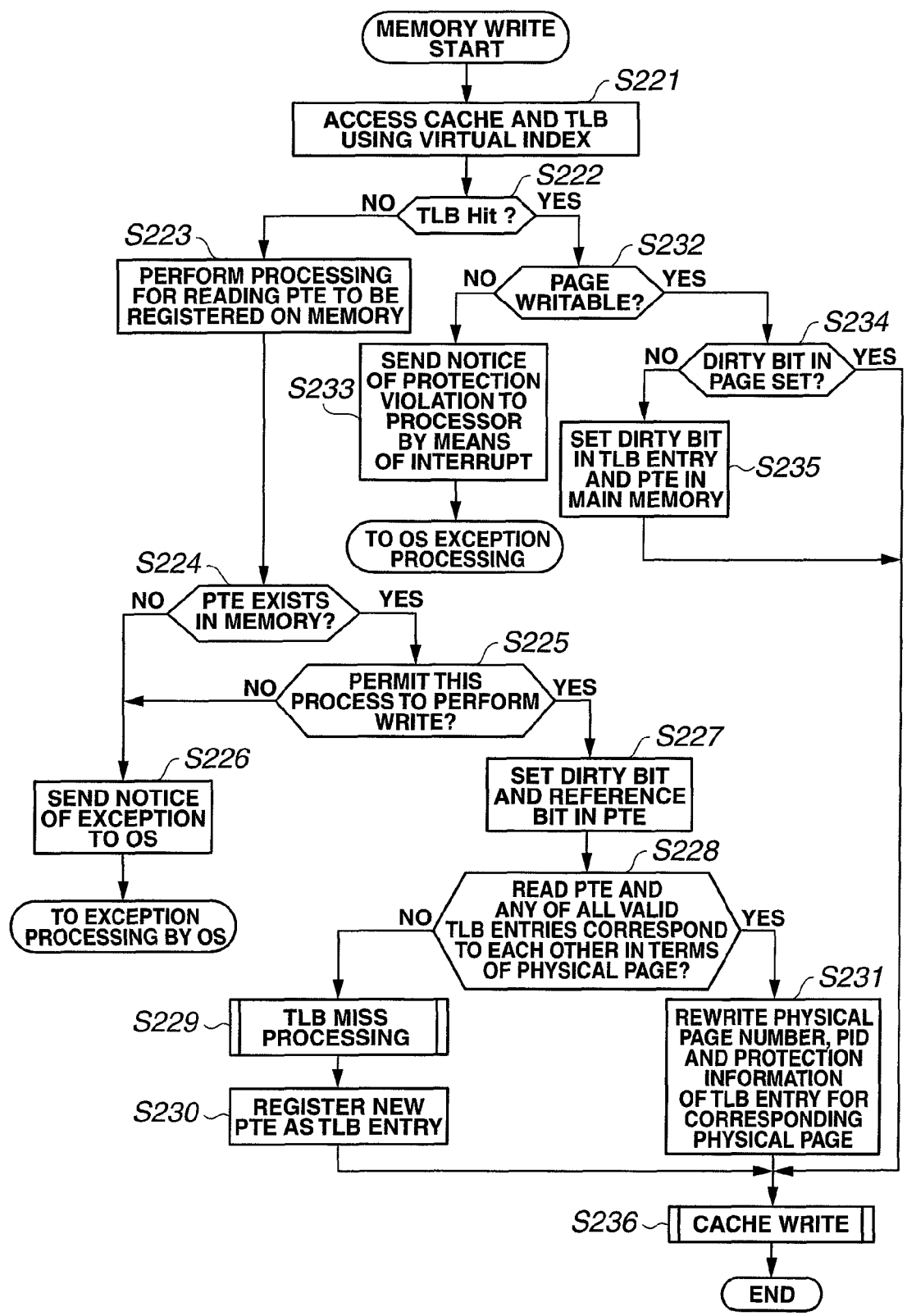
FIG. 31 is a flowchart of a shared memory write in variation 3 of an L2 cache 52 according to a present embodiment.

A shared memory read and a shared memory write will be described below using FIGS. 30 and 31. FIG. 30 is a flowchart of a shared memory read in variation 3. FIG. 31 is a flowchart of a shared memory write in variation 3.

As illustrated in FIG. 30, when a memory read is started, the TLB virtual page memory 21A, the data memory 23A and the state memory 24A are accessed using a virtual index (S201). If the TLB virtual page memory 21A has no hit (S202: NO), TLB registration processing for a read is performed. If the TLB virtual page memory 21A has a hit (S202: YES), the processing advances to S212.

More specifically, processing for reading a PTE (page table entry) to be registered is performed on the DRAM 13 (S203). Whether or not the PTE (page table entry) to be read exists in the DRAM 13 is determined (S204). If the PTE does not exist (S204: NO), a notice of occurrence of an exception is sent to the OS (S205).

If the PTE exists (S204: YES), whether or not to permit this process to perform a read is determined (S206). If the process is not permitted to perform a read (S206: NO), the processing advances to S205. If the process is permitted to perform a read (S206: YES), a reference bit in the PTE is set (S207), and the processing advances to S208.

Then, whether or not the read PTE and a physical page number for any of all the valid TLB entries correspond to each other in terms of physical page number is determined (S208). If the physical page numbers do not correspond to each other (S17: NO), TLB miss processing is performed (S209), a new PTE is registered as a TLB entry (S210), and the processing advances to S212.

On the other hand, if the physical page numbers correspond to each other (S208: YES), a virtual page number, a process number and protection information of the TLB entry having the corresponding physical page number are rewritten (S211), and the processing advances to S212.

In S212, whether or not a virtual page for the TLB entry is readable is determined. If the virtual page is not readable (S212: NO), a notice of a protection violation is sent by interrupt processing to the CPU 11 (S213), and exception processing is performed by the OS.

If the virtual page is readable (S212: YES), a cache read is performed. In other word, whether or not a cache hit occurs is determined (S214). If no cache hit occurs (S214: NO), a physical address is generated from the physical page number in the TLB to issue a memory access request (S215). Then, the obtained data is loaded to the cache memory (S216).

The memory access request is snooped by the memory and the other processors. Each of the processors that have snooped the memory access request checks the cache state managed by the processor itself, and if the cache state is "Modified", returns a "Modified" response as a snoop response, and if the cache state is "Exclusive" or "Shared", returns a "Shared" response, and thus, the processor that has issued the request updates the cache state in the cache state memory 24A according to the snoop response. In other words, if the snoop response is a "Shared" response or a "Modified" response (S217: YES), the state of the request target cache line in the cache state memory 24A is changed to "Shared" (S218), and if the snoop response is neither a "Shared" response nor a "Modified" response (S217: NO), the state of the request target cache line is changed to "Exclusive" (S219). Then, data is transmitted to the CPU 11 (S220).

If a cache hit occurs (S214: YES), the processing advances to S217.

As illustrated in FIG. 31, when a memory write is started, the TLB virtual page memory 21A, the data memory 23A and the state memory 24A are accessed using a virtual index (S221). If the TLB virtual page memory 21A has no hit (S222: NO), TLB registration processing for a write is performed.

If there is a hit in the TLB (S222: YES), the case is determined as a case of a TLB hit, and whether or not the virtual page is writable is determined (S232). If it is writable (S232: YES), whether or not a dirty bit in the virtual page is set is determined (S234), if a dirty bit in the virtual page is not set (S234: NO), a dirty bit is set in the PTE in the TLB entry and the PTE in the DRAM 13, and a cache write is performed (S236). If a dirty bit in the virtual page is set (S234: YES), a cache write is performed (S236).

On the other hand, if the virtual page is not writable (S233: NO), a notice of a protection violation is sent to the CPU 11 by means of interrupt processing (S233), and exception processing is performed by the OS.

If there is no hit in the TLB (S222: NO), TLB registration processing is started, processing for reading a PTE to be registered is performed on the DRAM 13 (S223). Whether or not the PTE to be read exists in the DRAM 13 is determined (S224). If the PTE does not exist (S224: NO), a notice of occurrence of an exception is sent to the OS (S226).

If the PTE exists (S224: YES), whether or not to permit this process to perform a write is determined (S225). If the process is not permitted to perform a write (S225: NO), the processing advances to S226.

If the process is permitted to perform a write (S225: YES), a dirty bit and a reference bit in the PTE are set (S227).

Then, whether or not the read PTE and any of all the valid TLB entries correspond to each other in terms of physical page number is determined (S228). If the physical page numbers do not correspond to each other (S228: NO), TLB miss processing is performed (S229), a new PTE is registered as a TLB entry (S230), and the processing advances to S236.

On the other hand, if the physical page numbers correspond to each other (S228: YES), a virtual page number, a process number and protection information of the TLB entry having the corresponding physical page number are rewritten (S231), and the processing advances to S236.

Figure 32:
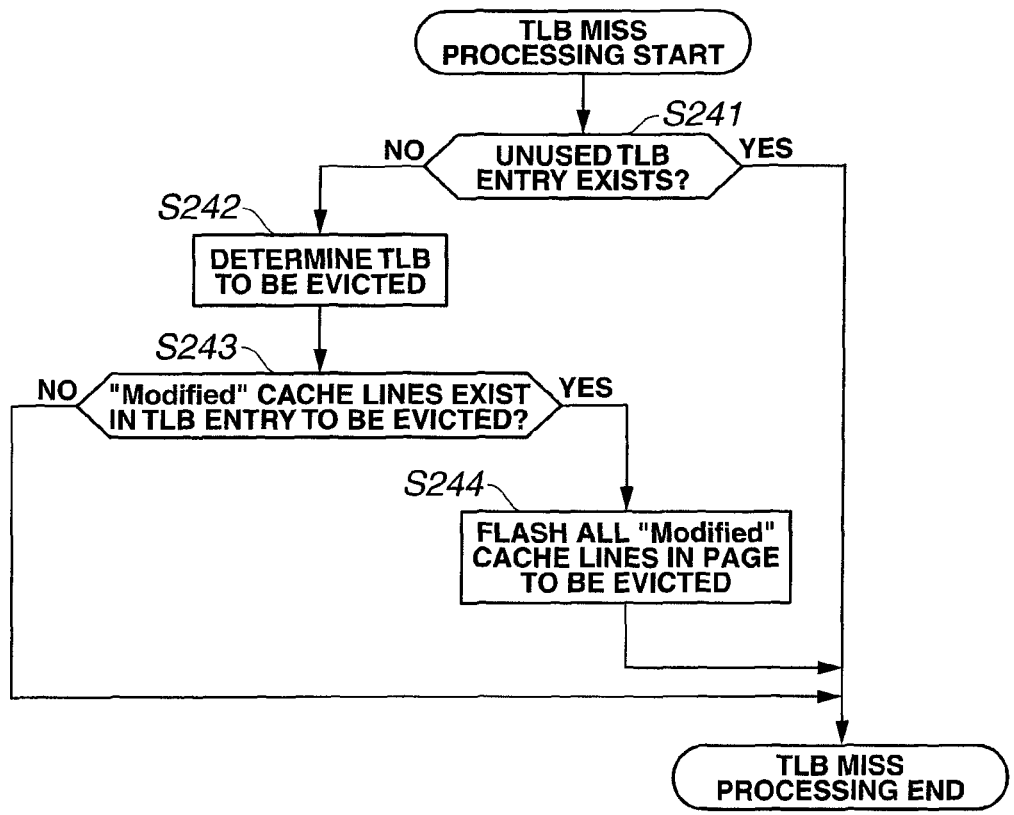
FIG. 32 is a flowchart of TLB miss processing in variation 3 of an L2 cache 52 according to a present embodiment.

As illustrated in FIG. 32, when TLB miss processing is started, whether or not an unused TLB entry exists is determined (S241). If an unused TLB entry exists (S241: YES), the processing is ended.

If no unused TLB entry exists (S241: NO), a TLB entry to be evicted (S242) is determined, and whether or not "Modified" cache lines exist in the TLB entry to be evicted is determined (S243). If no "Modified" cache lines exist (S243: NO), the processing is ended.

If "Modified" cache line exists (S243: YES), all the "Modified" cache lines in the page to be evicted are flashed (S244), and the processing is ended.

Figure 33:
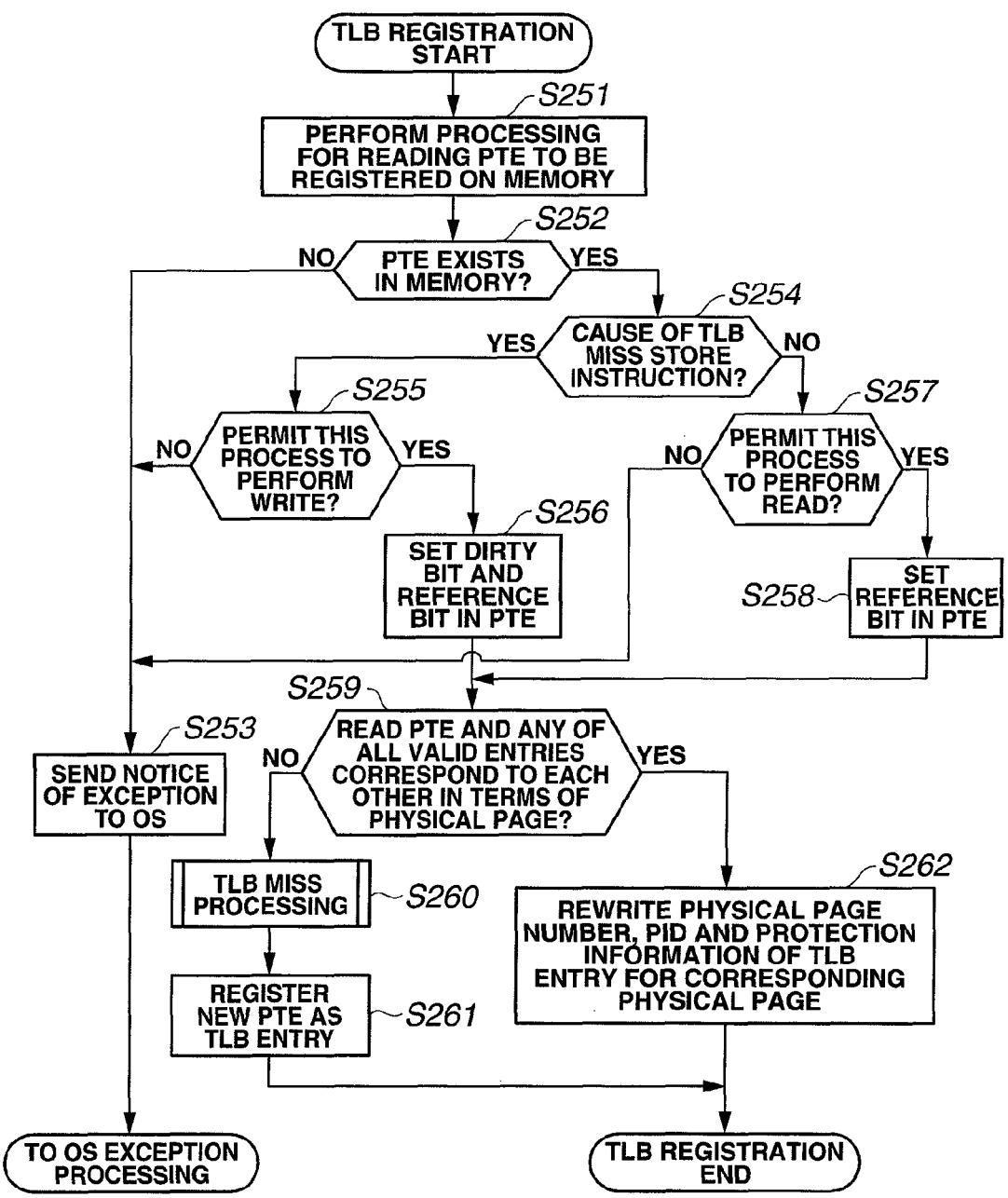
FIG. 33 is a flowchart of TLB registration processing in variation 3 of an L2 cache 52 according to a present embodiment.

As illustrated in FIG. 33, when TLB registration processing is started, processing for reading a PTE to be registered is performed on the DRAM 13 (S251). Whether or not the PTE to be read exists in the DRAM 13 is determined (S252). If the PTE does not exist (S252: NO), a notice of occurrence of an exception is sent to the OS (S253).

If the PTE exists (S252: YES), whether or not a cause of the TLB miss is a store instruction is determined (S254).

If the cause is not a store instruction (S254: NO), whether or not to permit this process to perform a read is determined (S257). If the process is not permitted to perform a read (S257: NO), the processing advances to S253. If the process is permitted to perform a read (S257: YES), a reference bit in the PTE is set (S258), and the processing advances to S259.

If a cause of the TLB miss is a store instruction (S254: YES), whether or not to permit this process to perform a write is determined (S255). If the process is not permitted to perform a write (S255: NO), the processing advances to S253.

If the process is permitted to perform a write (S255: YES), a dirty bit and a reference bit in the PTE are set (S256).

Then, whether or not the read PTE and any of all the valid TLB entries correspond to each other in terms of physical page number is determined (S259). If the physical page numbers do not correspond to each other (S259: NO), TLB miss processing is performed (S260), and a new PTE is registered as a TLB entry (S261).

On the other hand, if the physical page numbers correspond to each other (S259: YES), a virtual page number, a process number and protection information of the TLB entry having the corresponding physical page number are rewritten (S262).

As described above, when the process A starts creating data to be delivered to the process B, the process A accesses the TLB using a virtual index; however, a TLB miss occurs in S222 in FIG. 31, and thus, a page table entry for associating a physical page RP__1 with a virtual page EP__1A is called up in the TLB (S223). Here, a valid bit in the TLB entry is set and the state of each cache line for the page is "invalid". For the process A, a write bit of this page is set, and thus, the process A can perform a write to this page. Also, since no write to this page is performed at the start of the process, this page is clean; however, this page is accessed in a memory write, and thus, a dirty bit in the page is set (S235).

Since the write allocate method is employed, write target cache lines are read from the DRAM 13 (S215), and the TLB is rewritten to change the states of these cache lines to valid and dirty. Thereafter, if there is a cache hit in a write to the cache by the process A, data in the cache is updated, and if there is a cache miss, data is allocated from the DRAM 13 to the cache, and then the cache is updated. Since the write allocate method is employed, even though only a part of the cache lines is updated, the cache lines are kept in their latest states.

A state in which a write to a page by the process A is finished and the process A is switched to the process B is considered. It is assumed that until the start-up of the process B, the physical address RP1 is neither accessed nor evicted from the L1 cache. When the process B accesses a physical address RP__1 (S201), a miss occurs for a virtual address since the process number is different (S202); however, a hit occurs for the physical address (S208). Therefore, the TLB performs operations necessary for process switching such as changing the virtual page number from EP__1A to EP__1B and the process number from the process A to the process B without rewriting a valid bit and a dirty bit in the page, and clearing a write bit for the process B (S211). Here, what is rewritten is only the page information, and the cache lines are not rewritten and cache flash is not performed, either.

A case in which the process B accesses a physical address space RP__1 by designating a virtual address space EP__1B will be considered. Although the process number and virtual page information in the TLB has been rewritten, the page table in the TLB has been maintained, and the content in the L1 cache is also maintained, and thus, the process B can read information written by the process A from the cache. For an area in one and the same page in which the process A has not performed a write, the cache line states are "Invalid", and thus, a cache miss occurs; however, correct data can be read by data from the memory being allocated to the cache.

As described above, the process B can read data shared by the process A from the cache without causing an unnecessary cache miss and/or TLB miss.

Where it is necessary to invalidate a TLB entry, e.g., where RP__1 is a target for replacement because of another TLB miss, a correct operation of the system can be ensured by performing the following operation. FIG. 32 is a flowchart for TLB miss processing in variation 3. FIG. 33 is a flowchart of TLB registration processing in variation 3.

Referring to a TLB entry in variation 3, whether or not cache lines are valid and have dirty data can be clarified. The cache lines are written back to the main memory and valid bits in the cache lines are cleared (S244 in FIG. 32).

Also, cache flash is performed until no dirty cache lines appear in the page. Also, when the cache flash in the page is finished, the page is invalidated. The replacement target page table entry is registered in the TLB (S230 in FIG. 31).

In variation 3, when a TLB miss occurs, a check of "whether or not there is an entry having a RP hit exists in the TLB" is added (S208 and S228), if there is, processing for rewriting a part of the TLB entry is added (S211 and S231). Conventionally, when a TLB miss occurs, very heavy processing such as TLB miss processing and TLB registration occurs unconditionally. Also, when the process B starts accessing the shared memory, heavy processing such as invalidation of a TLB entry for the process A, and cache flash of the content of the page indicated by the entry always occurs for the shared memory space. On the other hand, according to variation 3, it is highly possible that relatively light processing such as rewriting the TLB entry is used.

In variation 3, the cache state can be managed on a page basis. When the cache state is managed on a page basis, the cache state memory 24A is configured to have one cache state for an entire page, not for each page offset. In other words, the cache state memory 24A has one state according to a coherency protocol, for example, the MESI protocol, for an entire page without decoding a page offset (0-31). Where the cache states are managed on a page basis, also, the data memory, as in FIG. 29, is accessed by providing an offset in the page like an address (11:0) to the data memory. In other words, such page-based cache state management can be provided with a configuration that is completely the same as that in FIG. 29 other than the cache state memory.

As described above, a virtual address cache memory according to variation 3 enables provision of an effect similar to that provided by the L2 cache 52, also using a full associative cache.

(Variation 4)

Figure 34:
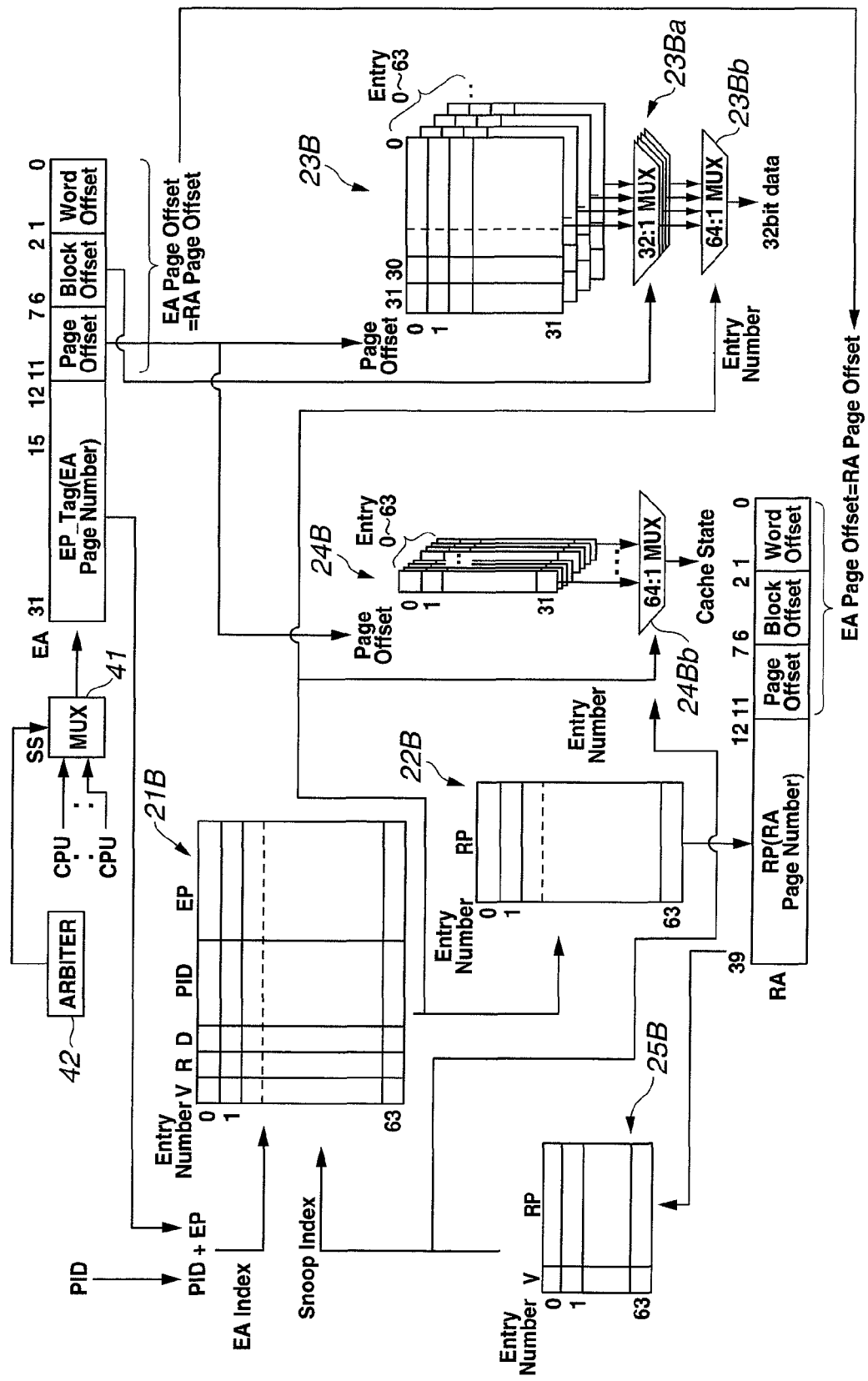
FIG. 34 is a configuration diagram of a cache memory according to variation 4 of an L2 cache 52 according to a present embodiment.

FIG. 34 is a configuration diagram of a cache memory according to variation 4.

As illustrated in FIG. 34, the cache memory includes a TLB CAM 21B, a TLB physical page memory 22B, a data memory 23B, a cache state memory 24B and a TLB physical page CAM 25B. The virtual address cache memory according to variation 4 is also a full associative cache.

In variation 4, snooping can be performed by the TLB physical page CAM 25B.

In variation 4, access from the processor core side using a virtual address is substantially similar to that of variation 3 with no snoop mechanism provided, and thus, a description thereof will be omitted. When there is access from a processor bus using a physical address, a cache state check is performed in the following procedure.

Bits (39:12) corresponding to a page number for the physical address from the processor bus are input to the TLB physical page CAM 25B. If there is a matching physical page in the TLB physical page CAM 25, the TLB physical page CAM 25 outputs an entry number. If there is no matching physical page, snooping is ended.

The cache state memory 24B is accessed using the entry number. Here, if such access conflicts with access from the CPU 11, snooping has a priority.

A cache state is checked using the cache state memory 24B. A snoop response is determined based on the cache state and the request, and the cache states are updated. If data transfer is needed because, e.g., the cache state is "Modified" according to the MESI protocol, data transfer is performed.

In response to a request from the CPU 11, a cache having the present configuration outputs a snoop request as described below.

The cache state memory 24B is accessed using bits (11:7) in a 31-bit virtual address from the CPU 11 to check the cache state. Since the cache is of a full associative type, there are 64 cache state candidates.

Simultaneously, the TLB virtual page CAM 21B is accessed using a page number in bits (31:12) in the 31-bit virtual address and a process number PID to check whether or not there is a corresponding entry, and if such entry exists, the TLB virtual page CAM 21B outputs an entry number. If no such entry exists, TLB miss processing is performed. A description of the case of a TLB miss will be omitted because it has already been provided.

In the case of a TLB hit, a cache state is selected from the cache state memory 24B using the entry number output by the TLB virtual page CAM 21B. If the cache state is "Modified (M)" or "Exclusive (E)", snooping is not required. In the case of a state other than those states, a snoop request is issued as necessary according to a request from the CPU 11, which is a processor core, and the cache state.

An example of the case requiring a snoop is a write to S state cache line or a cache miss occurring when a TLB hit occurs.

In a configuration employing snooping, for snooping, the TLB physical page CAM 25B is used to check whether or not a snooping target address exists in the cache. The TLB physical page CAM 25B is also used to check whether a relevant entry exists in the TLB when a TLB miss occurs; however, a TLB miss does not frequently occur, and thus, there is only small overhead even if the TLB physical page CAM 25B is shared with snooping. Meanwhile, although the cache state memory 24B is frequently accessed because the cache state memory 24B is referred to for every data cache access, for snooping, unnecessary transactions are excluded in advance using the TLB physical page CAM 25B, and there is no need to check a cache state for a transaction that should not exist in the cache, and therefore, only a small overhead is required.

As described above, a virtual address cache memory according to the variation 4 enables provision of an effect similar to that of the L2 cache 52 using a full associative cache, too.

(Variation 5)

Figure 35:
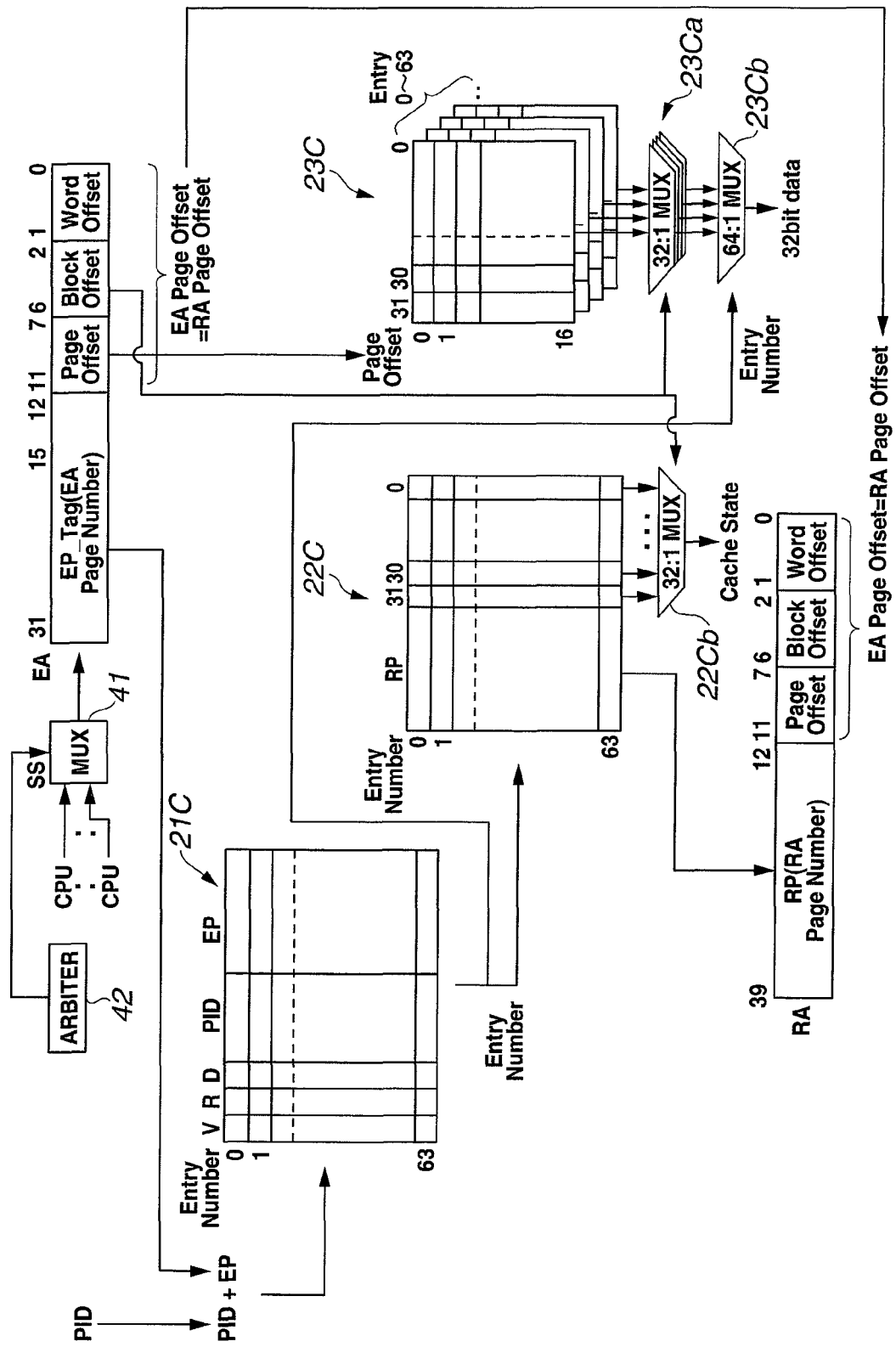
FIG. 35 is a configuration diagram of a cache memory according to variation 5 of an L2 cache 52 according to a present embodiment.

FIG. 35 is a configuration of a cache memory according to variation 5.

As illustrated in FIG. 35, the cache memory includes a TLB CAM 21C, a TLB physical page memory 22C and a data memory 23C. The virtual address cache memory according to variation 5 is also a full associative cache.

In variation 5, the TLB physical page memory 22C includes cache state information for each entry.

Variation 5 also enables provision of an effect similar to that of the L2 cache 52.

(Variation 6)

A cache memory according to variation 6 includes a secondary TLB in addition to a primary TLB. The secondary TLB is a memory that is not linked to cache data, or having a page table only and not having a translation mechanism.

The secondary TLB is of a 4 or more-way set associative type, which is the same as the primary TLB, and includes a number of entries that is larger than that of the primary TLB, and the primary TLB. Also, dirty bits and reference bits are managed by the secondary TLB.

In the virtual cache memory configuration, the cache is a 4-way set associative cache. The cache is subject to page-based replacement management, and the cache state is managed on a cache line basis. A countermeasure for an alias in variation 6 is taken as follows.

For example, if virtual indexes correspond to each other, e.g., a PID, a virtual page number and protection information of the relevant TLB entry are rewritten. If virtual indexes do not correspond to each other, the TLB entry causing an alias is not invalidated and is left as it is.

Also, where an alias occurs between different indexes, cache line-based coherency control is performed. For providing coherency between entries, a coherency mechanism in a processor bus is used. As a result, coherency is provided between the entries.

Variation 6 also enables provision of an effect similar to that of the L2 cache 52.

(Variation 7)

A cache memory according to variation 7 is a memory including a mechanism that, when TLB registration processing is performed, reads a page indicated by a registered TLB entry from a memory in a low priority order.

If a processor accesses a cache line in the page during the low-priority access, the cache line is accessed in a high priority order.

Variation 7 can also provide an effect similar to that of the L2 cache 52.

As described above, the L2 cache 52 and the L2 caches according to the variations thereof enable reduction of power consumption of TLB hardware.

Also, as described above, the respective variations can be applied not only to an L2 cache, but also to a low-order cache of level 2 or lower. In such case, also, the TLB is referred to only for the level that is applied to the lower-order cache, and thus, power consumption for TLB reference can be reduced.

Furthermore, in a multiprocessor system such as one illustrated in FIG. 27, an L2 cache is provided for the L1 caches in the respective processors, eliminating the need to provide a TLB to each L1 cache, and furthermore, one L2 cache is shared by a plurality of L1 caches, enabling reduction of the overall hardware amount.

Each of the above-described cache memories can be provided by hardware alone, and can be viewed as an ordinary processor including a cache and a TLB from software including an OS.

While a certain embodiment has been described, this embodiment has been presented by way of example only, and is not intended to limit the scope of the inventions. Indeed, the novel memories, processors, and multiprocessor systems described herein may be embodied in a variety of other forms; furthermore, various omissions, substitutions and changes in the form of the memories, processors, and multiprocessor systems described herein may be made without departing from the spirit of the inventions. The accompanying claims and their equivalents are intended to cover such forms or modifications as would fall within the scope and spirit of the inventions.

What is claimed is:

1. A processor comprising:
   a CPU;
   a primary cache memory configured to be accessed using a virtual address for a process;
   a secondary, tertiary or more-order cache memory; and
   a snoop mechanism for maintaining coherency of cache data in a data memory, the snoop mechanism being provided between the primary cache memory and the secondary or tertiary or more-order cache memory,
   wherein the secondary or tertiary or more-order cache memory comprises:
     a TLB virtual page memory configured to hold entry data comprising a virtual page tag, the virtual page tag being a predetermined high-order bit (most significant bit side) of the virtual address for the process, and to output a hit signal when the virtual page tag corresponds to a virtual page tag from a processor;
     the data memory configured to hold the cache data using the virtual page tag or a page offset as a cache index; and
     a cache state memory configured to hold a cache state of the primary cache memory and a cache state for the cache data stored in the data memory in association with the cache index.

2. The processor of claim 1,
   wherein the data memory is configured to perform replacement of the cache data on the basis of a virtual page for an operating system managing execution of the process.

3. The processor of claim 1,
   wherein cache state management by the cache state memory is performed on the basis of a cache block of the data memory that is smaller than a page size.

4. The processor of claim 1,
   wherein an identification number comprising a process identifier other than a virtual address is also a comparison object in addition to the virtual address.

5. The processor of claim 1, further comprising a mechanism configured to hold a physical address for the cache data held in the data memory, and check whether data for the physical address is held in the data memory.

6. The processor of claim 5,
   wherein the same physical address is configured to be registered in a plurality of entries.

7. The processor of claim 1, further comprising
   one or more additional CPUs; and
   one or more additional primary cache memories corresponding to the one or more additional CPUs,
   wherein the cache state memory is further configured to hold one or more additional cache states corresponding to the one or more additional primary cache memories.

* * * * *